United States Patent
Garwin et al.

(10) Patent No.: US 12,259,325 B2
(45) Date of Patent: Mar. 25, 2025

(54) ZINC-RESPONSIVE FLUOROPHORES

(71) Applicant: Northwestern University, Evanston, IL (US)

(72) Inventors: Seth A. Garwin, Evanston, IL (US);
Emily L. Que, Evanston, IL (US);
Thomas V. O'Halloran, Evanston, IL (US); Teresa K. Woodruff, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 18/397,463

(22) Filed: Dec. 27, 2023

(65) Prior Publication Data
US 2024/0167952 A1    May 23, 2024

Related U.S. Application Data

(62) Division of application No. 17/033,029, filed on Sep. 25, 2020, now Pat. No. 11,953,435.

(60) Provisional application No. 62/907,268, filed on Sep. 27, 2019.

(51) Int. Cl.
| | |
|---|---|
| *G01N 21/00* | (2006.01) |
| *C07F 5/02* | (2006.01) |
| *C09K 11/06* | (2006.01) |
| *G01N 21/64* | (2006.01) |

(52) U.S. Cl.
CPC ......... *G01N 21/6428* (2013.01); *C07F 5/022* (2013.01); *C09K 11/06* (2013.01)

(58) Field of Classification Search
CPC .................................................. G01N 21/6428
USPC ......................................................... 436/172
See application file for complete search history.

(56) References Cited

U.S. PATENT DOCUMENTS

2015/0080575 A1    3/2015    Que et al.

OTHER PUBLICATIONS

Ackerman et al., Analytical Methods for Imaging Metals in Biology: From Transition Metal Metabolism to Transition Metal Signaling. Anal Chem. Jan. 3, 2017;89(1):22-41.
Adamo et al., Toward reliable density functional methods without adjustable parameters: The PBE0 model. J. Chem. Phys. 1999, 110 (13), 6158-6170.
Baruah et al., A highly potassium-selective ratiometric fluorescent indicator based on BODIPY azacrown ether excitable with visible light. Org Lett. Sep. 29, 2005;7(20):4377-80.
Bernhardt et al., A zinc-dependent mechanism regulates meiotic progression in mammalian oocytes. Biol Reprod. Apr. 19, 2012;86(4):114.
Bernhardt et al., Zinc requirement during meiosis I-meiosis II transition in mouse oocytes is independent of the MOS-MAPK pathway. Biol Reprod. Mar. 2011;84(3):526-36.
Boens et al., Fluorescent indicators based on BODIPY. Chem. Chem Soc Rev. Feb. 7, 2012;41(3):1130-72.

(Continued)

*Primary Examiner* — Christine T Mui
*Assistant Examiner* — Emily R. Berkeley
(74) *Attorney, Agent, or Firm* — David W. Staple; Casimir Jones, S.C.

(57) ABSTRACT

The invention relates generally to compositions and methods for the detection of zinc. Provided herein is a class of zinc-responsive probes with tunable photophysical properties that can be modified for coupling to a solid support or other chemical moieties. In particular, modifications to the 5-position of the BODIPY core allows for alteration of probe properties and functionalities.

5 Claims, 28 Drawing Sheets

(56) References Cited

OTHER PUBLICATIONS

Boens et al., Rational design, synthesis, and spectroscopic and photophysical properties of a visible-light-excitable, ratiometric, fluorescent near-neutral pH indicator based on BODIPY. Chemistry. Sep. 19, 2011;17(39):10924-34.
Boens et al., Visible absorption and fluorescence spectroscopy of conformationally constrained, annulated BODIPY dyes. J Phys Chem A. Oct. 4, 2012;116(39):9621-31.
Boldyrev et al., New BODIPY lipid probes for fluorescence studies of membranes.J Lipid Res. Jul. 2007;48(7):1518-1532.
Bourassa et al., Chromis-1, a Ratiometric Fluorescent Probe Optimized for Two-Photon Microscopy Reveals Dynamic Changes in Labile Zn(II) in Differentiating Oligodendrocytes. ACS Sens. Feb. 23, 2018;3(2):458-467.
Brannon et al., Absolute quantum yield determination by thermal blooming. Fluorescein. J. Phys. Chem. 1978, 82 (6), 705-709.
Breneman et al., Determining atom-centered monopoles from molecular electrostatic potentials. The need for high sampling density in formamide conformational analysis. J. Comput. Chem. 1990, 11 (3), 361-373.
Carter et al., Fluorescent sensors for measuring metal ions in living systems. Chem Rev. Apr. 23, 2014;114(8):4564-601.
Chen et al., Geometry relaxation-induced large Stokes shift in red-emitting borondipyrromethenes (BODIPY) and applications in fluorescent thiol probes. J Org Chem. Mar. 2, 2012;77(5):2192-206.
Cossi et al., Energies, structures, and electronic properties of molecules in solution with the C-PCM solvation model. J Comput Chem. Apr. 30, 2003;24(6):669-81.
Dalvit et al., Fluorine as a hydrogen-bond acceptor: experimental evidence and computational calculations. Chemistry. Aug. 25, 2014;20(35):11058-68.
Domaille et al., Visualizing ascorbate-triggered release of labile copper within living cells using a ratiometric fluorescent sensor.J Am Chem Soc. Feb. 3, 2010;132(4):1194-5.
Duncan et al., The zinc spark is an inorganic signature of human egg activation. Sci Rep. Apr. 26, 2016;6:24737. 8 pages.
Filarowski et al., Solvatochromism of BODIPY-Schiff dye. J Phys Chem B. Feb. 12, 2015;119(6):2576-84.
Gagliardi et al., Static Dielectric Constants of Acetonitrile/Water Mixtures at Different Temperatures and Debye-HuckelAandaOBParameters for Activity Coefficients. J. Chem. Eng. Data 2007, 52 (3), 1103-1107.
Goldberg et al., Pierian Spring: 'Shallow Draughts Intoxicate the Brain'. Isr J Chem. Oct. 2016;56(9-10):791-802.
Grabowski et al., Structural changes accompanying intramolecular electron transfer: focus on twisted intramolecular charge-transfer states and structures. Chem Rev. Oct. 2003;103(10):3899-4032.
Haase et al., Zinc signals are essential for lipopolysaccharide-induced signal transduction in monocytes. J Immunol. Nov. 1, 2008;181(9):6491-502.
Izsak et al., An overlap fitted chain of spheres exchange method. J Chem Phys. Oct. 14, 2011;135(14):144105. 12 pages.
Jacobsen et al., Hydrogen-bond rigidified BODIPY dyes. Dalton Trans. Jan. 21, 2010;39(3):957-62.
Khan et al., Synthesis and Photophysical Properties of 3,5-Bis(oxopyridinyl)- and 3,5-Bis(pyridinyloxy)-Substituted Boron-Dipyrromethenes. Eur. J. Org. Chem. 2010, (12), 2314-2323.
Kim et al., Zinc availability regulates exit from meiosis in maturing mammalian oocytes. Nat Chem Biol. Sep. 2010;6(9):674-81.
Kim et al., Zinc sparks are triggered by fertilization and facilitate cell cycle resumption in mammalian eggs. ACS Chem Biol. Jul. 15, 2011;6(7):716-23.
Kolb et al., Click Chemistry: Diverse Chemical Function from a Few Good Reactions, Angew. Chem. Int. Ed. 40:2004-2021 (Jun. 2001).
Kollmannsberger et al., Design of an efficient charge-transfer processing molecular system containing a weak electron donor: spectroscopic and redox properties and cation-induced fluorescence enhancement. Chem. Phys. Lett. 2000, 329 (5-6), 363-369.
Kong et al., Zinc maintains prophase I arrest in mouse oocytes through regulation of the MOS-MAPK pathway. Biol Reprod. Jul. 1, 2012;87(1):11, 1-12.
Kossmann et al., Comparison of two efficient approximate Hartee-Fock approaches. Chem. Phys. Lett. 2009, 481 (4-6), 240-243.
Lin et al., Long-Range Corrected Hybrid Density Functionals with Improved Dispersion Corrections. J Chem Theory Comput. Jan. 8, 2013;9(1):263-72.
Lu et al., Structural modification strategies for the rational design of red/NIR region BODIPYs. Chem Soc Rev. Jul. 7, 2014;43(13):4778-823.
Lukinavicius et al., Fluorogenic probes for live-cell imaging of the cytoskeleton. Nat Methods. Jul. 2014;11(7):731-3.
Maret. Analyzing free zinc(II) ion concentrations in cell biology with fluorescent chelating molecules. Metallomics. Feb. 2015;7(2):202-11.
Meeusen et al., Reaction of metal-binding ligands with the zinc proteome: zinc sensors and N,N,N', N'-tetrakis(2-pyridylmethyl)ethylenediamine. Inorg Chem. Mar. 19, 2012;51(6):3625-32.
Menges, Computational study on aromaticity and resonance structures of substituted BODIPY derivatives. Comput. Theor. Chem. 2015, 1068, 117-122.
Milo, What is the total number of protein molecules per cell volume? A call to rethink some published values. Bioessays. Dec. 2013;35(12):1050-5.
Momeni et al., Why do TD-DFT excitation energies of BODIPY/Aza-BODIPY families largely deviate from experiment? Answers from electron correlated and multireference methods. J Chem Theory Comput. Jun. 9, 2015;11(6):2619-32.
Morgan et al., Rational Design of a Water-Soluble, Lipid-Compatible Fluorescent Probe for Cu(I) with Sub-Part-Per-Trillion Sensitivity. Chem Sci. Feb. 2016;7(2):1468-1473.
Neese et al., Efficient, approximate and parallel Hartree-Fock and hybrid DFT calculations. A 'chain-of-spheres' algorithm for the Hartree-Fock exchange. Chem. Phys. 2009, 356 (1-3), 98-109.
Neese, The ORCA program system. Wiley Interdisciplinary Rev.: Comput. Mol. Sci. 2012, 2 (1), 73-78.
New et al., Promises and Pitfalls of Metal Imaging in Biology. Cell Chem Biol. Jan. 18, 2018;25(1):7-18.
Nowakowski et al., Chemical-Biological Properties of Zinc Sensors TSQ and Zinquin: Formation of Sensor-Zn-Protein Adducts versus Zn(Sensor)2 Complexes. Inorg Chem. Dec. 21, 2015;54(24):11637-47.
O'Halloran et al., Zinc, insulin, and the liver: a menage a trois.J Clin Invest. Oct. 2013;123(10):4136-9.
Perdew et al., Burke, K .; Ernzerhof, M., Generalized Gradient Approximation Made Simple [Phys. Rev. Lett. 77, 3865 (1996)]. Phys. Rev. Lett. 1997, 78 (7), 1396-1396.
Perdew et al., Generalized Gradient Approximation Made Simple. Phys Rev Lett. Oct. 28, 1996;77(18):3865-3868.
Pluth et al., Biochemistry of mobile zinc and nitric oxide revealed by fluorescent sensors. Annu Rev Biochem. 2011;80:333-55.
Price et al., The challenges of using a copper fluorescent sensor (CS1) to track intracellular distributions of copper in neuronal and glial cells. Chem. Sci. 2012, 3 (9) 2748-2759.
Que et al., Metals in neurobiology: probing their chemistry and biology with molecular imaging. Chem Rev. May 2008;108(5):1517-49.
Que et al., Quantitative mapping of zinc fluxes in the mammalian egg reveals the origin of fertilization-induced zinc sparks. Nat Chem. Feb. 2015;7(2):130-9.
Que et al., Zinc sparks induce physiochemical changes in the egg zona pellucida that prevent polyspermy. Integr Biol (Camb). Feb. 20, 2017;9(2):135-144.
Roh et al., Lysosome-related organelles in intestinal cells are a zinc storage site in C. elegans. Cell Metab. Jan. 4, 2012;15(1):88-99.
Schellhammer et al., Tuning Near-Infrared Absorbing Donor Materials: A Study of Electronic, Optical, and Charge-Transport Properties of aza-BODIPYs. Chem. Mater. 2017, 29 (13), 5525-5536.

(56) References Cited

OTHER PUBLICATIONS

Sfrazzetto et al., Synthetic fluorescent probes to map metallostasis and intracellular fate of zinc and copper. Coord. Chem. Rev. 2016, 311, 125-167.
Stiernagle, Maintenance of C. elegans. WormBook. Feb. 11, 2006;1-11.
Taki et al., Emission ratiometric imaging of intracellular zinc: design of a benzoxazole fluorescent sensor and its application in two-photon microscopy. J Am Chem Soc. Jan. 28, 2004;126(3):712-3.
Thakare et al., Proton Induced Modulation of ICT and PET Processes in an Imidazo-phenanthroline Based BODIPY Fluorophores. J Fluoresc. Nov. 2017;27(6):2313-2322.
Tokuhiro et al., Glycan-Independent Gamete Recognition Triggers Egg Zinc Sparks and ZP2 Cleavage to Prevent Polyspermy. Dev Cell. Sep. 10, 2018;46(5):627-640.e5.
Vallee et al., The biochemical basis of zinc physiology. Physiol Rev. Jan. 1993;73(1):79-118.
Weigend et al., Balanced basis sets of split valence, triple zeta valence and quadruple zeta valence quality for H to Rn: Design and assessment of accuracy. Phys Chem Chem Phys. Sep. 21, 2005;7(18):3297-305.
Weigend. Accurate Coulomb-fitting basis sets for H to Rn. Phys Chem Chem Phys. Mar. 7, 2006;8(9):1057-65.
Ya et al., Zinc as a Key Meiotic Cell-Cycle Regulator in the Mammalian Oocyte. Zinc Signals in Cellular Functions and Disorder 2014, 315-333.
Zhang et al., The fertilization-induced zinc spark is a novel biomarker of mouse embryo quality and early development. Sci Rep. Mar. 18, 2016;6:22772. 9 pages.

ZINC-RESPONSIVE FLUOROPHORES

CROSS REFERENCE TO RELATED APPLICATIONS

The present invention is a Divisional of U.S. patent application Ser. No. 17/033,029 filed Sep. 25, 2020, which claims priority to U.S. Provisional Patent Application 62/907,268, filed Sep. 27, 2019, which is incorporated herein by reference in its entirety.

STATEMENT REGARDING FEDERAL FUNDING

This invention was made with government support under GM115848, CA193419, and GM038784 awarded by the National Institutes of Health. The government has certain rights in the invention.

FIELD

Provided herein is a class of zinc-responsive probes with tunable photophysical properties that can be modified for coupling to a solid support or other chemical moieties. In particular, modifications to the 5-position of the BODIPY core allows for alteration of probe properties and functionalities.

BACKGROUND

Fluctuations in zinc content and subcellular localization plays key roles in regulating cell cycle progression; however, a deep mechanistic understanding requires the determination of when, where, and how labile zinc pools are concentrated into or released from stores. Labile zinc ions can be difficult to detect with probes that require hydrolysis of toxic protecting groups or application at high concentrations that negatively impact cell function. A BODIPY-based zinc probe, ZincBY-1, was previously reported that can be used at working concentrations that are 20-200-fold lower than concentrations employed with other probes.

SUMMARY

Provided herein is a class of zinc-responsive probes with tunable photophysical properties that can be modified for coupling to a solid support or other chemical moieties. In particular, modifications to the 5-position of the BODIPY core allows for alteration of probe properties and functionalities.

In some embodiments, provided herein are compositions comprising a zinc-responsive probe comprising:

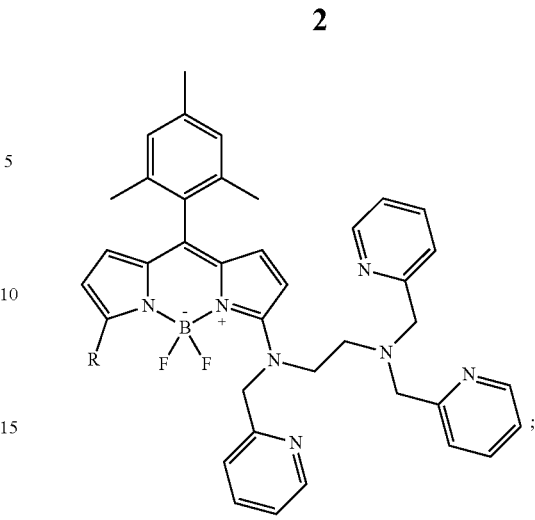

wherein R is selected from H, alkyl, substituted alkyl, branched alkyl, substituted branched alkyl, hydroxy, alkoxy, amine, substituted amine, alkylamine, substituted alkylamine, thioalkyl, alkylthioalkyl, azide, cyanide, thioalkyl, ether, ester, thiol, thioether, amino hydroxyl, halogen, ketone, carboxyl, amide, substituted amide, alkylamide, substituted alkylamide, cyano, sulfonyl, carboxy, dialkylphosphine oxide, and combinations thereof. In some embodiments, R is not —O—$CH_3$.

In some embodiments, R is selected from: OH, $O(CH_2)_{1-6}CH_3$, $O(CH_2)_{1-4}HC(CH_3)_2$, $O(CH_2)_{0-6}N_3$, $O(CH_2)_{0-6}CN_3$, $O(CH_2)_{0-6}CN$, $O(CH_2)_{0-6}NH_2$, $O(CH_2)_{0-6}NHC(O)CH_3$, $O(CH_2)_{0-6}NHC(O)OH$, $O(CH_2)_{0-6}NHC(O)SH$, $O(CH_2)_{0-6}CH_2Cl$, $O(CH_2)_{0-6}CHCl_2$, $O(CH_2)_{0-6}CCl_3$, $O(CH_2)_{0-6}CH_2Br$, $O(CH_2)_{0-6}CHBr_2$, $O(CH_2)_{0-6}CBr_3$, $O(CH_2)_{0-6}CH_2F$, $O(CH_2)_{0-6}CHF_2$, $O(CH_2)_{0-6}CF_3$, SH, $S(CH_2)_{0-6}CH_3$, $S(CH_2)_{1-4}HC(CH_3)_2$, $S(CH_2)_{0-6}N_3$, $S(CH_2)_{0-6}CN_3$, $S(CH_2)_{0-6}CN$, $S(CH_2)_{0-6}NH_2$, $S(CH_2)_{0-6}NHC(O)CH_3$, $S(CH_2)_{0-6}NHC(O)OH$, $S(CH_2)_{0-6}NHC(O)SH$, $S(CH_2)_{0-6}CH_2Cl$, $S(CH_2)_{0-6}CHCl_2$, $S(CH_2)_{0-6}CCl_3$, $S(CH_2)_{0-6}CH_2Br$, $S(CH_2)_{0-6}CHBr_2$, $S(CH_2)_{0-6}CBr_3$, $S(CH_2)_{0-6}CH_2F$, $O(CH_2)_{0-6}CHF_2$, $S(CH_2)_{0-6}CF_3$, $NH_2$, $NH(CH_2)_{1-6}CH_3$, $O(CH_2)_{1-4}HC(CH_3)_2$, $NH(CH_2)_{0-6}N_3$, $NH(CH_2)_{0-6}CN_3$, $NH(CH_2)_{0-6}CN$, $NH(CH_2)_{0-6}NH_2$, $NH(CH_2)_{0-6}NHC(O)CH_3$, $NH(CH_2)_{0-6}NHC(O)OH$, $NH(CH_2)_{0-6}NHC(O)SH$, $NH(CH_2)_{0-6}CH_2Cl$, $NH(CH_2)_{0-6}CHCl_2$, $NH(CH_2)_{0-6}CCl_3$, $NH(CH_2)_{0-6}CH_2Br$, $NH(CH_2)_{0-6}CHBr_2$, $NH(CH_2)_{0-6}CBr_3$, $NH(CH_2)_{0-6}CH_2F$, $NH(CH_2)_{0-6}CHF_2$, and $NH(CH_2)_{0-6}CF_3$.

In some embodiments, R is O(CH2)2R', wherein R' is selected from H, CH3, OH, NH2, SH, N3, CN, NHC(O)CH3, CN3, NHC(O)OH, NHC(O)SH, Cl, Br, F, CH2Cl, CH2Br, CH2F CHCl2, CHBr2, CHF2, CCl3, CBr3, and CF3. In some embodiments, the zinc-responsive probe is selected from:

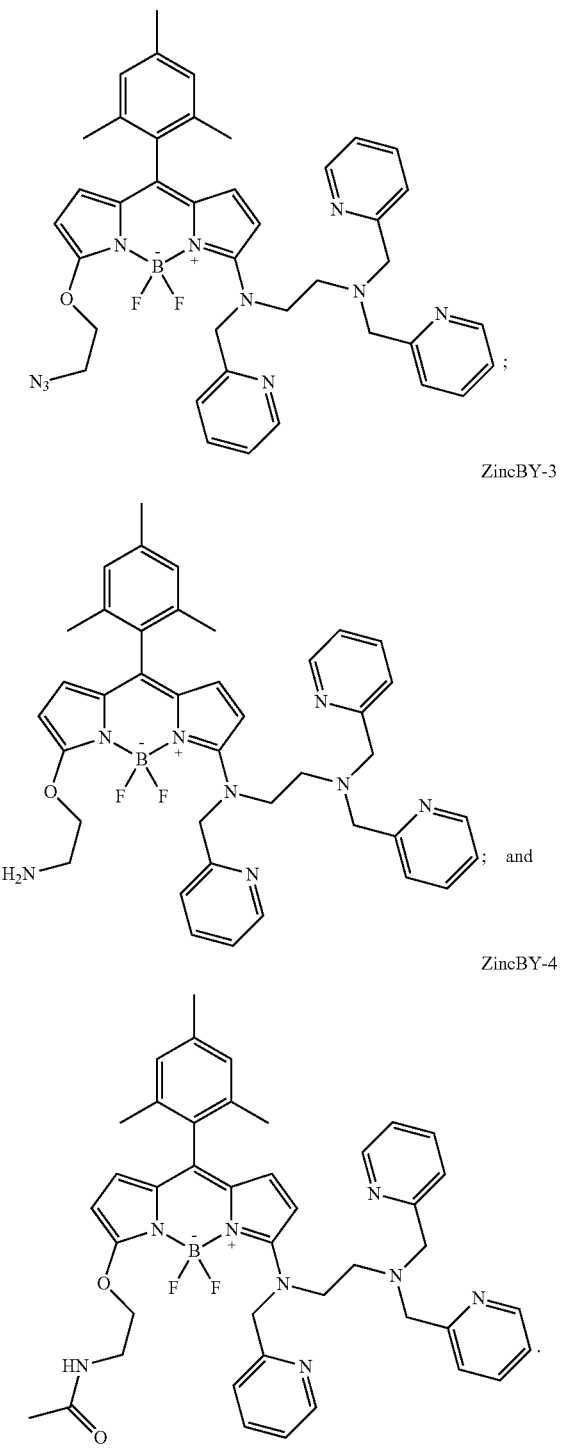

ZincBY-2; ZincBY-3; and ZincBY-4

In some embodiments, the zinc-responsive probe is bound to zinc. In some embodiments, the emission spectrum of the zinc-responsive probe undergoes a shift upon binding of the zinc-responsive probe to zinc. In some embodiments, the shift is 15 nm or greater (e.g., 20 nm, 30 nm, 40 nm, 50 nm, 60 nm, 70 nm, 80 nm, 90 nm, 100 nm, or greater, or ranges therebetween (e.g., 90 nm or greater)).

In some embodiments, the zinc-responsive probe is cell permeable. In some embodiments, the zinc-responsive probe has a sub-nanomolar affinity for zinc. In some embodiments, R or R' is linked to a solid surface or functional group.

In some embodiments, provided herein are methods comprising: (a) contacting a sample with the composition of claim 1; and (b) detecting light emitted from the zinc-responsive probe.

In some embodiments, detecting light emitted from the zinc-responsive probe comprises detecting the emission spectrum of the zinc-responsive probe. In some embodiments, detecting light emitted from the zinc-responsive probe comprises exposing the sample to a wavelength of light within the emission spectrum of the zinc-responsive probe. In some embodiments, detecting light from the zinc-responsive probe comprises monitoring light emitted the zinc-responsive probe over time. In some embodiments, detecting the emission spectrum of the zinc-responsive probe comprises imaging the sample. In some embodiments, methods further comprise exposing the sample to a stimulus or condition that causes (or is suspected of causing) a change in zinc concentration or localization within the sample. In some embodiments, the sample comprises a cell, tissue, organ, or whole animal.

Each condition was measured in triplicate. (E) Job plot of ZincBY-2 with Zn. The fluorescence intensity reaches a maximum at a mole fraction of 0.5 for ZincBY-2 (5 μM) and $Zn(NO_3)_2$ (5 μM), supporting a 1:1 binding stoichiometry between ZincBY-2 and Zn(II). Lines represent linear regression fits for the data points between mole fractions of ZincBY-2 between 0 to 0.5 and between 0.5 to 1.

Figure 17:
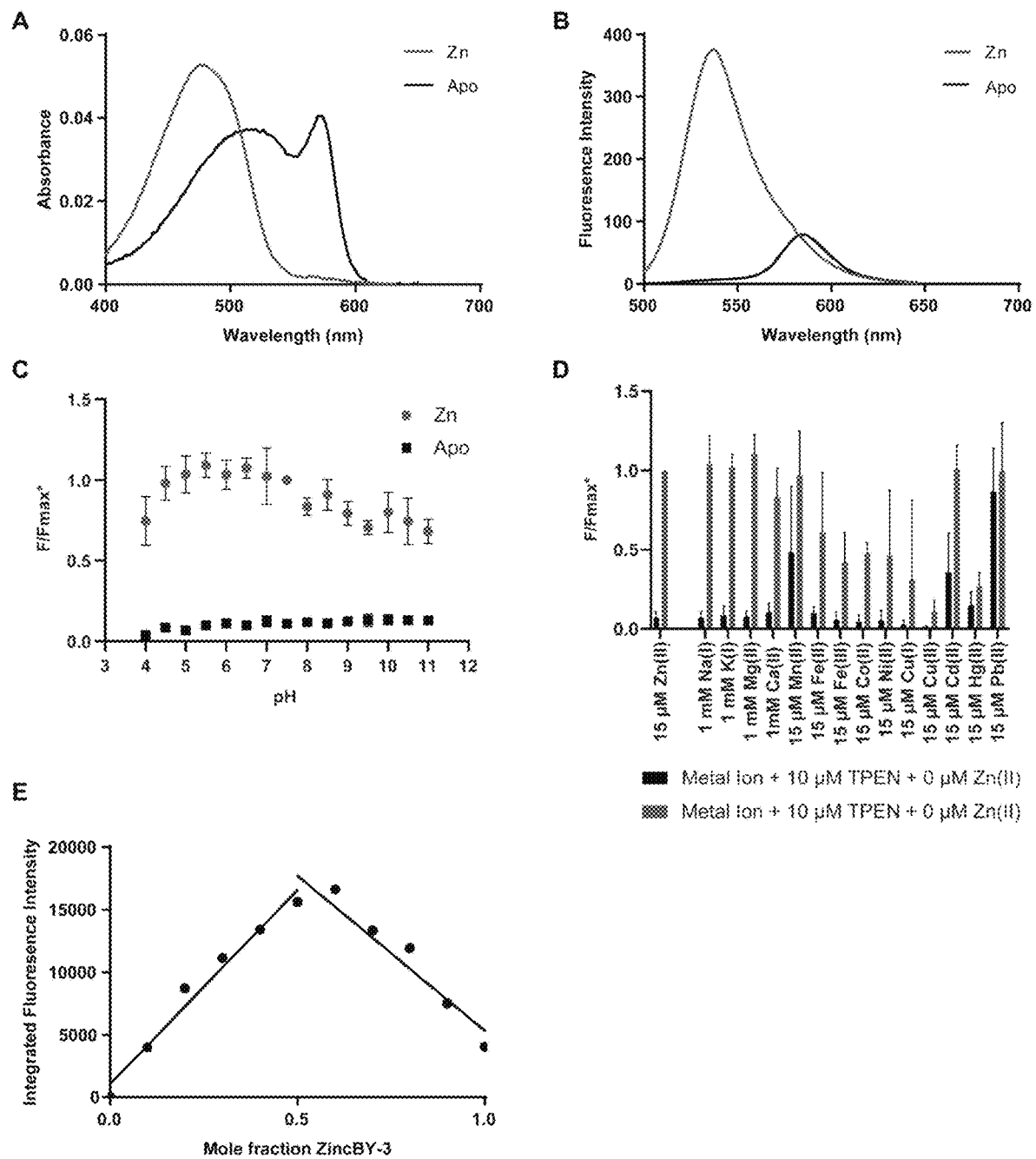

FIG. 17, panels A-E. (A) Absorption spectra of ZincBY-3 (200 nM) in the Zn-bound state (Zn) and in the presence of TPEN (Apo). (B) Fluorescence spectra of ZincBY-3 (200 nM) in the Zn-bound state (Zn) and in the presence of TPEN (Apo). (C) pH dependence of ZincBY-3. Relative fluorescence intensities of ZincBY-3 (200 nM) in the presence of TPEN (Apo) and in the presence of zinc (Zn) in buffers at various pHs. Fluorescence changes of the Apo probe are largely unaffected by changes in pH. Fluorescence of the Zn-bound probe is stable between pH 4-8. $F_{max}$=fluorescence of Zn-bound probe at pH 7.5. Each condition was measured in triplicate. (D) Metal ion selectivity of ZincBY-3. Relative fluorescence intensities of ZincBY-3 (5 μM) in the presence of other metal ions (grey bars) and other metal ions in the presence of excess zinc (black bars). ZincBY-3 does not respond to changes in K, Na, Ca, Mg, Mn, Co, or Ni concentration. ZincBY-3 does not fluoresce in the presence of Cu(I) or Cu(II), and these ions inhibit the zinc response. Fe(II) and Fe(III) also seem to inhibit a zinc response. ZincBY-3 exhibits a fluorescence response to the toxic metals Cd, Hg, and Pb. $F_{max}$=fluorescence of Zn-bound probe at pH 7.2. Each condition was measured in triplicate. (E) Job plot of ZincBY-3 with Zn. The fluorescence intensity reaches a maximum at a mole fraction of 0.5 for ZincBY-3 (5 μM) and $Zn(NO_3)_2$ (5 μM), supporting a 1:1 binding stoichiometry between ZincBY-3 and Zn(II). Lines represent linear regression fits for the data points between mole fractions of ZincBY-3 between 0 to 0.5 and between 0.5 to 1.

Figure 18:
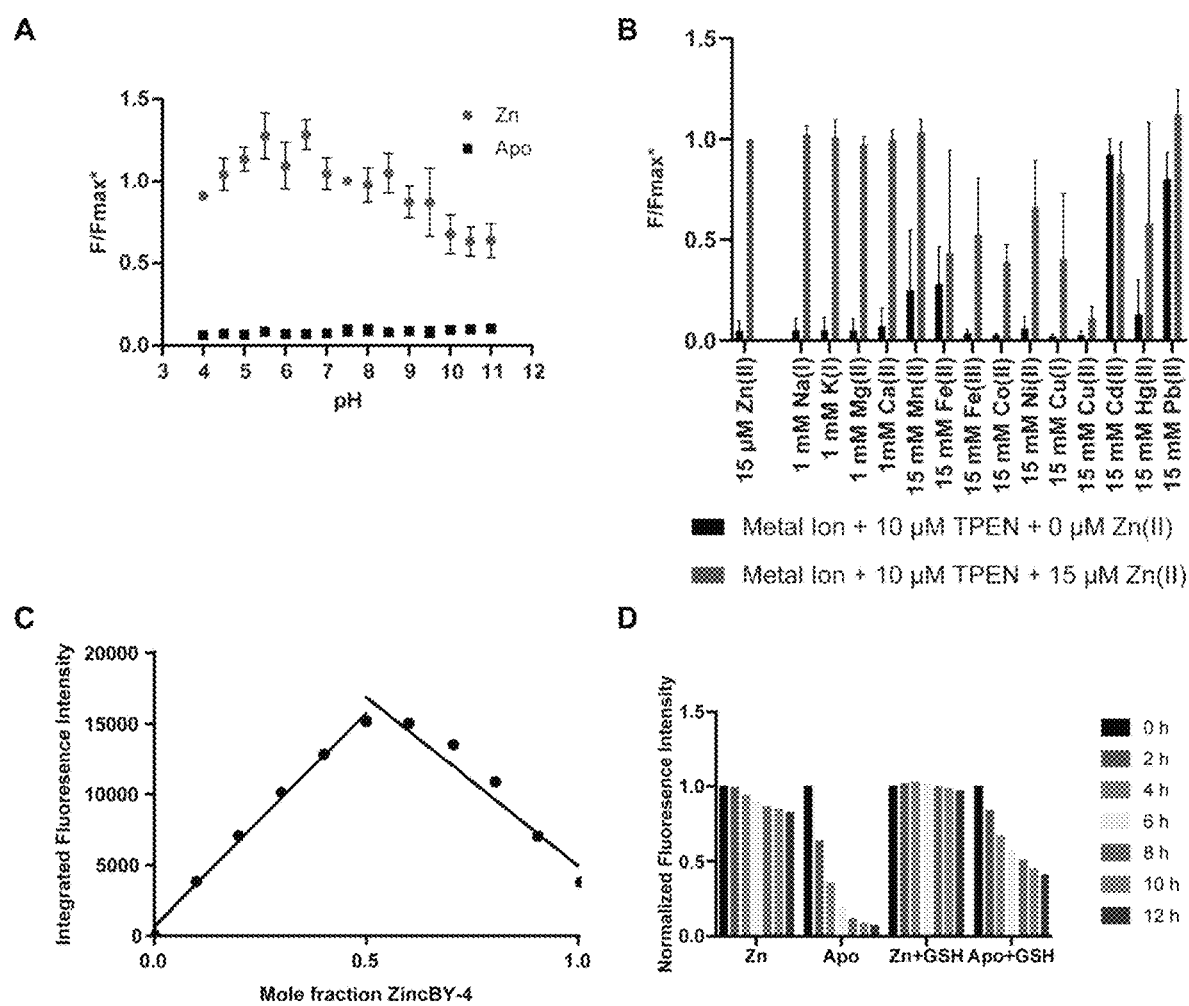

FIG. 18, panels A-D. (A) pH dependence of ZincBY-4. Relative fluorescence intensities of ZincBY-4 (200 nM) in the presence of TPEN (Apo) and zinc (Zn) in buffers at various pHs. Fluorescence changes of the Apo probe are largely unaffected by changes in pH. Fluorescence of the Zn-bound probe are stable from pH 4-8. $F_{max}$=fluorescence of Zn-bound probe at pH 7.5. Each condition was measured in triplicate. (B) Metal ion selectivity of ZincBY-4. Relative fluorescence intensities of ZincBY-4 (5 µM) in the presence of other metal ions (grey bars) and other metal ions in the presence of excess zinc (black bars). ZincBY-4 does not respond to changes in K, Na, Ca, Mg, Mn, Ni, or Cu(I) concentration. ZincBY-4 does not fluoresce in the presence of Cu(II) or Hg, and these ions inhibit the zinc response. Fe(II), Fe(III), and Co also seem to inhibit the zinc response. ZincBY-4 exhibits a fluorescence response to the toxic metals Cd, and Pb. $F_{max}$=fluorescence of Zn-bound probe at pH 7.2. Each condition was measured in triplicate. (C) Job plot of ZincBY-4 with Zn. The fluorescence intensity reaches a maximum at a mole fraction of 0.5 for ZincBY-4 (5 µM) and Zn(NO$_3$)$_2$ (5 µM), supporting a 1:1 binding stoichiometry between ZincBY-4 and Zn(II). Lines represent linear regression fits for the data points between mole fractions of ZincBY-4 between 0 to 0.5 and between 0.5 to 1. (D) Stability of ZincBY-4 over 12 h as determined by fluorescence intensity. The presence of glutathione (10 mM) protected against a degradation of fluorescence signal. Data in each condition is normalized to the 0 h time point. Quantum yield and Extinction coefficient measured with 50 nM to 250 nM probe concentrations. * are values reported in Que et al.[2] † are this work. The buffers used to analyze the samples for Que et al. were found to contain 57 ppb Cu compared to the less than 1 ppb Cu detect in the buffers used for this work.

Figure 19:
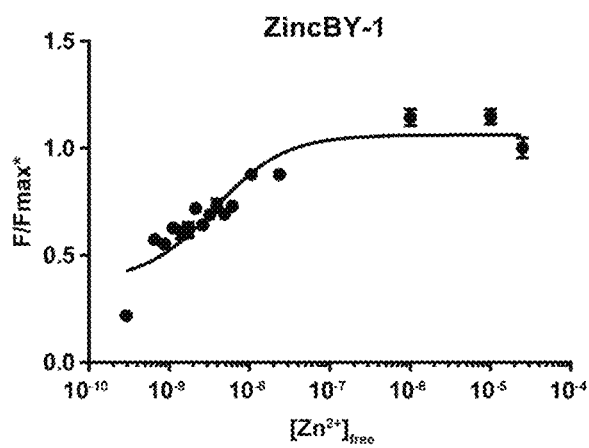
Figure 19:
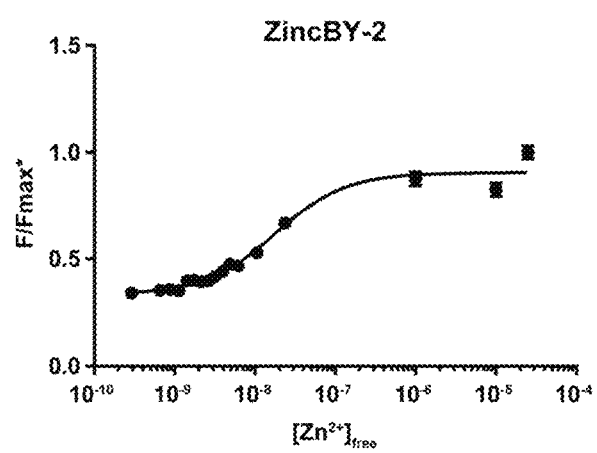
Figure 19:
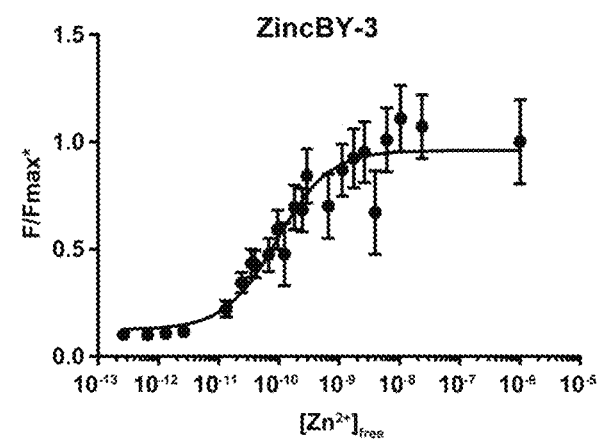

FIG. 19, panels A-C. Free zinc titration of (A) ZincBY-1, (B) ZincBY-2, (C) ZincBY-3 on a log scale. F/Fmax is the fluorescence intensity normalized to the max average fluorescence intensity.

Figure 20:
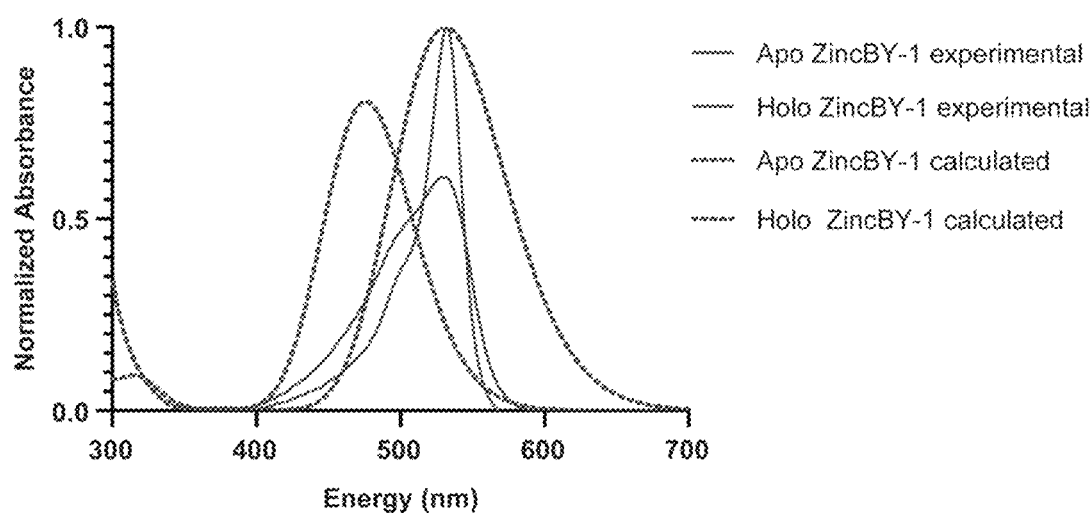
Figure 20:
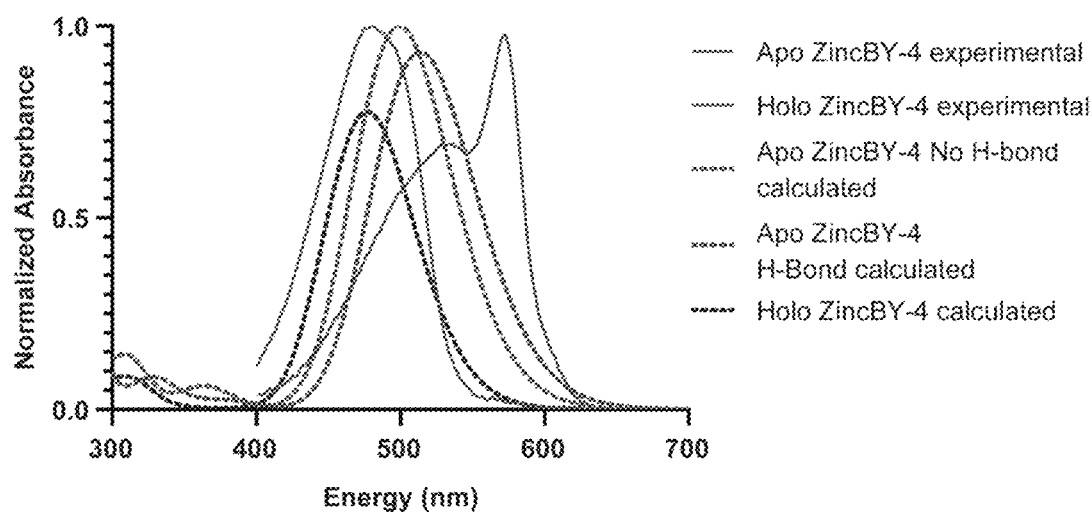

FIG. 20, panels A-B. Comparison of a TD-DFT calculated absorbance spectrum utilizing a ωB97-XD3 functional compared to the experimental absorbance spectra of (A) ZincBY-1 and (B) ZincBY-4. The calculated ZincBY-4 spectra were performed for both cases in which a hydrogen bonding between the amide proton to the BF$_2$ is present (H-Bond) and absent (No H-Bond).

Figure 21:
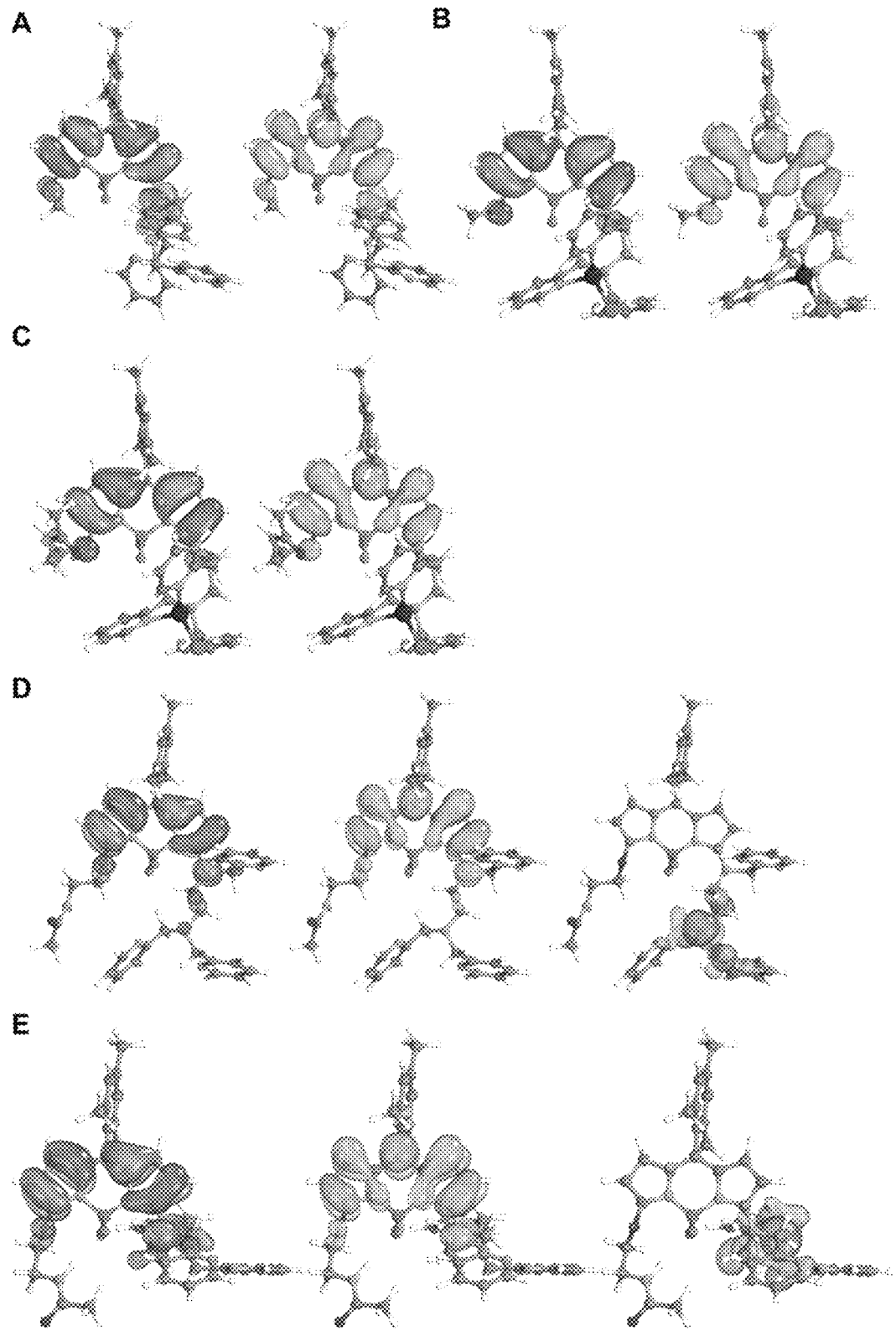

FIG. 21, panels A-E. Calculated HOMO, LUMO, and CT transition orbitals depicted of apo ZincBY-1 (A), holo ZincBY-1 (B), holo ZincBY-4 (C), apo ZincBY-4 without a NH—F hydrogen bond (D), and apo ZincBY-4 with a NH—F hydrogen bond (E). Orbitals are depicted as isosurfaces enclosing 80% of each orbital's electron density. HOMOs are depicted in blue/purple, LUMOs are depicted as green/light green, and CT transition orbitals are depicted as red/orange.

Figure 22:
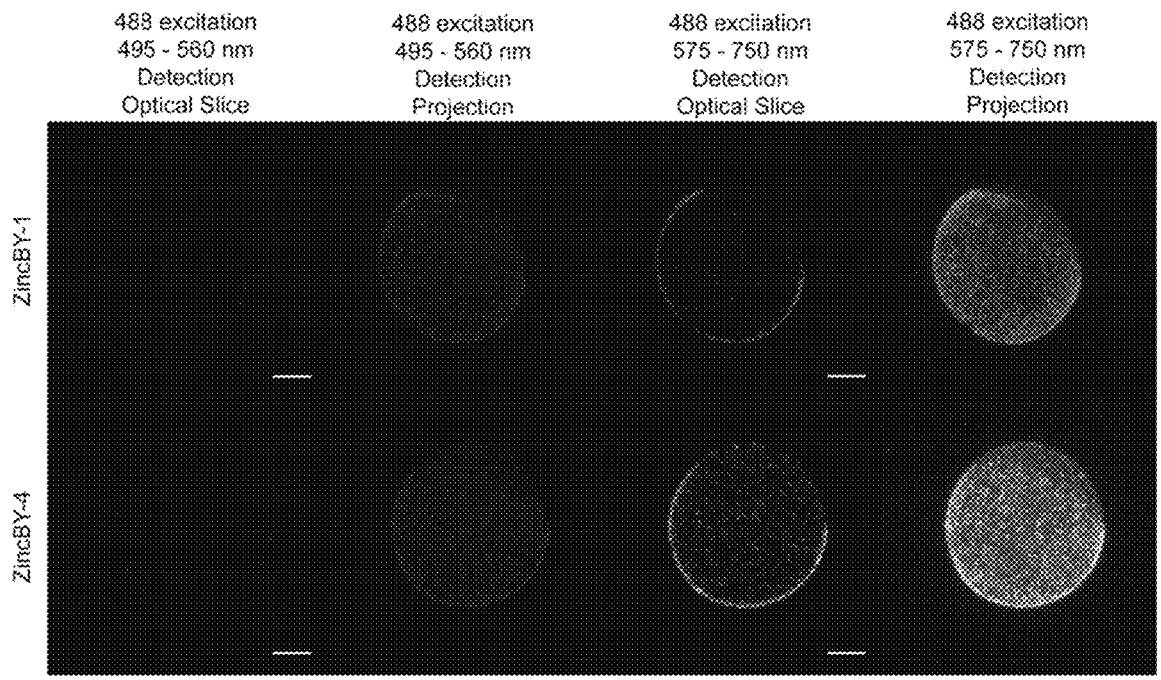
Figure 22:
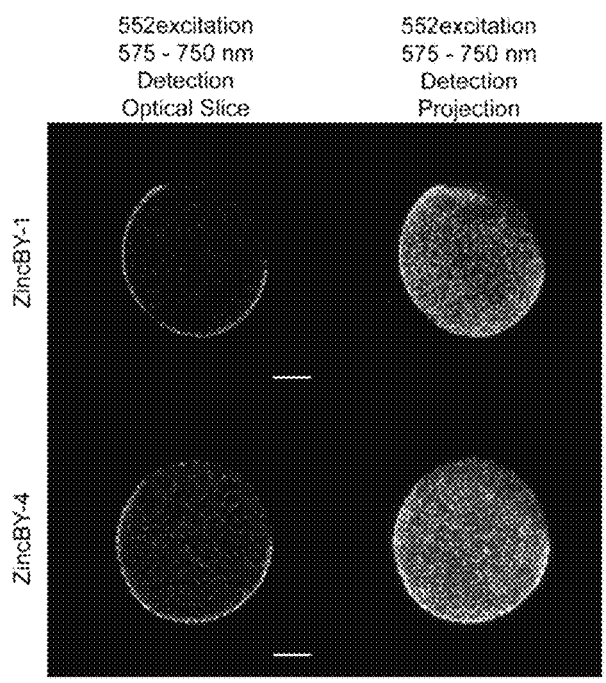

FIG. 22, panels A-B. Comparison of ZincBY-1 (50 nM) and ZincBY-4 (50 nM) localization in the MII egg with a 488 nm (A) and 552 nm (B) excitation. Both probes can be excited at both 488 nm and 552 nm, but only ZincBY-4 exhibits a strong fluorescence intensity upon excitation at 488 nm. There is very little emission detected in the range of 495-560 nm upon excitation at 488 nm for any of the probes. Excitation and acquisition parameters are the same with both probes. Scale bar is 20 µm.

Figure 23:
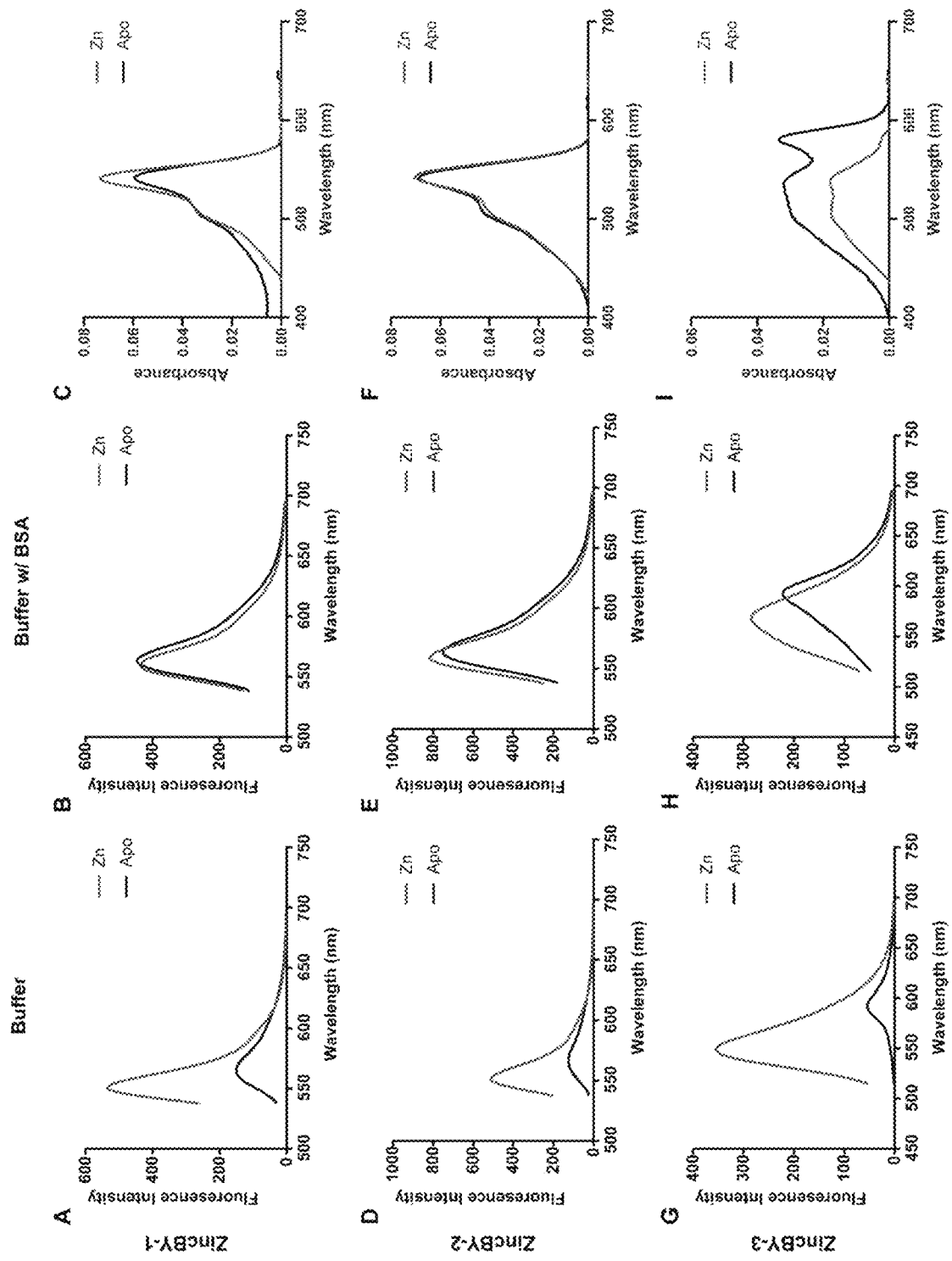

FIG. 23, panels A-I. Comparison of the emission spectra of ZincBY-1, 2, and 3 in normal buffer (A, D, and G) and buffer with the addition of 10 mg/mL BSA (B, E, and H) along with the accompanying absorbance spectra in buffer with the addition of 10 mg/mL BSA (C, F, and I). All experiments were carried out at 200 nM probe concentrations.

Figure 24:
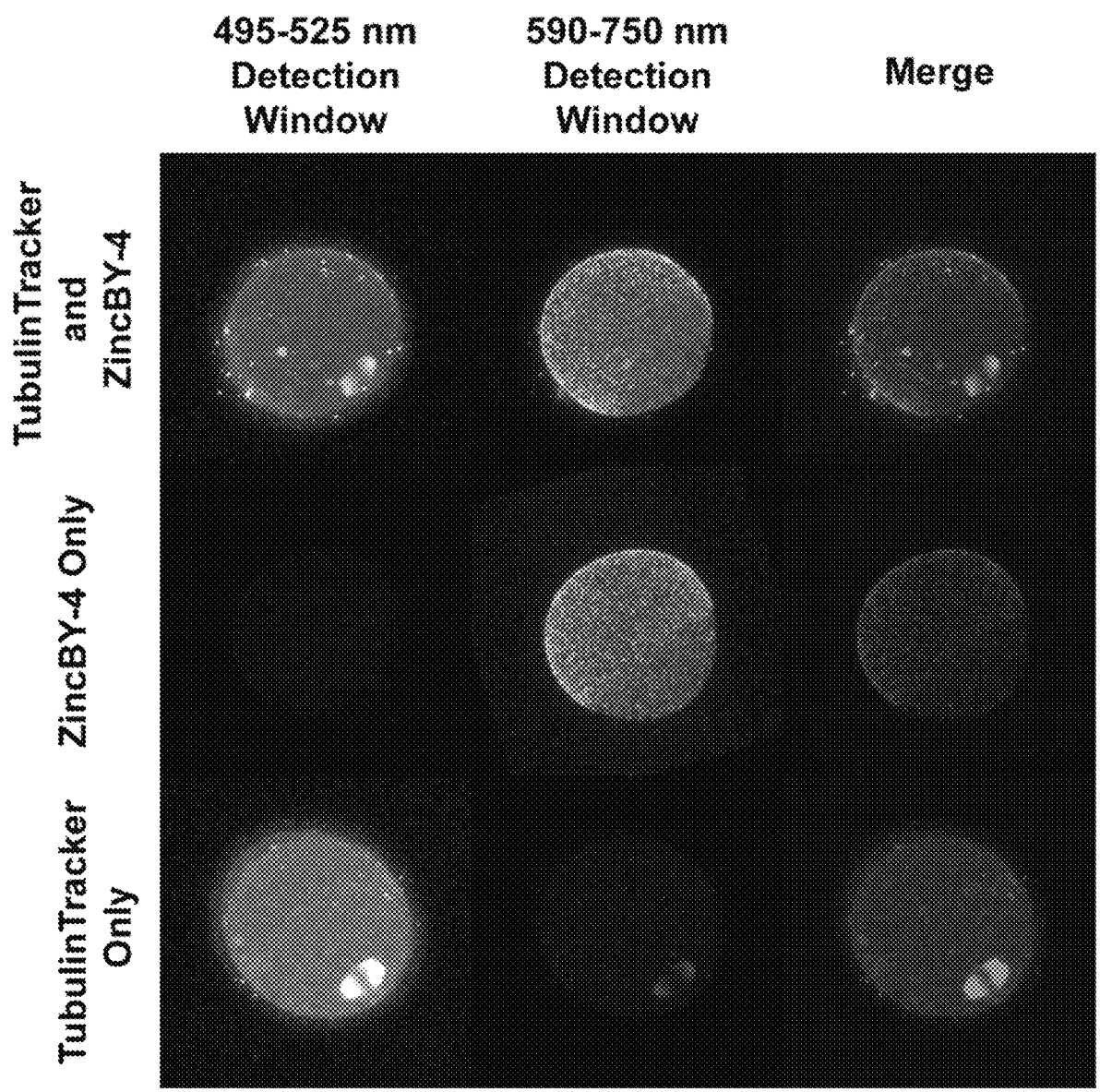

FIG. 24. Maximum image projections of comparison of the spectral overlap of ZincBY-4 with TubulinTracker Green in the MII egg. There is virtually no ZincBY-4 emission detected in the 495-530 nm emission channel, however there is a small amount of TubulinTracker Green emission detected in the 590-750 nm emission channel. All images were acquired using the same laser and detector settings. Scale bar is 20 µm.

Figure 25:
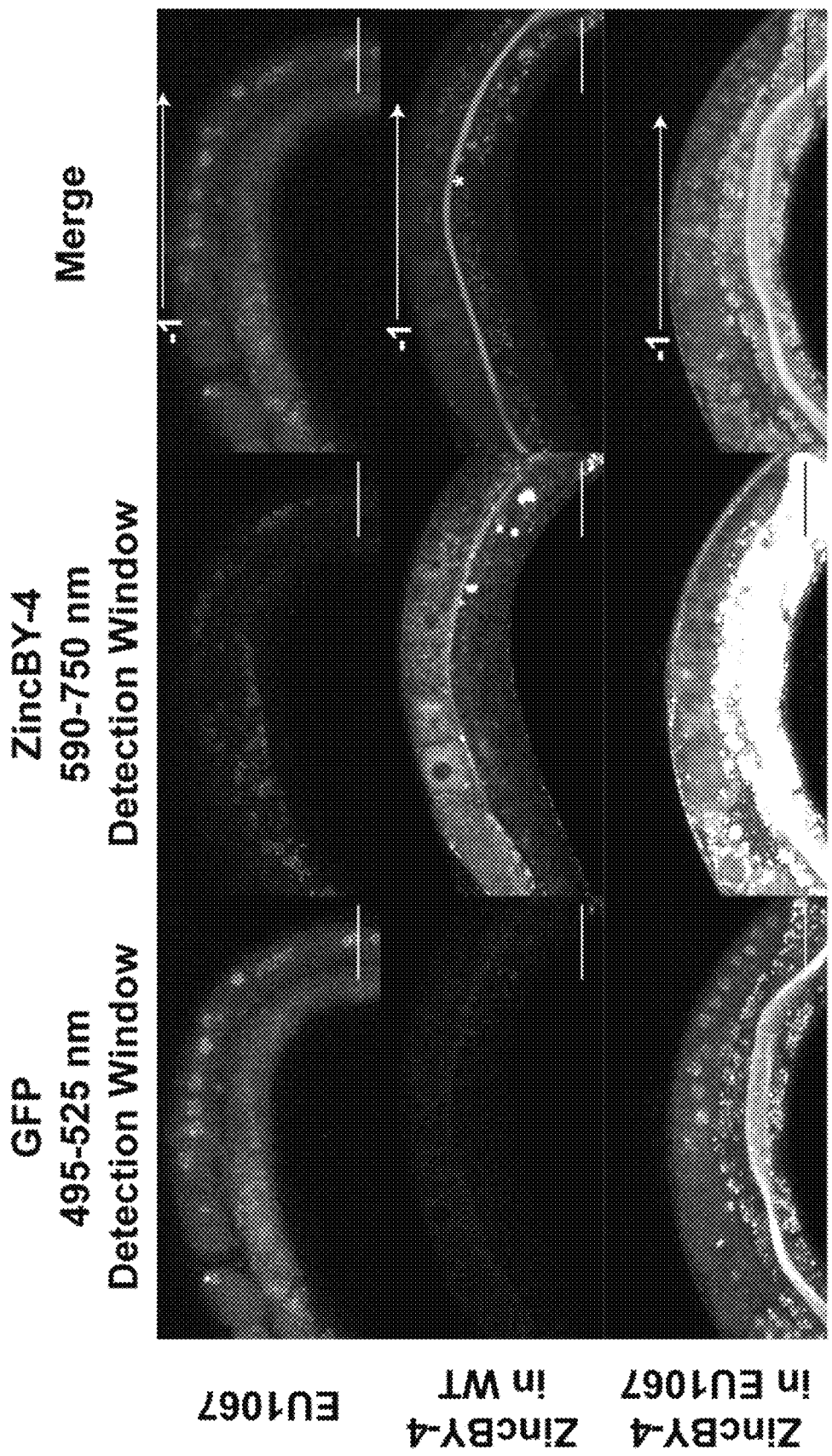

FIG. 25. Maximum image projections of comparison of the spectral overlap of ZincBY-4 with GFP::Histone and GFP::Tubulin in *C. elegans*. There is a small amount of ZincBY-4 emission detected in the 495-530 nm emission channel and a small amount of GFP emission detected in the 590-750 nm emission channel. All images were acquired using the same laser and detector settings. Scale bar is 20 µm.

Figure 26:
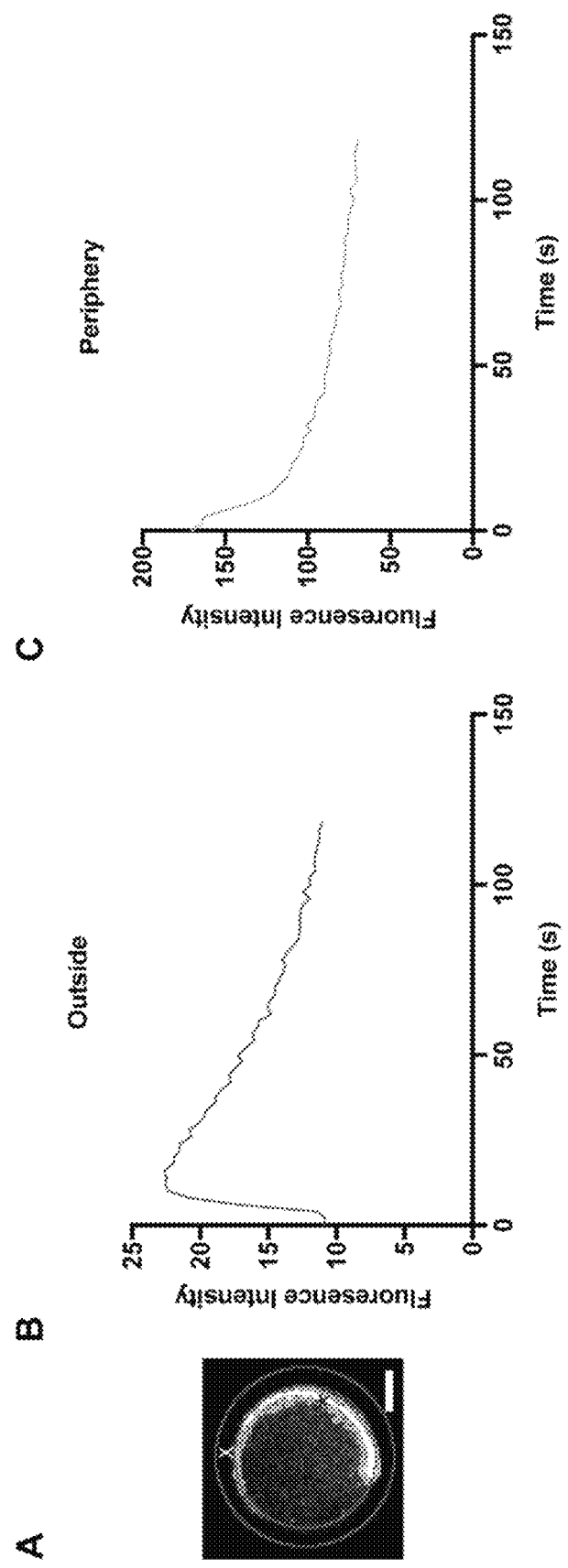

FIG. 26, panels A-C. Analysis of regions of interest of an MII egg loaded with ZincBY-4 and chemical activated to mimic fertilization and stimulate zinc release without normalization. (A) The regions of interest analyzed with the outside (outlined in red, denoted by X) and periphery (outlined in blue, denoted by *) highlighted. Scale bar is 20 µm. (B, C) Graphs depicting the changes in fluorescence intensity in the region outside (B) the egg and the periphery region (C) of the egg. Data is not normalized.

DETAILED DESCRIPTION

Provided herein is a class of zinc-responsive probes with tunable photophysical properties that can be modified for coupling to a solid support or other chemical moieties. In particular, modifications to the 5-position of the BODIPY core allows for alteration of probe properties and functionalities.

The present invention relates to ZincBY zinc sensors, fluorescent probe for zinc based on a BODIPY core. ZincBY zinc sensors are a family of zinc sensors whose photophysical properties can be tuned through changes to the 5-position pendant chain. In some embodiments, ZincBY zinc sensors comprise:

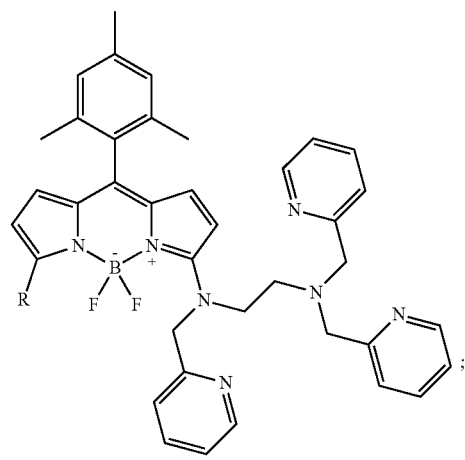

wherein R is selected from H, alkyl (e.g., methyl, ethyl, propyl, butyl, pentyl, hexyl etc.), substituted alkyl (e.g., alkyl with O, S, or NH substituted for one or more CH$_2$ groups), branched alkyl (e.g., isopropyl, isobutyl, isopentyl, isohexyl etc.), substituted branched alkyl (e.g., alkyl with O, S, or NH substituted for one or more $CH_2$ groups), hydroxy, alkoxy, amine, substituted amine, alkylamine, substituted alkylamine, thioalkyl, alkylthioalkyl, azide, cyanide, thioalkyl, ether, ester, thiol, thioether, amino hydroxyl, halogen, ketone, carboxyl, amide, substituted amide, alkylamide, substituted alkylamide, cyano, sulfonyl, carboxy, dialkylphosphine oxide, and combinations thereof. In some embodiments, R is not —O—$CH_3$.

In some embodiments, R is selected from: OH, $O(CH_2)_{1-6}CH_3$, $O(CH_2)_{1-4}HC(CH_3)_2$, $O(CH_2)_{0-6}N_3$, $O(CH_2)_{0-6}CN_3$, $O(CH_2)_{0-6}CN$, $O(CH_2)_{0-6}NH_2$, $O(CH_2)_{0-6}NHC(O)CH_3$, $O(CH_2)_{0-6}NHC(O)OH$, $O(CH_2)_{0-6}NHC(O)SH$, $O(CH_2)_{0-6}CH_2Cl$, $O(CH_2)_{0-6}CHCl_2$, $O(CH_2)_{0-6}CCl_3$, $O(CH_2)_{0-6}CH_2Br$, $O(CH_2)_{0-6}CHBr_2$, $O(CH_2)_{0-6}CBr_3$, $O(CH_2)_{0-6}CH_2F$, $O(CH_2)_{0-6}CHF_2$, $O(CH_2)_{0-6}CF_3$, SH, $S(CH_2)_{0-6}CH_3$, $S(CH_2)_{1-4}HC(CH_3)_2$, $S(CH_2)_{0-6}N_3$, $S(CH_2)_{0-6}CN_3$, $S(CH_2)_{0-6}CN$, $S(CH_2)_{0-6}NH_2$, $S(CH_2)_{0-6}NHC(O)CH_3$, $S(CH_2)_{0-6}NHC(O)OH$, $S(CH_2)_{0-6}NHC(O)SH$, $S(CH_2)_{0-6}CH_2Cl$, $S(CH_2)_{0-6}CHCl_2$, $S(CH_2)_{0-6}CCl_3$, $S(CH_2)_{0-6}CH_2Br$, $S(CH_2)_{0-6}CHBr_2$, $S(CH_2)_{0-6}CBr_3$, $S(CH_2)_{0-6}CH_2F$, $O(CH_2)_{0-6}CHF_2$, $S(CH_2)_{0-6}CF_3$, $NH_2$, $NH(CH_2)_{1-6}CH_3$, $O(CH_2)_{1-4}HC(CH_3)_2$, $NH(CH_2)_{0-6}N_3$, $NH(CH_2)_{0-6}CN_3$, $NH(CH_2)_{0-6}CN$, $NH(CH_2)_{0-6}NH_2$, $NH(CH_2)_{0-6}NHC(O)CH_3$, $NH(CH_2)_{0-6}NHC(O)OH$, $NH(CH_2)_{0-6}NHC(O)SH$, $NH(CH_2)_{0-6}CH_2Cl$, $NH(CH_2)_{0-6}CHCl_2$, $NH(CH_2)_{0-6}CCl_3$, $NH(CH_2)_{0-6}CH_2Br$, $NH(CH_2)_{0-6}CHBr_2$, $NH(CH_2)_{0-6}CBr_3$, $NH(CH_2)_{0-6}CH_2F$, $NH(CH_2)_{0-6}CHF_2$, and $NH(CH_2)_{0-6}CF_3$.

In some embodiments, R is O(CH2)2R', wherein R' is selected from H, CH3, OH, NH2, SH, N3, CN, NHC(O)CH3, CN3, NHC(O)OH, NHC(O)SH, Cl, Br, F, $CH_2Cl$, $CH_2Br$, $CH_2F$ $CHCl_2$, $CHBr_2$, $CHF_2$, $CCl_3$, $CBr_3$, and $CF_3$. In some embodiments, the zinc-responsive probe is selected from:

ZincBY-2

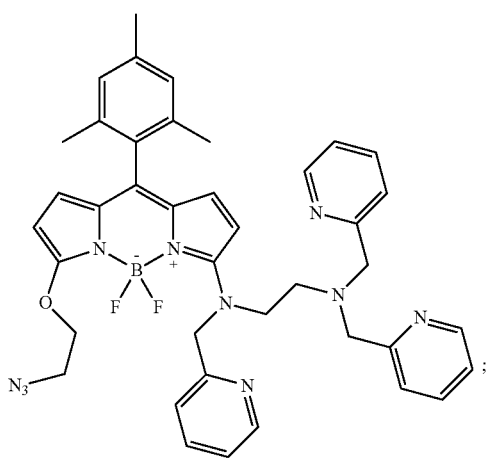

ZincBY-3

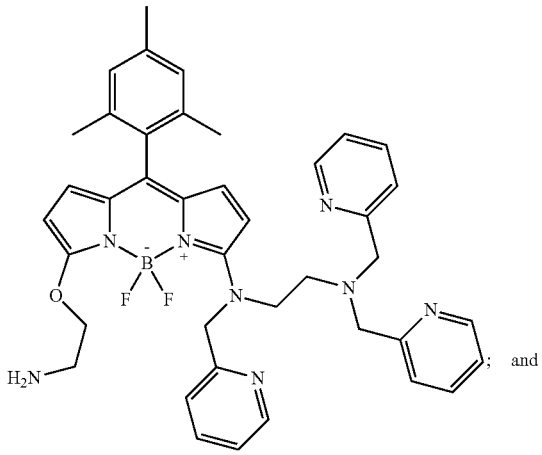

; and

ZincBY-4

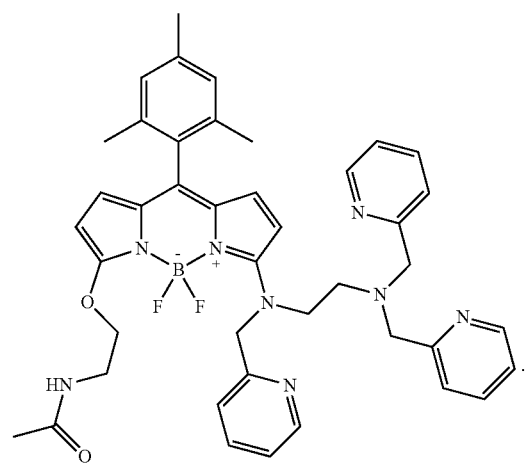

.

In some embodiments, ZincBY class sensors comprise an R or R' group that allows for attachment to a solid surface (e.g., glass surface (e.g., slide), bead, particle, etc.) or functional group (e.g., nucleic acid molecule, an amino acid, a peptide, a receptor protein, a glycoprotein, an antibody, a lipid, a hapten, a receptor ligand, a fluorophore, a drug, a toxin, an affinity molecule (e.g., biotin, etc.), etc.). In some embodiments, provided herein are ZincBY class sensors linked (e.g., directly or via a suitable linker group (e.g., alkyl, PEG, peptide, etc.)).

In some embodiments, methods are provided for monitoring zinc (e.g., concentration, localization, etc.) within a sample. In some embodiments, a ZincBY class sensor is administered to a sample, the sample is exposed to a wavelength of light within the absorbance spectrum of the ZincBY class sensor, and light within the emission spectrum of the ZincBY class sensor is detected. In some embodiments, a range of wavelengths (e.g., encompassing the emission spectra of the zinc-bound and zinc-unbound sensor) is detected. In some embodiments, discrete wavelengths are detected (e.g., wavelengths corresponding to zinc-bound and zinc-unbound sensor (e.g., maxima of the bound and unbound forms, wavelengths that reduce interference from overlap of the spectra of the zinc-bound and zinc-unbound forms). In some embodiments, emission from the sensor is monitored over time. In some embodiments, emission is monitored at time points over a time span (e.g., 30 seconds, 1 minute, 2 minutes, 3 minutes, 4 minutes, 5 minutes, 6 minutes, 10 minutes, 20 minutes, 30 minutes, 45 minutes, 60 minutes, 2 hours, 4 hours, 6 hours, 12 hours, 1 day, 2 days, 3 days, 4 days, 5 days, 6 days, 8 days, 10 days, or longer). In some embodiments, emission is monitored in real time over a time span (e.g., 30 seconds, 1 minute, 2 minutes, 3 minutes, 4 minutes, 5 minutes, 6 minutes, 10 minutes, 20 minutes, 30 minutes, 45 minutes, 60 minutes, 2 hours, 4 hours, 6 hours, 12 hours, 1 day, 2 days, 3 days, 4 days, 5 days, 6 days, 8 days, 10 days, or longer). In some embodiments, a 2D image or 3D construction of light from the sensors is obtained.

In some embodiments, the ZincBY class sensors herein are used to monitor zinc concentration and/or localization within a sample. In some embodiments, the sample comprises cells. In some embodiments, cells are contacted with the sensor. In some embodiments, the sensor is cell permeable and enters the cells. In some embodiments, the sensors bind to zinc ions around and/or within the cell and monitoring emission from the sensors provides a mechanism for detection the concentrations and localization of zinc. In some embodiments, a sample is a tissue or organ. In some embodiments, a sample comprises a whole organism and the sensor allows for determining local concentrations (or changes in concentration) or zinc within the organism.

ZincBY-2 and ZincBY-3 possess chemical groups at the end of the 5-position pendant chain that allows for coupling to the surface of a glass slide or to other chemical moieties, allowing for the creation of an extracellular zinc probe. ZincBY-4 can be used at 50 nM concentration where other probes require micromolar amounts, which can negatively impact metal homeostasis. ZincBY-2 and ZincBY-3 can be conjugated to a surface or other chemical moieties, something not possible with commercially available probes. ZincBY-4 has a large Stokes shift (ca 100 nm) in cells, allowing it to be used in conjunction with other probes with single excitation wavelength. ZincBY-4 and ZincBY-3 have a tighter affinity for zinc compared to other probes (sub-nanomolar), allowing it to be used to detect pools of zinc that are tightly bound to cofactors.

A BODIPY-based zinc probe, ZincBY-1, has been reported that is useful at working concentrations that are 20-200-fold lower than concentrations employed with other existing probes. To better understand how zinc pools can be visualized at such low probe concentrations, the photophysical properties of the ZincBY-1 probe were modulated, for example, via changes at the 5-position of the BODIPY core. One of these exemplary probes, ZincBY-4, exhibits an order of magnitude higher affinity for zinc, an 8-fold increase in brightness in response to zinc, and a 100 nm Stokes shift within cells. The larger Stokes shift of ZincBY-4 provides the capability of simultaneous imaging with other fluorescent (e.g., GFP or fluorescein) or luminescent (e.g., luciferases) reporters upon single excitation. Finally, by creating a proxy for the cellular environment in spectrometer experiments conducted during development of embodiments herein demonstrate that the ZincBY series or probes are highly effective at concentrations, such as 50 nM (e.g., 10-100 nM (e.g., 10 nm, 20 nm, 30 nm, 40 nm, 50 nm, 60 nm, 70 nm, 80 nm, 90 nm, 100 nm, or ranges therebetween)), because they can pass membranes and accumulate in regions of high zinc concentration within a cell. These features of the ZincBY probe class have widespread applications, for example, in imaging and for understanding the regulatory roles of zinc fluxes in live cells.

Fluctuations in zinc availability play a wide number of roles across the life cycle of a cell. A significant proportion of intracellular Zn(II) is bound to metalloenzyme active sites that can have quite long half-lives for chemical exchange or dissociation. The zinc ions in these sites are described as having 'catalytic' or 'structural' roles; however, a growing number of studies indicate a third functional category: i.e., regulatory roles wherein biology uses transient fluctuations in Zn(II) localization to regulate large scale processes including insulin secretion, immune response, neurological signaling, meiotic cell cycle, and fertilization (Refs. A1-A5; incorporated by reference in their entireties). In order to study these fluctuations, a significant number of zinc-responsive fluorescent probes have been developed based on both small molecule and fluorescent protein scaffolds (Refs. A6-A10; incorporated by reference in their entireties). These probes have strengths and weaknesses (Refs, A6, A8-A9; incorporated by reference in their entireties); however, a major limitation of previously existing small molecule probes is that the working concentrations required to load the probe into a cell can perturb the biological event(s) under evaluation.

This limitation of zinc probes is particularly apparent in studies of zinc fluctuations that regulate cell cycle progression in the female gamete, i.e. the egg, where addition of an intracellular chelator can induce parthenogenesis (Refs. A11-A14; incorporated by reference in their entireties). A number of studies have shown that subcellular fluctuations in zinc availability during cell cycle progression are essential for the maturation of the egg and, after fertilization, for proper embryo development. Zinc gain and loss is required for the normal transitions of oocyte to egg to embryo (refs. A11-A13, A15; incorporated by reference in their entireties). During the egg to embryo transition zinc is lost from the egg in exocytotic bursts termed zinc sparks (Refs. A11, A16-A17; incorporated by reference in their entireties). Using a new zinc probe, ZincBY-1, Que et al showed that zinc loss occurred from a system of thousands of vesicles at the periphery of the egg that contain high concentrations of labile zinc (Ref. A18; incorporated by reference in its entirety). Upon fertilization, these cortical vesicles fuse with plasma membrane of the egg, releasing billion zinc ions and temporarily raising the zinc concentration in the egg envelope up to 500 µM (Ref. A19; incorporated by reference in its entirety). The vesicles containing this large pool of labile zinc correspond to cortical granules, as shown by co-localization of ZincBY-1 with ovastacin, a zinc metalloprotease that is known to be released during cortical granule exocytosis (Ref. A20; incorporated by reference in its entirety).

While ZincBY-1 has similar photophysical properties to a variety of zinc probes, it can be used to reveal the localization of labile zinc stores at nanomolar working concentrations (Ref. A18; incorporated by reference in its entirety). This contrasts with many other probes that require cells to be incubated at micromolar concentrations, which could negatively impact the metal homeostasis of the cell (Refs. A21-A22; incorporated by reference in their entireties). It has been contemplated that ZincBY-1 specifically localizes to regions of labile zinc, such as the cortical granules of the mammalian egg (Ref. A18; incorporated by reference in its entirety). Other zinc probes tested within the mammalian egg were unable to visualize zinc within vesicles at a 50 nM working concentration (Ref. A18; incorporated by reference in its entirety).

One of the challenges in utilizing ZincBY-1 in imaging experiments alongside other probes is its narrow Stokes shift of 11 nm (Ref. A18; incorporated by reference in its entirety). In order to avoid scattered light from the excitation beam from interfering with the emission signal, the emission detection range must be selected sufficiently far away from the excitation wavelength. This reduces the strength of the fluorescence signal, leading to a decrease in the signal to noise. Substituents at the 5-position of the boron-dipyrromethane core (BODIPY, see Scheme 1) modulate the photophysical properties of probes. A red-shift in fluorescence and long Stokes-shift for BODIPY fluorophores have been observed upon the addition of bulky aryl substituents, increase in conjugation through alkynyl groups, or fusion with other aromatic groups (Refs. 23-26; incorporated by reference in their entireties). In order to optimize the photophysical properties of ZincBY probes, experiments were conducted during development of embodiments herein to substitute the methoxy group at the 5-position of the BODIPY core with an ethoxy group with a terminal amide. It was contemplated that alterations of the BODIPY core which lead to changes in the hydrophobicity of the molecule could provide insight into how ZincBY-1 is able to visualize zinc in living cells with only a 50 nM incubation concentration.

Provided herein is the synthesis, photophysical characterization, and utility of zinc probes (e.g., ZincBY probes (e.g., ZincBY-2, ZincBY-3, ZincBY-4)) obtained via modification of the 5-position of the BODIPY core. By analyzing substituents that possesses a terminal azide, amine, or acetamide (e.g., ZincBY-2, ZincBY-3, and ZincBY-4 respectively) it was demonstrated that these probes avidly concentrate and are electrostatically trapped in compartments of the cell that are otherwise enriched in labile zinc. Furthermore, favorable attributes of, for example, the ZincBY-4 probe, arise from the formation of a hydrogen bond between the amide hydrogen of the pendant chain at the 5-position and one or both of the fluorine atoms of the $BF_2$ center. This intramolecular hydrogen bond constrains the geometry, alters the basicity of the exocyclic nitrogen, increases the zinc affinity, and increases the Stokes shift. The increase in Stokes shift allows for simultaneous imaging of static zinc pools or zinc fluxes with green fluorescent sensors in live cells, increasing the utility of the ZincBY series.

Using the ZincBY series of zinc specific probes having variations in the 5-position of the BODIPY core of ZincBY-1, the photophysical properties of ZincBY probes is understood (although an understanding of the mechanism is not required to practice the subject matter herein) and can be used for imaging intracellular zinc fluxes in live-cell imaging experiments. Modifications at the 5 position altered the photophysical properties of the BODIPY in a way that facilitates an expanding number of applications. One derivative, ZincBY-4 displayed a large Stokes shift and higher zinc affinity, making it more suitable for detection of zinc within live cells simultaneously with other green fluorescent probes. Through HOESY NMR and computational studies, it was demonstrated that the amide proton has significant interactions with the fluorine atoms in the $BF_2$ moiety at the BODIPY core. These interactions change the resonance stabilization and fluorescence properties. CHELPG analysis of ZincBY-4 reveals that intramolecular hydrogen bond influences the electronic structure of the BODIPY core in a manner that leads to significantly more electron density on the exocyclic nitrogen at the 3b position, thereby increasing the binding affinity for zinc. The large Stokes shift in ZincBY-4 could arise from an intramolecular hydrogen bond in the excited state, which can be broken due to a change in geometry, as is typical for an ICT based probe. A relaxation of the geometry to restore the hydrogen bond results in a loss of energy and increasing Stokes shift (Ref. A52; incorporated by reference in its entirety). Modification to the core of the BODIPY that promote intramolecular hydrogen bonds to the boron-center provide a way to alter the photophysical properties of the fluorophore without adding additional steric bulk or increasing the hydrophobicity of the fluorophore provide an interesting avenue to explore for further probe design.

Figure 3:
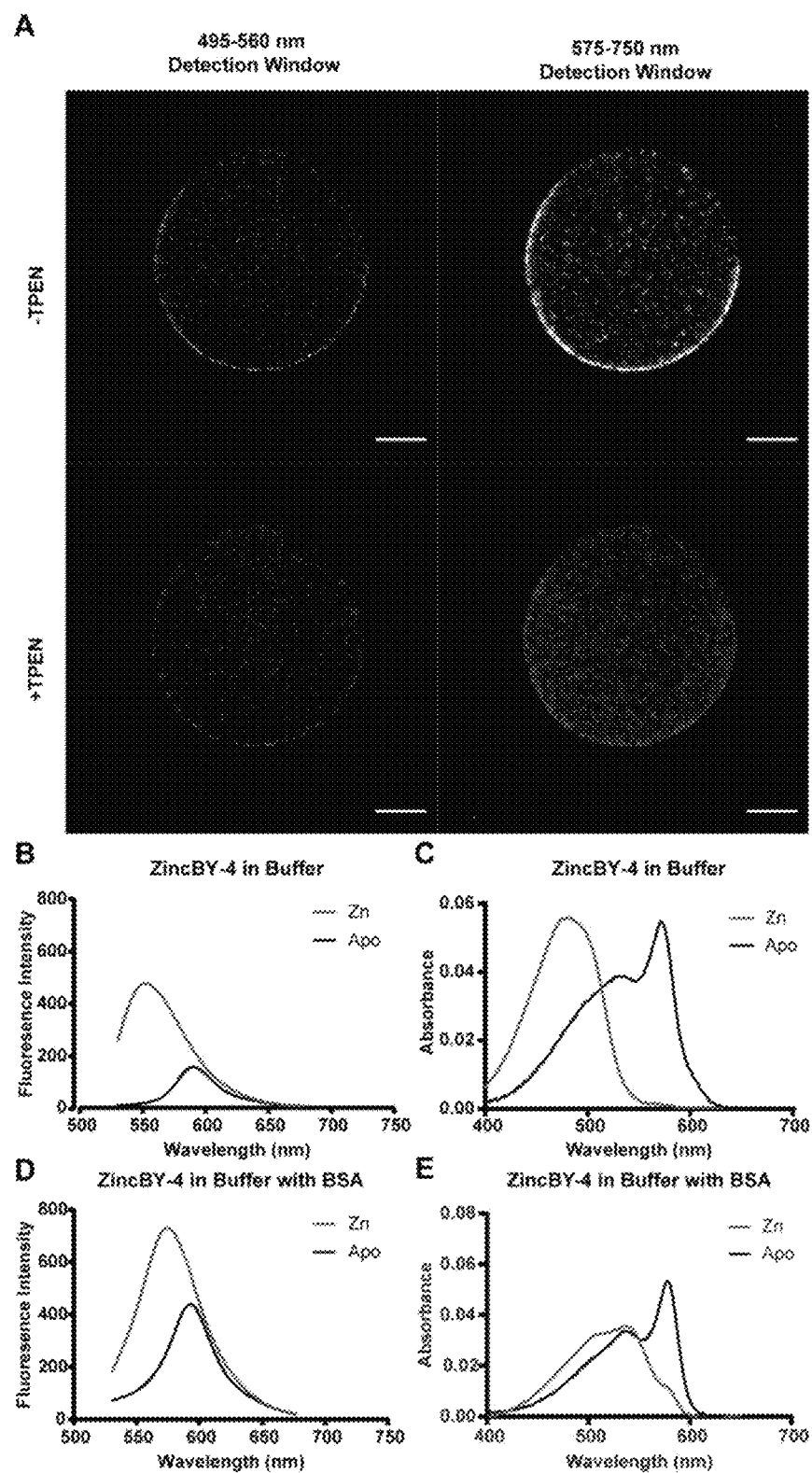
FIG. 3, panels A-E. Probing zinc distribution with ZincBY-4 in the MII egg. (A) MII eggs were incubated with ZincBY-4 (50 nM) for 10 minutes and then their fluorescence images were taken upon excitation with a 488 nm laser in and a 2 µm optical section. In contrast to the expectation that the emission of the holo probe would be observed in 495-560 nm, the probe exhibited strong fluorescence emission in 575-750 nm. Addition of TPEN (5 µM) led to a loss of fluorescence signal in the vesicle region. Scale bar is 20 µm. (B-E) To determine if ZincBY-4 interacts with proteins, the emission (B, D) and absorbance (C, E) spectra of ZincBY-4 (200 nM) were measured in the absence (B, D) and presence (C, E) of BSA (10 mg/mL) in buffer. The presence of BSA red-shifted the emission maximum wavelength from 537 nm to 575 nm.

These results provide additional rationale that help explain the differences between the observed photophysical properties of ZincBY-4 observed in cells and in the cuvette. Several of the intracellular properties of ZincBY-4 can be replicated in vitro by either providing non-specific protein interactions (e.g., addition of BSA) or by moving to a lower dielectric solvent. Similar effects of non-specific binding to BSA were observed for ZincBY-1 as well. The apo and holo spectra of ZincBY-1 are very close in emission maximum wavelength and intensity, indicating that within a hydrophobic environment, the apo probe is potentially indistinguishable from the holo one. Data indicates that the loss of fluorescence upon TPEN treatment removes zinc from the probe in cells, allowing the neutral apo form to diffuse throughout the rest of the cell. Additionally, while the fluorescence of apo-ZincBY-1 matches that of holo-ZincBY-1 in the presence of BSA, holo-ZincBY-4 shows a two-fold increase in fluorescence intensity over its apo form, highlighting another advantage of ZincBY-4 over ZincBY-1 (FIG. 3). Unlike ZincBY-1, ZincBY-4 can be excited at 488 nm. Due to the large Stokes shift of ZincBY-4, it can be used in conjunction with fluorescent proteins such as GFP in a variety of experiments that test for co-localization. This property was demonstrated by our ability to excite both GFP and oregon green 488 and ZincBY-4 in *C. elegans* oocytes and *M. musculus* eggs with little spectral overlap. Simultaneous detection opens the avenue for greater temporal precision in live cell experiments to examine how zinc interacts with other factors that can be detected by GFP or another green fluorescent sensor.

Experimental

Results

Synthesis and Characterization of new ZincBY Probes. The synthetic approach to this series of zinc probes is shown in Scheme 1. ZincBY-1 (1) was synthesized by the attachment of a trispicen chelator (8) to a 3-chloro-5-meothxy-8-mesityl-BODIPY core (Ref. A18; incorporated by reference in its entirety). ZincBY-2 (2), ZincBY-3 (3), and ZincBY-4 (4) were synthesized by first substituting 2-azidoethanol (6) at the 5 position of 3,5-dichloroBODIPY (5) to create the asymmetric BODIPY, 7. ZincBY-2 was formed by substitution of trispicen (8) for Cl at the 3-position of 7. Staudinger reduction on the azide of ZincBY-2 to a primary amine was accomplished using trimethylphosphine, resulting in ZincBY-3. Capping of the primary amine of ZincBY-3 with acetic anhydride yielded ZincBY-4.

Scheme 1.
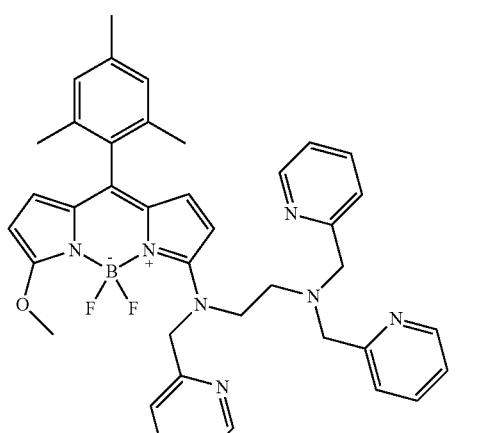
1
ZincBY-1
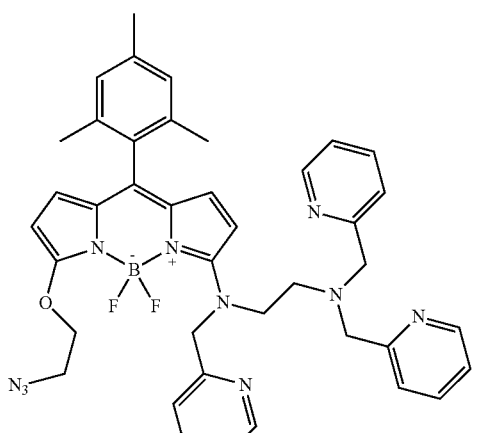
2
ZincBY-2
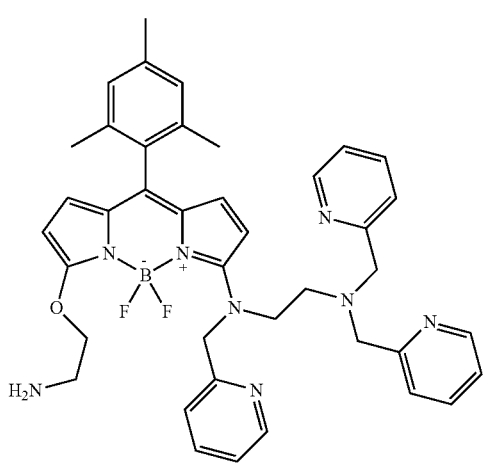
3
ZincBY-3
A
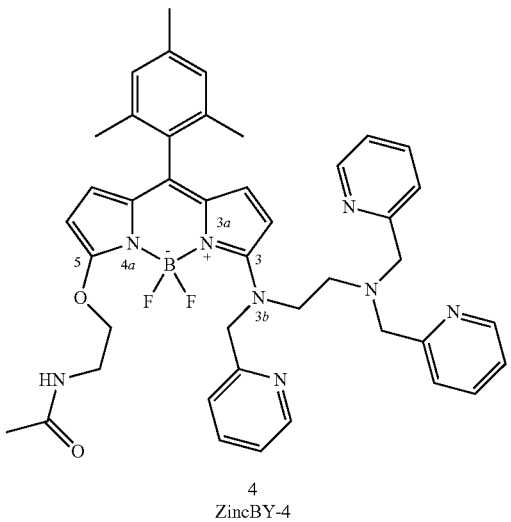
4
ZincBY-4
B
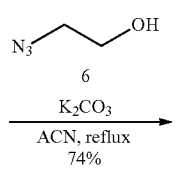
5
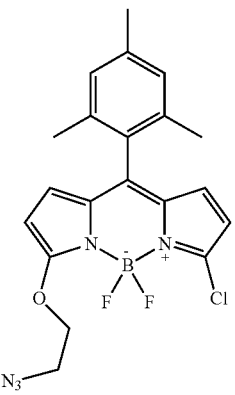
7
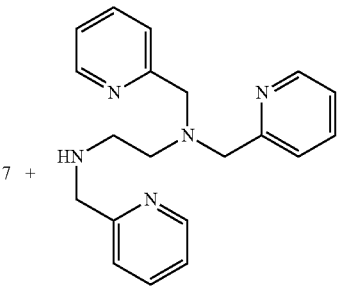
7 +

-continued

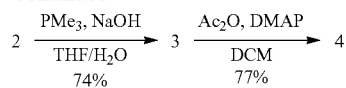

Figure 1:
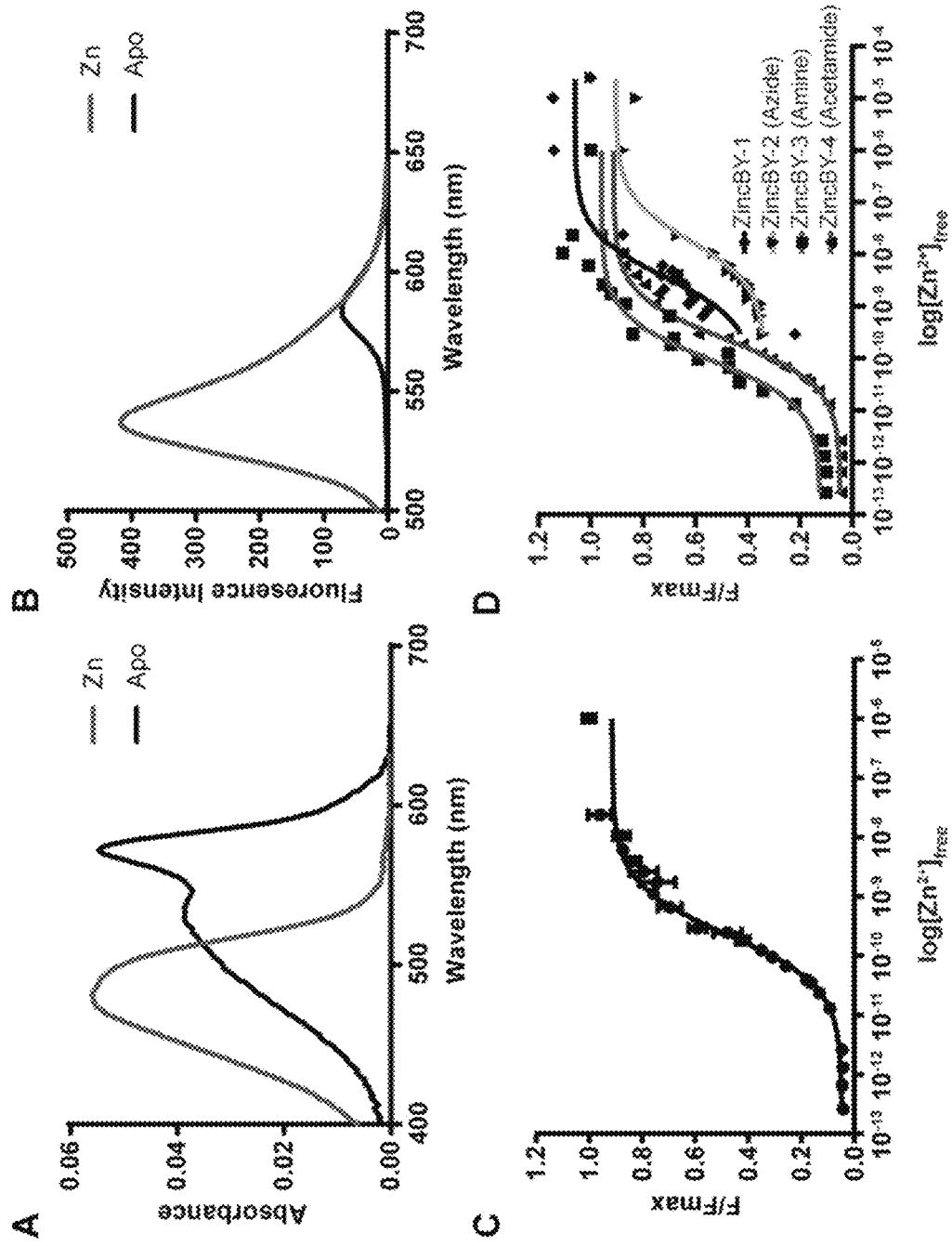
FIG. 1, panels A-D. Photophysical properties of ZincBY-4. (A) UV/Visible spectrum of holo and apo ZincBY-4 probe (200 nM) in aqueous buffer. (B) Emission spectrum of holo- and apo-ZincBY-4 (200 nM) in aqueous buffer. (C) Determination of the zinc dissociation constant (228.7±18.4 µM) of ZincBY-4 in a buffered EGTA-Zinc solution. (D) Fitted titration curves gave zinc dissociation constants of 3.72±0.87 nM for ZincBY-1 (2.6 nM reported),[16] 18.1±2.6 nM for ZincBY-2 and 97.7±26.1 µM for ZincBY-3.

(A) Structures of ZincBY-1, ZincBY-2, ZincBY-3, and ZincBY-4. Carbons 3 and 5 of the BODIPY core, and nitrogens 3a, 3b, and 4a are indicated on ZincBY-4.
(B) Synthetic scheme detailing the synthesis of ZinBY-2, -3, -4. Full synthetic details are available in Supporting Information To compare the quantum yields and extinction coefficients across the series, these values were remeasured for ZincBY-1 and a 10-fold higher brightness was found for both the apo and holo states compared to the originally reported values (Table 2), however the absorption and emission wavelengths (533 nm and 543 nm respectively) and turn-on ratio (ca. 5-fold) were the same (Ref. A18; incorporated by reference in its entirety). The apo form of ZincBY-4 has absorption peaks at 482 and 570 nm and an emission maximum at 585 nm, while the holo form has a single absorption maximum at 482 nm and emits at 537 nm (when excited at 480 nm) (FIG. 1).

TABLE 2

Photophysical properties of the (top) apo-ZincBY and (bottom) Zn-bound ZincBY dyes.

|  | ZincBY-1* | ZincBY-1† | ZincBY-2 | ZincBY-3 | ZincBY-4 |
|---|---|---|---|---|---|
| Apo- | | | | | |
| $\lambda_{Abs\,(max)}$ | 533 nm | 529 nm | 532 nm | 571 nm | 572 nm |
| Extinction Coefficient ($\varepsilon$), $M^{-1}cm^{-1}$ | 1.1(0.05) × 10$^4$ | 2.42(33) × 10$^4$ | 1.42(35) × 10$^4$ | 1.16(4) × 10$^4$ | 0.88(4) × 10$^4$ |
| $\lambda_{Em\,(max)}$ | 560 nm | 559 nm | 566 nm | 585 nm | 585 nm |
| Quantum Yield ($\Phi$) | 0.052(3) | 0.215(5) | 0.164(7) | 0.158(3) | 0.164(4) |
| Brightness ($\varepsilon*\Phi$/1000), $M^{-1}cm^{-1}$ | 0.57(6) | 5.21(72) | 2.35(58) | 1.85(8) | 1.44(7) |
| LogP | ~1.1 | ND | ~1.25 | ~0.15 | ~0.33 |
| Zn- | | | | | |
| $\lambda_{Abs\,(max)}$ | 533 nm | 532 nm | 532 nm | 482 nm | 482 nm |
| Extinction Coefficient ($\varepsilon$), $M^{-1}cm^{-1}$ | 2.0(3) × 10$^4$ | 4.14(33) × 10$^4$ | 2.57(35) × 10$^4$ | 2.21(5) × 10$^4$ | 2.12(4) × 10$^4$ |
| $\lambda_{Em\,(max)}$ | 543 nm | 543 nm | 552 nm | 537 nm | 537 nm |
| Quantum Yield ($\Phi$) | 0.13(2) | 0.651(18) | 0.529(22) | 0.562(11) | 0.574(11) |
| Brightness ($\varepsilon*\Phi$/1000), $M^{-1}cm^{-1}$ | 2.6(5) | 26.97(2.30) | 13.58(1.93) | 12.42(36) | 12.15(34) |

The quantum yield of ZincBY-4 in the apo form is 0.164, 5% lower compared to ZincBY-1. In the holo form, the quantum yield of ZincBY-4 is 0.574, 10% lower compared to ZincBY-1. In addition, the extinction coefficients are also approximately half that of ZincBY-1 (Table 1). The lower quantum yields and extinction coefficients of ZincBY probes with substituents other than methoxy at the 5-position result in less brightness compared to ZincBY-1; however, there is a greater fluorescence turn-on in the presence of zinc for ZincBY-4 (8.4) compared to ZincBY-1 (5.2) in aqueous buffered solutions. Full characterization details for ZincBY-2 and ZincBY-3 are provided in the Table 2 and Figures ***S10-S13) while a comparison of the photophysical properties of ZincBY-1 and ZincBY-4 is in Table 1. Results indicate that the higher quantum yield of ZincBY-1 relative to the other family members arises from a smaller contribution of charge transfer in excited state of ZincBY-1 (vide infra).

TABLE 1

Comparison of the photophysical properties of ZincBY-1 and ZincBY-4.

|  | Apo-ZincBY-1 | Apo-ZincBY-4 | Zn-ZincBY-1 | Zn-ZincBY-4 |
|---|---|---|---|---|
| $\lambda_{Abs\,(max)}$ | 529 nm | 572 nm | 532 nm | 482 nm |
| Extinction Coefficient ($\varepsilon$), $M^{-1}cm^{-1}$ | 2.42(33) × 10$^4$ | 0.88(4) × 10$^4$ | 4.14(33) × 10$^4$ | 2.12(4) × 10$^4$ |
| $\lambda_{Em\,(max)}$ | 559 nm | 585 nm | 543 nm | 537 nm |
| Quantum Yield ($\Phi$) | 0.215(5) | 0.164(4) | 0.651(2) | 0.562(11) |
| Brightness ($\varepsilon*\Phi$/1000), $M^{-1}cm^{-1}$ | 5.21(72) | 1.44(7) × 10$^4$ | 26.97(2.30) × 10$^4$ | 12.15(34) × 10$^4$ |

Like ZincBY-1, ZincBY-4 responds preferentially to Zn(II) relative to other biologically relevant metal ions (Figure *S12). While several other families of zinc probes exhibit significant pH-dependent fluorescence changes, neither the holo or apo forms of ZincBY-1 and ZincBY-4 show significant changes in fluorescence in the physiological pH range (pH 4-8). In addition, the presence of 10 mM glutathione (GSH) protected both holo- and apo-ZincBY-4, leading to a retention of 97% and 40% fluorescence intensity respectively after 12 hours, compared to 83% and 7% fluorescence intensity respectively after 12 hours in the absence of GSH (Figure *S12), indicating that ZincBY-4 is sensitive to oxidative damage; however, the presence of GSH in cells should protect the probe from damage. In addition, the Zn(II) bound form of ZincBY-4 is much more stable compared to the apo-ZincBY-4, thus if zinc pools are being monitored with ZincBY-4 over long periods of time, little degradation in fluorescence signal is expected. The zinc affinity of the probes varied widely depending on the substituent attached to the ethoxy group, which is quite removed from the chelation site. While the affinity of the azide substituent decreased the binding to 18.1±2.6 nM, reduction to the amine increased the binding by three orders of magnitude to 97.7±26.1 µM, and acetylation of the amine to the acetamide reduced this binding to 228.7±18.4 µM (FIG. 1).

Mechanistic Analysis of Photophysical Properties. The 180-fold differences in zinc affinities and striking differences in photophysical properties across this series of probes suggests that this pendant arm can exert significant effects on the electronic structure of the BODIPY core. Given that ZincBY-2, ZincBY-3, and ZincBY-4 all share two methylene spacers after the ether linkage at the 5-position in their common BODIPY core, it is unlikely that differences in the terminal groups contribute to any significant inductive effects. One major difference is that the substituents at the 5-position in ZincBY-3 and ZincBY-4 have a terminal amine or amide respectively and can form intramolecular hydrogen bonds to the BODIPY core in contrast to ZincBY-2 with a terminal azide.

It was contemplated the increase in zinc affinity in ZincBY-3 and ZincBY-4 relative to ZincBY-1 and ZincBY-2 arises because of changes in the electron density of the BODIPY core, stabilized by intramolecular hydrogen bond(s) between the amine or amide hydrogen and a fluorine on the BF2 center of the BODIPY fluorophore, increasing the basicity of the exocyclic nitrogen 3b (Scheme 1). Such intramolecular hydrogen bonding to the BF2 center in the BODIPY core has been reported in previous literature and have been demonstrated to increase the Stokes shift in other systems, a phenomenon that was observe in our system as well (Refs A27-A28; incorporated by reference in their entireties). Experiments were conducted during development of embodiments herein to evaluate the changes in photophysical properties, shielding effects on heteronuclei of the BODIPY core and in DFT electronic structure models.

Figure 2:
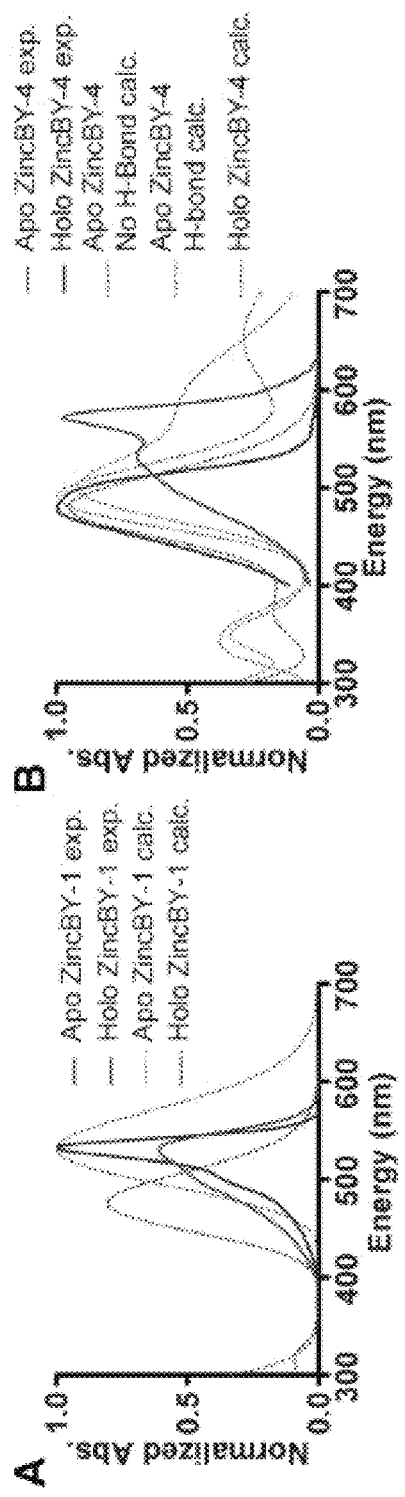
FIG. 2, panels A-C. Computational analysis of ZincBY-1 and ZincBY-4. Comparisons of TD-DFT calculated absorbance spectra utilizing a PBE0 functional compared to the experimentally determined absorbance spectra of (A) ZincBY-1 and (B) ZincBY-4. The calculated spectra for ZincBY-4 were simulated to both enforce (H-bond) and prohibit (no H-bond) hydrogen bonding between the amide and to the $BF_2$ group. (C) Partial charges, indicated in black, of nitrogen 3a, nitrogen 3b, and nitrogen 4a of the BODIPY cores of ZincBY-1, ZincBY-4 without a hydrogen bond ($R_{H-F}$=5.16 Å), and ZincBY-4 with a hydrogen bond ($R_{H-F}$=2.31 Å). Partial charges were calculated using the CHELPG method. ZBY stands for ZincBY.
Figure 2:
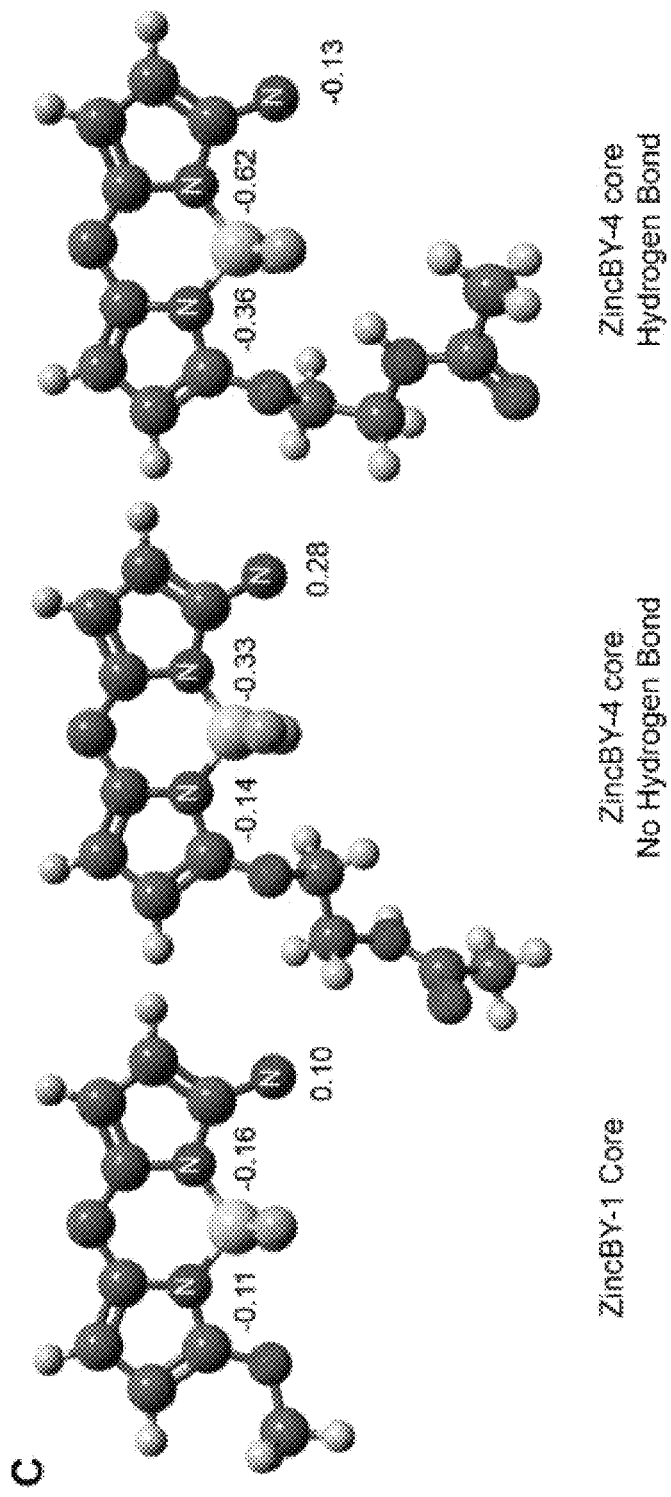

Analysis of the excited state of ZincBY-1 and ZincBY-4 through time dependent density functional theory (TD-DFT) calculations using the PBE0 functional (Ref. A29-A31; incorporated by reference in their entireties) and def2-TZVP basis set (Ref. A32; incorporated by reference in its entirety) indicate that a low energy charge transfer transition is present when the intramolecular hydrogen bond is intact in ZincBY-4; this transition is predicted to be attenuated when no hydrogen bond is present as in ZincBY-1 (FIG. 2). The presence of an intramolecular hydrogen bond does not dramatically alter the HOMO or the LUMO of ZincBY-4 (Figure ***S15). The transitions of the DFT calculations do not accurately match the experimental results.

For ZincBY-1, the DFT calculations show a higher energy transition for the holo form; however, experimentally both the apo and holo forms of ZincBY-1 have a transition at the same energy (FIG. 2). In addition, despite the presence of a low energy charge transfer transition for apo-ZincBY-4 when a hydrogen bond is present, neither of the transitions completely match the experimental results (FIG. 2). Since the PBE0 functional tends to overestimate the absorption energies of BODIPY molecules, experiments were conducted using a range separated ωB97-XD3 functional (Ref. A33; incorporated by reference in its entirety; however, in moving to this method, the charge-transfer transition disappeared (Figure ***S14).

To test whether intramolecular hydrogen bond formation is possible in ZincBY-4, heteronuclear NMR experiments in CD3CN were carried out, as it is a poor hydrogen bond acceptor and is not expected to disrupt intramolecular hydrogen bond formation. Initially, the $^1$H NMR spectrum of ZincBY-4 was fully assigned (Figure *S4). Next, $^{19}$F-$^1$H 2D heteronuclear Overhauser Effect Spectroscopy (HOESY) was employed and found magnetization transfer between the amide proton and the fluorines (Figure *S5): this is consistent with close contact of the amide proton with at least one of the fluorine atoms. Further evidence for an intramolecular hydrogen bond can be seen in shielding trends in the $^{19}$F and $^{11}$B NMR spectra. For ZincBY-1, the peaks of the $BF_2$ moiety peaks are centered at −135.1 ppm for $^{19}$F and 1.02 ppm for $^{11}$B (Figures *S6 and *S8). The $^{19}$F resonance for ZincBY-4 shifts upfield to −141.4 ppm and appears as a broad multiplet instead of the canonical quartet, while a modest downfield shift in the $^{11}$B spectrum to 1.38 ppm is observed (Figures *S7 and *S9). A full analysis of the NMR parameters and solutions analyzed can be found in Tables 3 and 4. These results indicate that there is less π-delocalization occurring within ZincBY-4 compared to ZincBY-1, as similar shifts within BODIPYs was noted previously (Ref. A34; incorporated by reference in its entirety). The upfield shift in the $^{19}$F peak is consistent with the fluorine being involved in a hydrogen bond with the amide hydrogen. The upfield shift further indicates that the $^{19}$F nucleus is a better hydrogen bond acceptor. Similar shift has been reported by other groups investigating hydrogen-bonding to the $BF_2$ center of other BODIPY systems (Refs. A35-A36: incorporated by reference in their entireties). Taken together, these results are consistent with the presence of an intramolecular hydrogen bond between the amide hydrogen and a fluorine on the $BF_2$ moiety of

SUPPLEMENTARY TABLE 3

Metal content analysis by ICP-MS of samples in solutions of acetonitrile-$d_3$

| Sample | Fe (ppb) | Fe (nmols total) | Zn (ppb) | Zn (nmols total) | Dye Amount (nmols) |
|---|---|---|---|---|---|
| Blank (CD$_3$CN) | 3.71 | 0.38 | 8.86 | 0.78 | * |
| ZincBY-1 | 20.22 | 2.12 | 34.76 | 3.11 | 1490 |
| ZincBY-4 | 37.05 | 3.98 | 8.55 | 0.79 | 1350 |

*not determined.

SUPPLEMENTARY TABLE 4

Measured NMR parameters of samples

| Sample | $^{19}$F Peak (ppm) | $^{11}$B Peak (ppm) | $J_{F\text{-}B}$ (Hz) | $^{19}$F $T_1$ (ms) | $^{19}$F $T_1$ (ms) (TPEN) | $^{19}$F $T_2$ (ms) | $^{19}$F $T_2$ (ms) (TPEN) |
|---|---|---|---|---|---|---|---|
| 3,5-dichloroBODIPY | −146.95 | * | 27.3 | 653 | * | 89 | * |
| ZincBY-1 | −135.05 | 1.04 | 33.4 | 775 | 351 | 6.14 | 51 |
| ZincBY-4 | −141.60 | 1.38 | 35.3 | 155 | 290 | 2.66 | 27 |

* parameters not measured.

Based on analysis of electron delocalization, the resonance contributions of various resonance forms of the of the BODIPY 71 system (Scheme 2) are significantly different when this intramolecular hydrogen bond is intact. Alterations to the resonance preference of the BODIPY fluorophore that alter the basicity of the exocyclic nitrogen atom (N 3b) would explain the tighter zinc binding of ZincBY-4 compared to ZincBY-1. For an asymmetric BODIPY such as ZincBY-4, nitrogen 3b is in resonance with the BODIPY core (see structure III in Scheme 2), causing forms II and III to be the major contributors and the formal positive charge shared between nitrogen 3a and nitrogen 3b.[37] Experiments suggest that the intramolecular hydrogen bonding in ZincBY-4 decreases the electron-withdrawing character of the $BF_2$ center of the BODIPY, increasing the resonance contribution of form I and decreasing the resonance contribution of III.

Scheme 2.
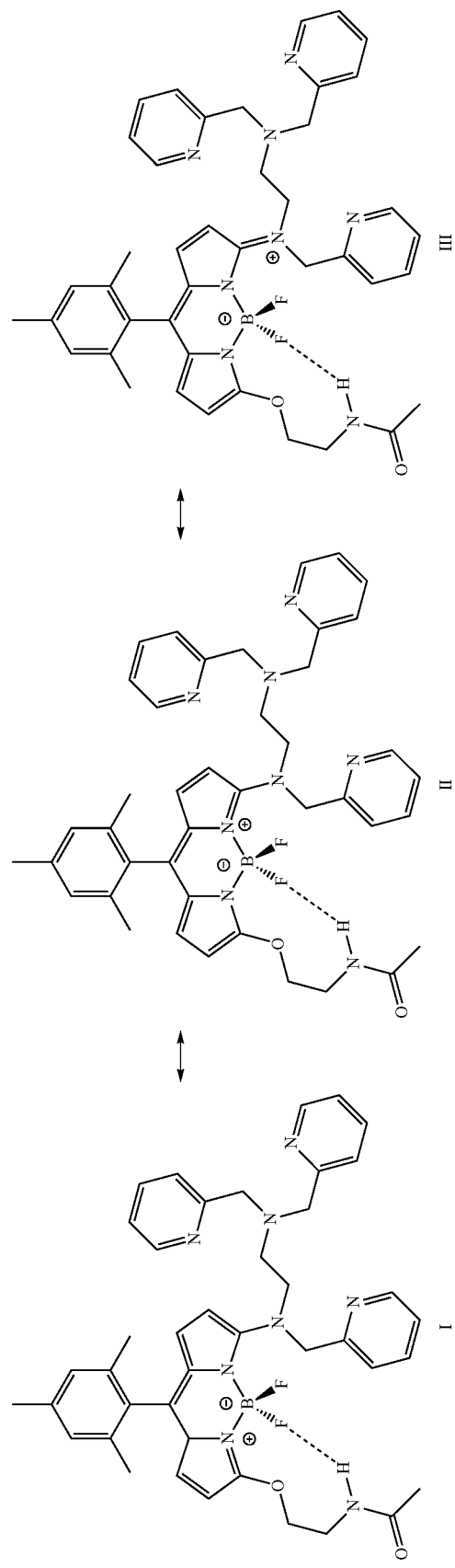
Resonance forms of ZinBY-4. 4. I and II are the generally accepted resonance forms of BODIPY; however, III is also an expected form as shown by a similar analogue (ref. A35; incorporated by reference in its entirety).

A decrease in the contribution from III would lead to an increase in the electron density on nitrogen 3b, which is key for zinc binding. This hypothesis is supported by a DFT analysis of the electronic structure of ZincBY-4 with and without the hydrogen bond. Electron density at the nitrogens was determined by calculating the partial charges through CHarges from Electrostatic Potentials using a Grid-based method (CHELPG; Ref. A38; incorporated by reference in its entirety). The CHELPG analysis revealed that ZincBY-4 with a hydrogen bond results in a 0.41 more negative charge density on nitrogen 3b compared to ZincBY-4 without a hydrogen bond (FIG. 2). The lack of a hydrogen bond in ZincBY-4, also results in a 0.18 more positive charge density compared to ZincBY-1 (FIG. 2). Thus, the presence of an intramolecular hydrogen bond in ZincBY-4 leads to a more negative partial charge on nitrogen 3b, i.e. there is more electron density on nitrogen 3b. An increase in electron density on nitrogen 3b explains the strong binding affinity of ZincBY-4 compared to ZincBY-1.

These insights into the effect of hydrogen bonding on the electronic structure of BODIPY core is consistent with the thermodynamics of zinc binding across the series. The probe with a pendant amine (ZincBY-3) will have a strong coulombic contribution and is anticipated to form the strongest intramolecular hydrogen bonds to the $BF_2$ center. ZincBY-3 has a 38-fold higher affinity for zinc than that of ZincBY-1, while the pendant amide group in ZincBY-4, which has a smaller coulombic contribution, has an affinity that is only 16-fold higher. ZincBY-2, which has a pendant azido group that cannot serve as a hydrogen bond donor, has a five-fold weaker affinity for zinc than that of ZincBY-1. Experiments indicate that the greater bulk of the methylene spacers and azido group in ZincBY-2 relative to the methyl group in ZincBY-1 may partially disrupt hydrogen bonding interactions between the $BF_2$ unit of ZincBY-2 with solvent.

In Cell Imaging with ZincBY-4. Due to the higher zinc affinity and a change in the emission and absorption properties of ZincBY-4 compared to ZincBY-1, ZincBY-1 and ZincBY-4 were compared in head-to-head studies in the mouse egg. When staining MII eggs with ZincBY-4, the photophysical results differed in the cell compared to the previously measured in vitro properties (FIG. 3). Optimal emission from the holo probes at 495-560 nm with a 488 nm excitation ($\lambda_{em,max}$=537 nm in buffer) was expected; however, significant fluorescence signal was observed in the 575-750 nm region. Only ZincBY-4 was readily excited at 488 nm, whereas both probes were excitable at 552 nm (Figure ***S16).

The BODIPY core of the ZincBY series is hydrophobic, and this moiety has a well-established propensity to associate with lipophilic regions of the cells (Ref. A39; incorporated by reference in its entirety). The BODIPY-based probes have been demonstrated to localize to granules in cells and become unresponsive to metal, thus no single probe can effectively image across all organisms (Refs. A40-A42; incorporated by reference in their entireties). When N,N,N',N'-tetrakis(2-pyridinylmethyl)-1,2-ethanediamine (TPEN) was added to MII eggs stained with ZincBY-4, loss in fluorescence was observed (FIG. 3A). It is possible ZincBY-4 is interacting with hydrophobic biopolymers as it binds to zinc, forming a ternary complex. Zinc probes, such as Zinquin, have been shown to form ternary complexes with zinc and proteins and bind to proteins in a non-specific manner in vitro (Refs. A43-A44; incorporated by reference in their entireties). To determine if intracellular proteins affect ZincBY fluorescence in living cells, 10 mg/mL BSA, as a surrogate for the cellular milieu, was added to the buffer used to measure the fluorescence properties of ZincBY-4 in vitro (FIG. 3). While the total protein concentration in a cell is approximately 2.5 mM (Ref. A45; incorporated by reference in its entirety), 10 mg/mL BSA (0.16 mM) was selected as a conservative number to prevent the potential obscuring of fluorescent signal by a high concentration of protein.

In the presence of BSA, the emission maximum of holo-ZincBY-4, excited at 480 nm, shifted from 537 nm to 575 nm, similar to what is observed in living cells. Emission from the apo form, also shifts from 585 nm to 590 nm (FIG. 3B). There is no shift in the absorption maximum of the apo probe; however, the absorbance of holo-ZincBY-4 in the presence of BSA red-shifted giving a broad plateau from 490 nm to 540 nm (FIG. 3C). The apo and holo forms both displayed an increase in polarization from 0.03 to 0.37 in the presence of the excess BSA, indicating that ZincBY-4 binds readily to the lipid transport protein. The same interactions can be found for ZincBY-1, ZincBY-2, and ZincBY-3 as well (Figure *S17). However, while ZincBY-4 still maintained a fluorescence turn-on in response to zinc in the presence of BSA (ca. two-fold), no fluorescence turn-on was observed for ZincBY-1 in the presence of BSA (Figure *S17). Analogous non-specific interactions between ZincBY-4 and lipophilic regions occur inside cells. To better understand these changes further, insights into the photophysical mechanisms of these probes are required.

Figure 4:
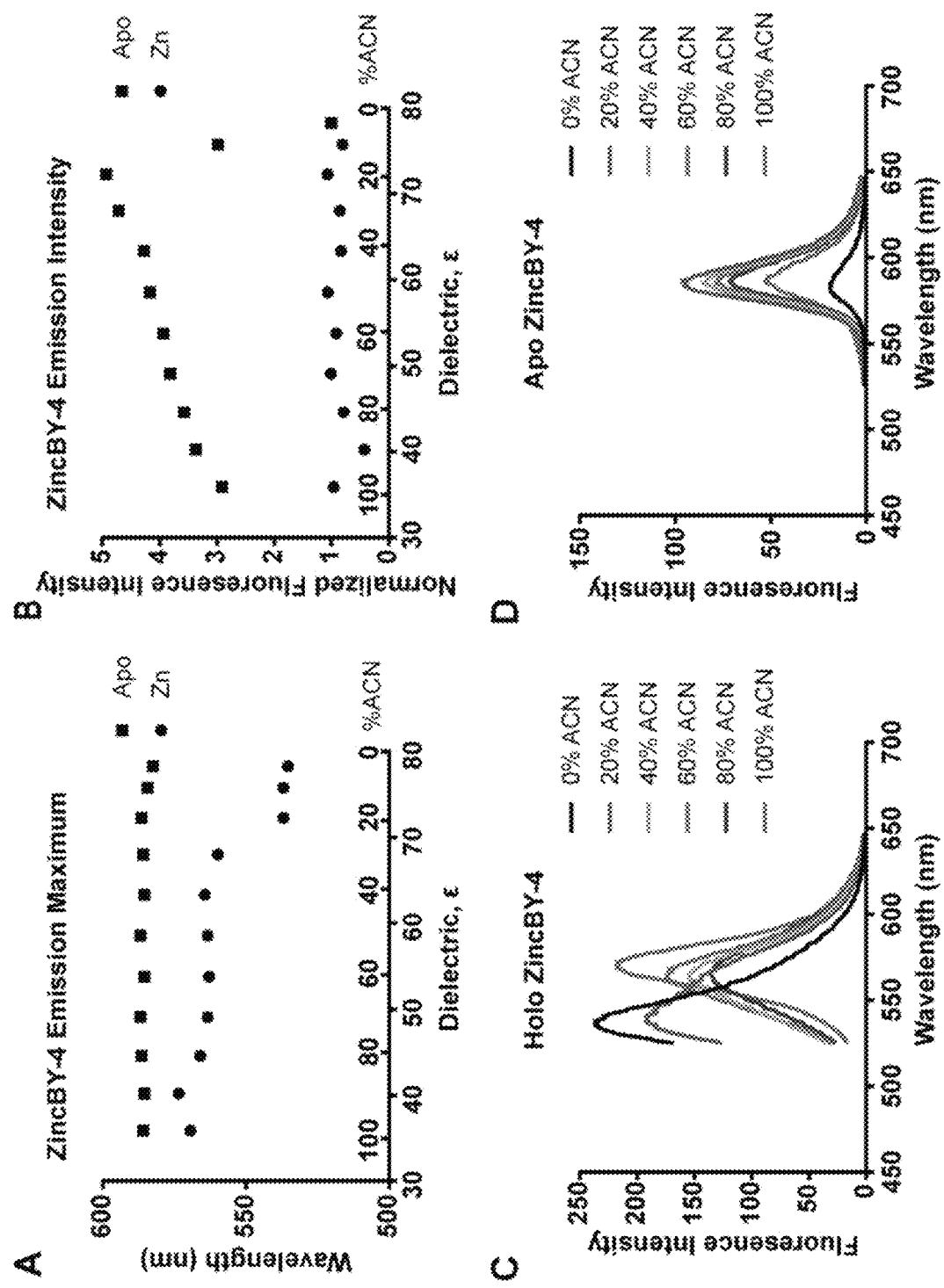
FIG. 4, panels A-D. Photophysical properties of ZincBY-4 in an altered dielectric environment. (A) Emission maximum wavelength and (B) Fluorescence intensity of ZincBY-4 as a function of dielectric constant. The fluorescence intensity was normalized to the fluorescence intensity in 100% water of that condition (F=78). The dielectric constant of solvent was modulated by using a different ratio of water to acetonitrile. (C and D) Fluorescence spectrum of ZincBY-4 (200 nM) in acetonitrile/water mixture with (C) and without zinc.

Mechanisms of Fluorescence. The ZincBY series of probes utilize a BODIPY fluorophore conjugated to a trispicen chelator. The electron pair of the trispicen nitrogen (electron-donating) attached directly to the BODIPY (electron-accepting) is in conjugation with the fluorophore's π system. In polar solvent ZincBY fluorescence is quenched via an intramolecular charge transfer (ICT; Ref. A46-A47; incorporated by reference in their entireties). The fluorescence emission of probes undergoing an ICT mechanism are highly dependent on the solvent (Ref. A48-A49: incorporated by reference in their entireties). To test whether the solvent affects the photophysical properties of the ZincBY-4, the ratio of water to acetonitrile was varied and experiments examined how the fluorescence emission and intensity changed as a function of dielectric constant (FIG. 4).

As the dielectric constant decreases, the emission maximum wavelength of the apo ZincBY-4 does not change, but its holo form undergoes a red shift from 537 nm to 575 nm (FIG. 4A), the same wavelength observed when the probe binds non-specifically to BSA. On the other hand, the fluorescence intensity of the holo form does not change as the dielectric constant changes, but the apo one does change in response to dielectric constant. Hydrogen bonding of the amide to the fluorine (Scheme 2) will become more favorable in a hydrophobic environment due to a lack of interaction with the surrounding solvent. Since the intramolecular hydrogen bond is much more transient in a more polar environment, the Stokes shift is expected to be smaller in water compared acetonitrile, which is observed. Other reports of an intramolecular hydrogen bond to a fluorine of the BODIPY fluorophore also observe a long Stokes shift and are consistent with these observations (Refs. A27-28; incorporated by reference in their entireties).

Figure 5:
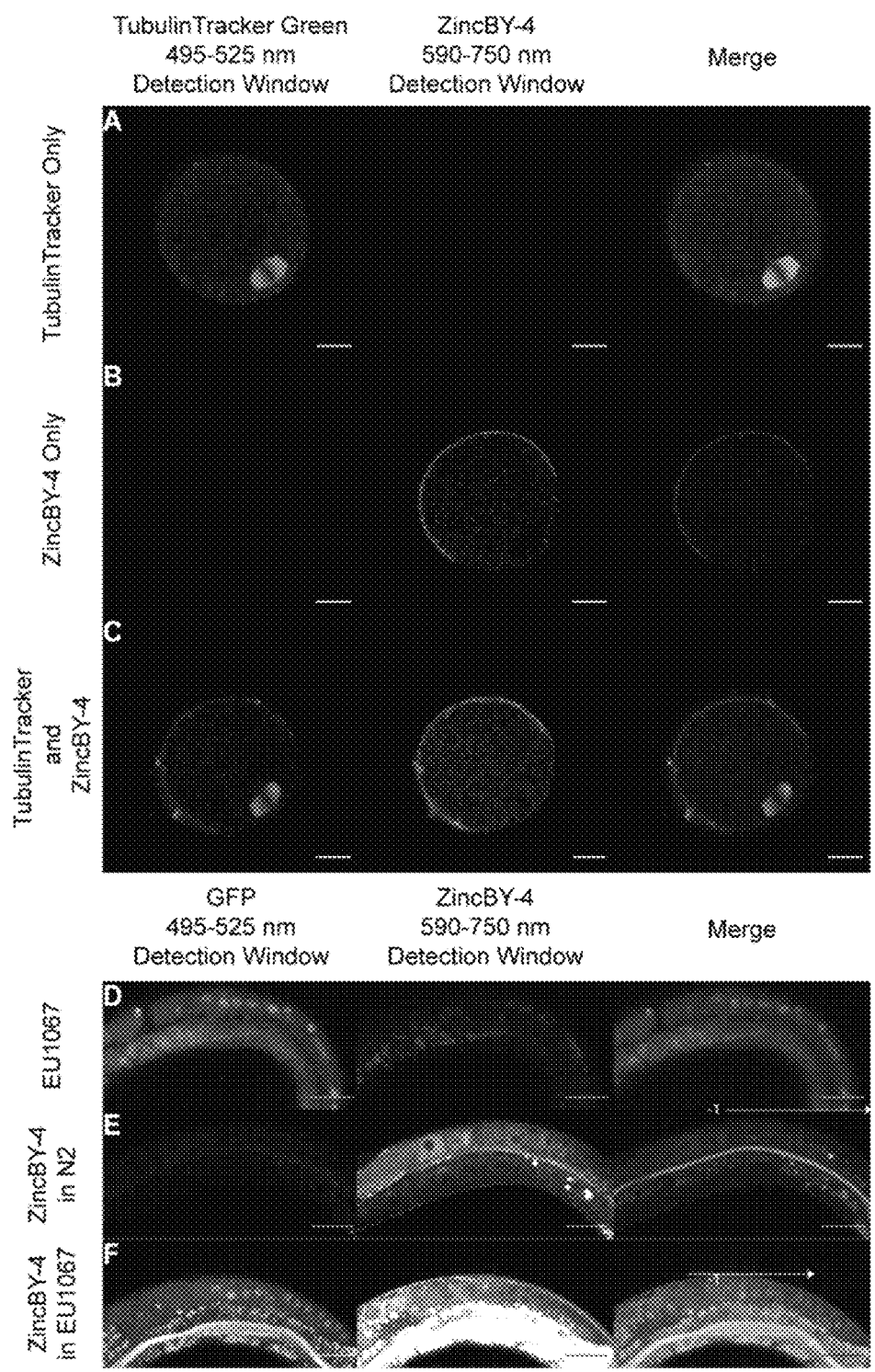
FIG. 5. Simultaneous excitation of ZincBY-4 and a green-emitting fluorophore in the MII mouse egg and *C. elegans* worm. (A-C) Detection of zinc and tubulin using a single excitation wavelength in a 2 μm optical section of a MII mouse egg. Both ZincBY-4 (50 nM, Red) and TubulinTracker Green (240 nM, Green) are excited at 488 nm. Detection windows are set to allow for minimal overlap of the probe signals. Fluorescence images of a live mouse egg that was stained only with TubulinTracker Green (A), only ZincBY-4 (B), or both ZincBY-4 and TubulinTracker Green (C). Scale bar is 20 μm. (D-F) Detection of Zinc and Tubulin using a single excitation wavelength in *C. elegans* worms. EU1067 contains a GFP::Histone and GFP::Tubulin fusion and N2 is the wild type. Both ZincBY-4 (50 μM) and GFP are excited at 488 nm. Detection windows are set to allow for minimal overlap of the probe signals. Fluorescence images show non-stained EU1067 worms (D), ZincBY-4 stained N2 worms (E), and ZincBY-4 stained EU1067 worms (F). The −1 is above the −1 oocyte with the arrow indicating the direction of the earlier oocytes. Scale bar is 50 μm. The * indicates the gut and the surrounding gut granules.

Advantages of ZincBY-4 in live cell imaging studies. Live MII eggs were treated with both ZincBY-4 and Tubulin-Tracker Green (a taxol-oregon green 488 conjugate), a probe that is used to stain tubulin microtubules in live cells (FIG. 5, ***S18; Ref. A50; incorporated by reference in its entirety). The large spatial differences between the zinc vesicles and the tubulin metaphase spindles in MII eggs permit ready visualization of any spectral overlap by the two probes. With careful control of the imaging parameters (e.g. adjusting the detection channel wavelengths for both probes) there is virtually no spectral overlap between the two probes (FIG. 5A).

This is evident in samples stained with only a single probe and looking for any signal in the opposite channel. The utility of this probe is not limited to just single cells studies, but can be used in live animal imaging, e.g., in studies of zinc distribution within C. elegans worms (FIG. 5B). With the same imaging parameters across all conditions, there is very little overlap of ZincBY-4 in the GFP detection channel and no GFP fluorescence detected in the ZincBY-4 channel, allowing for detection of both probes at the same time with a single excitation wavelength.

It was found that worms stained with ZincBY-4 show a pattern of increasing fluorescence intensity as oocytes progress through the gonad, where the most mature oocyte (referred to as the −1 oocyte) showed the highest signal (FIG. 5b, ***S19). The biological significance of more labile zinc in the −1 oocyte is currently unknown and is the subject of further investigation. Additionally, the intense signal observed in the ZincBY-4 stained worms can be attributed to zinc stored in the intestines. C. elegans accumulate zinc within lysosome-related organelles called gut granules and is likely the source of the punctate ZincBY-4 signal (Ref. 51; incorporated by reference in its entirety).

Figure 6:
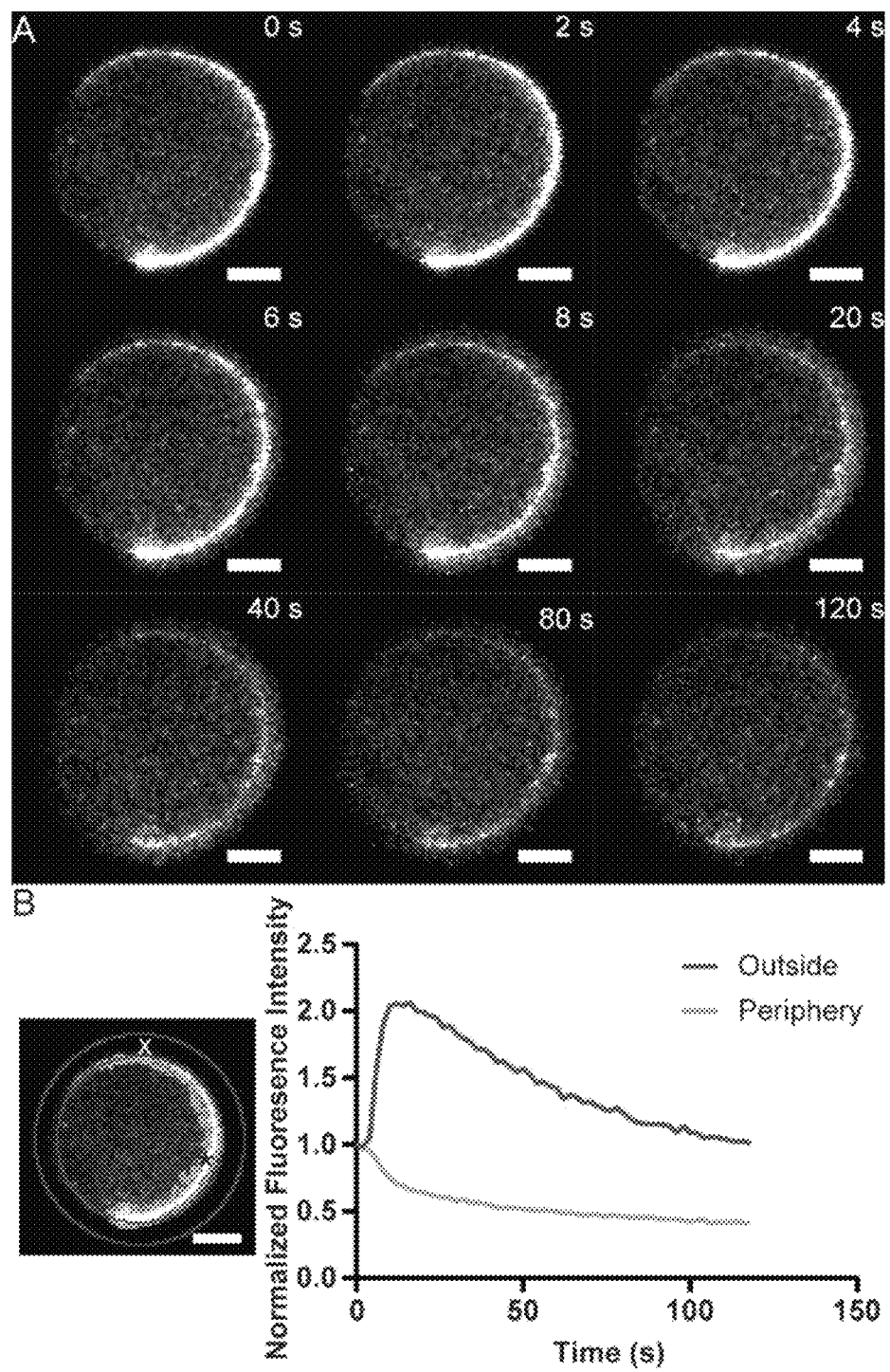
FIG. 6, panels A-B. Imaging the zinc vesicle loss in a single MII egg during chemical activation (mimic of fertilization). (A) A cohort of MII eggs were incubated with ZincBY-4 for 10 minutes and then chemically activated with ionomycin and visualized via confocal microscopy with an open pinhole resulting in a 26 μm optical section through the center of the egg. Scale bar is 20 μm. (B) The outside and periphery of the egg were analyzed by creating a region of interested outside of the egg (outlined in red, denoted by X) and the periphery of the egg (outlined in blue, denoted by *). The intensities in these regions were plotted over time and normalized to the intensity of the 0 second time point of those regions. There is an increase in fluorescence intensity outside the egg while fluorescence intensity is lost in the periphery region following chemical activation.
Figure 7:
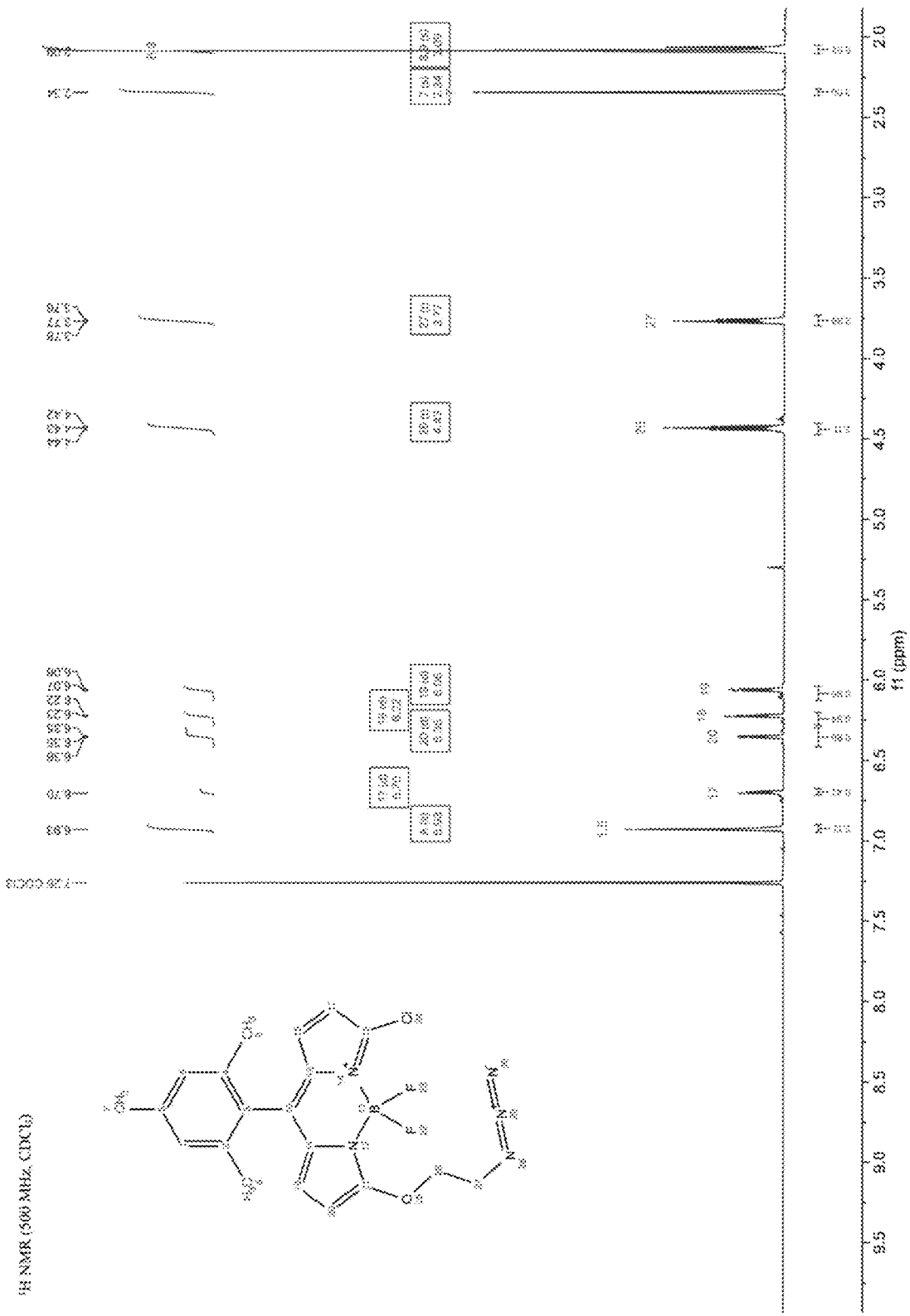
FIG. 7. The $^1$H NMR spectrum of 5-(2-azidoethoxy)-3-chloro-8-mesityl-BODIPY. The numbers above the peaks correspond to the proton assignments on the corresponding structure.
Figure 8:
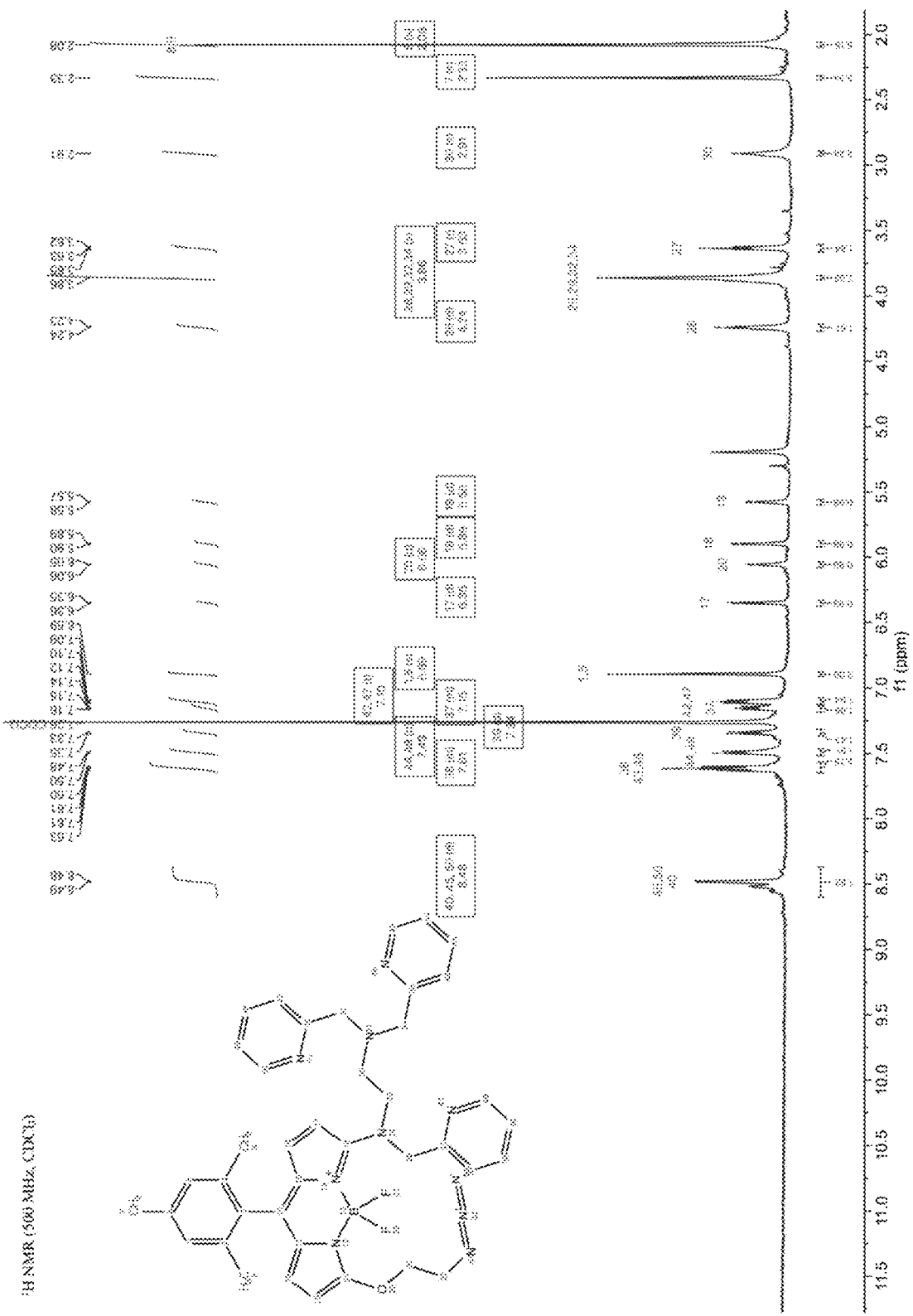
FIG. 8. The $^1$H NMR spectrum of ZincBY-2. The numbers above the peaks correspond to the proton assignments on the corresponding structure.
Figure 9:
FIG. 9. The $^1$H NMR spectrum of ZincBY-3. The numbers above the peaks correspond to the proton assignments on the corresponding structure.
Figure 10:
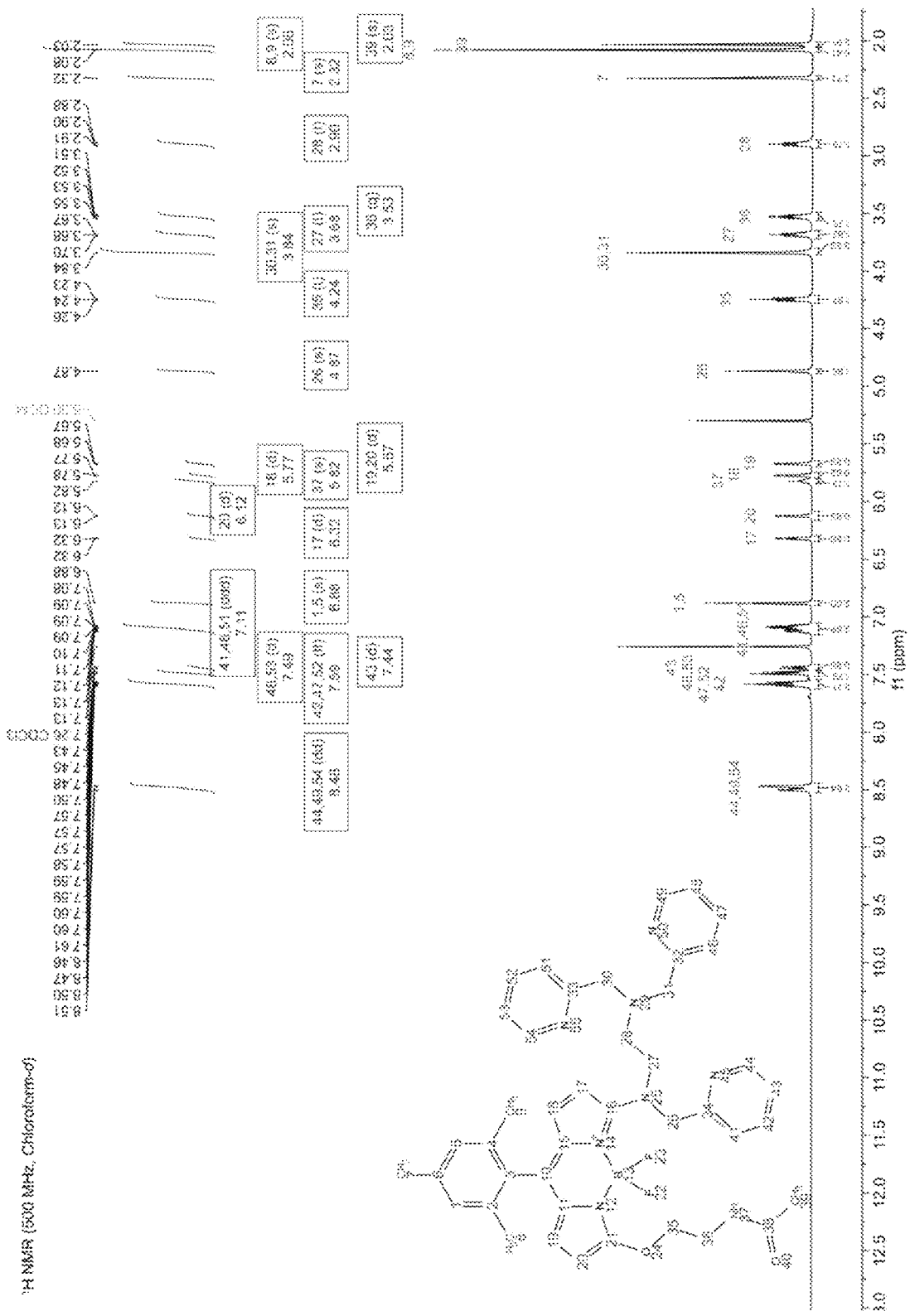
FIG. 10. The $^1$H NMR spectrum of ZincBY-4. The numbers above the peaks correspond to the proton assignments on the corresponding structure.
Figure 11:
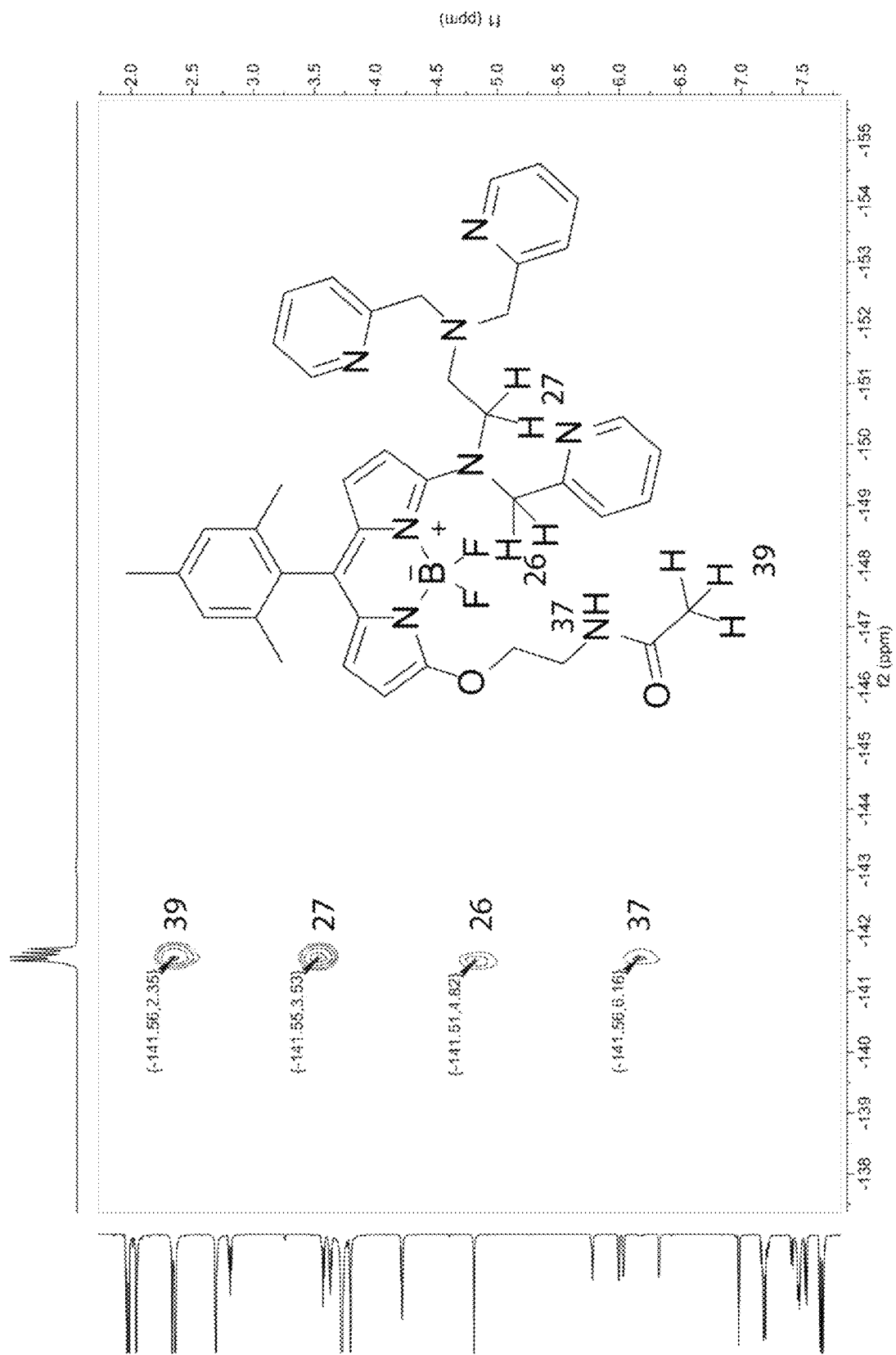
FIG. 11. The $^{19}$F-$^1$H HOESY NMR spectrum of ZincBY-4 in the presence of equimolar TPEN. The f1 and f2 dimensions are the chemical shifts of $^{19}$F and $^1$H, respectively. Peak 37 corresponds to an intramolecular hydrogen bond between the amide hydrogen and a fluorine on the BODIPY core. The lower intensity of peak 37 compared to peaks 26, 27, and 39 can be attributed to the single hydrogen of the amide compared to the two hydrogens of peaks 26 and 27 and the three hydrogens of peak 39.
Figure 12A:
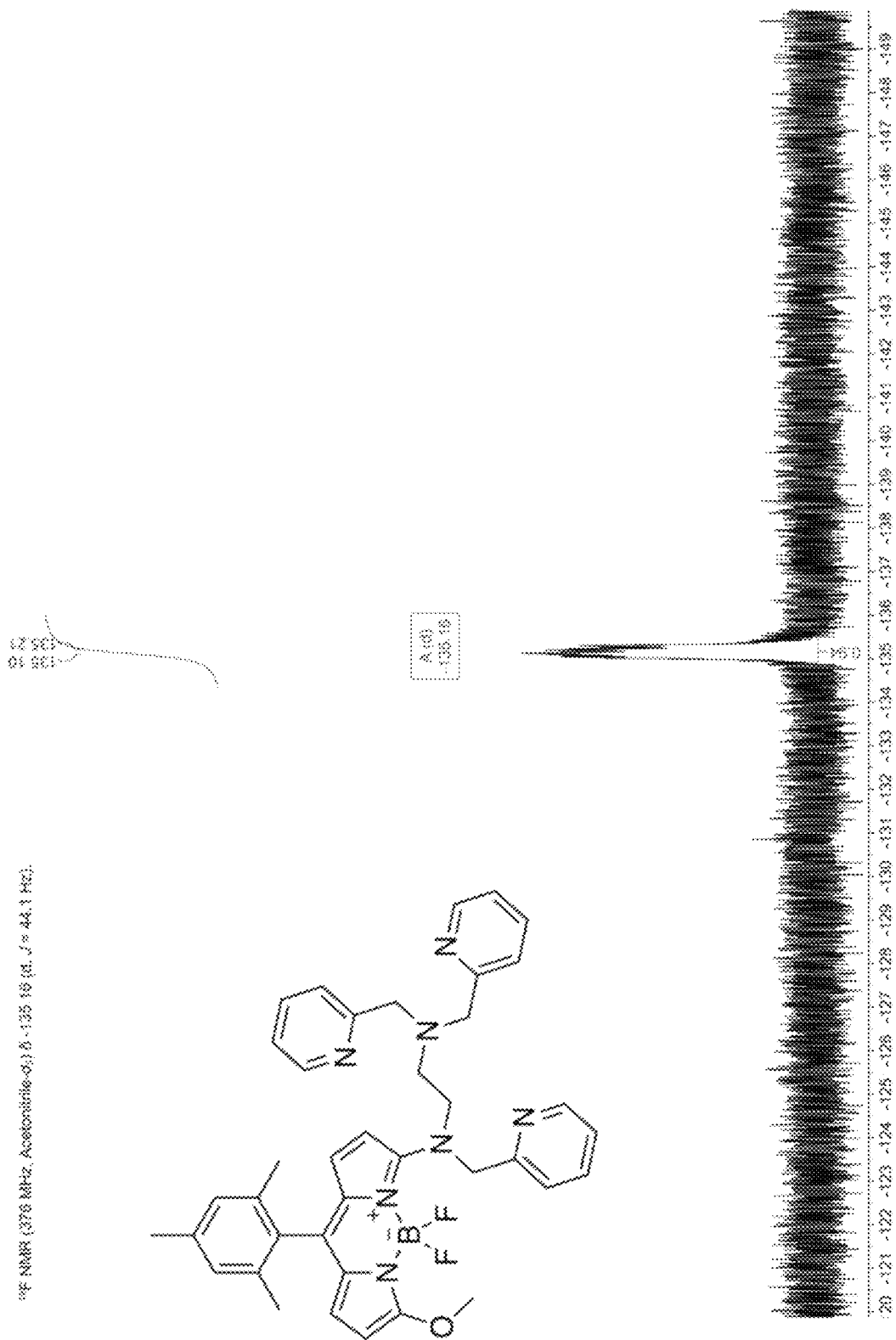
FIGS. 12A-B. The $^{19}$F NMR spectrum of ZincBY-1 without (A) and with the inclusion of TPEN (B). The presence of trace amounts of iron was found to broaden the $^{19}$F spectrum. The inclusion of TPEN removed the iron from ZincBY-1 and sharpened the spectrum.
Figure 12B:
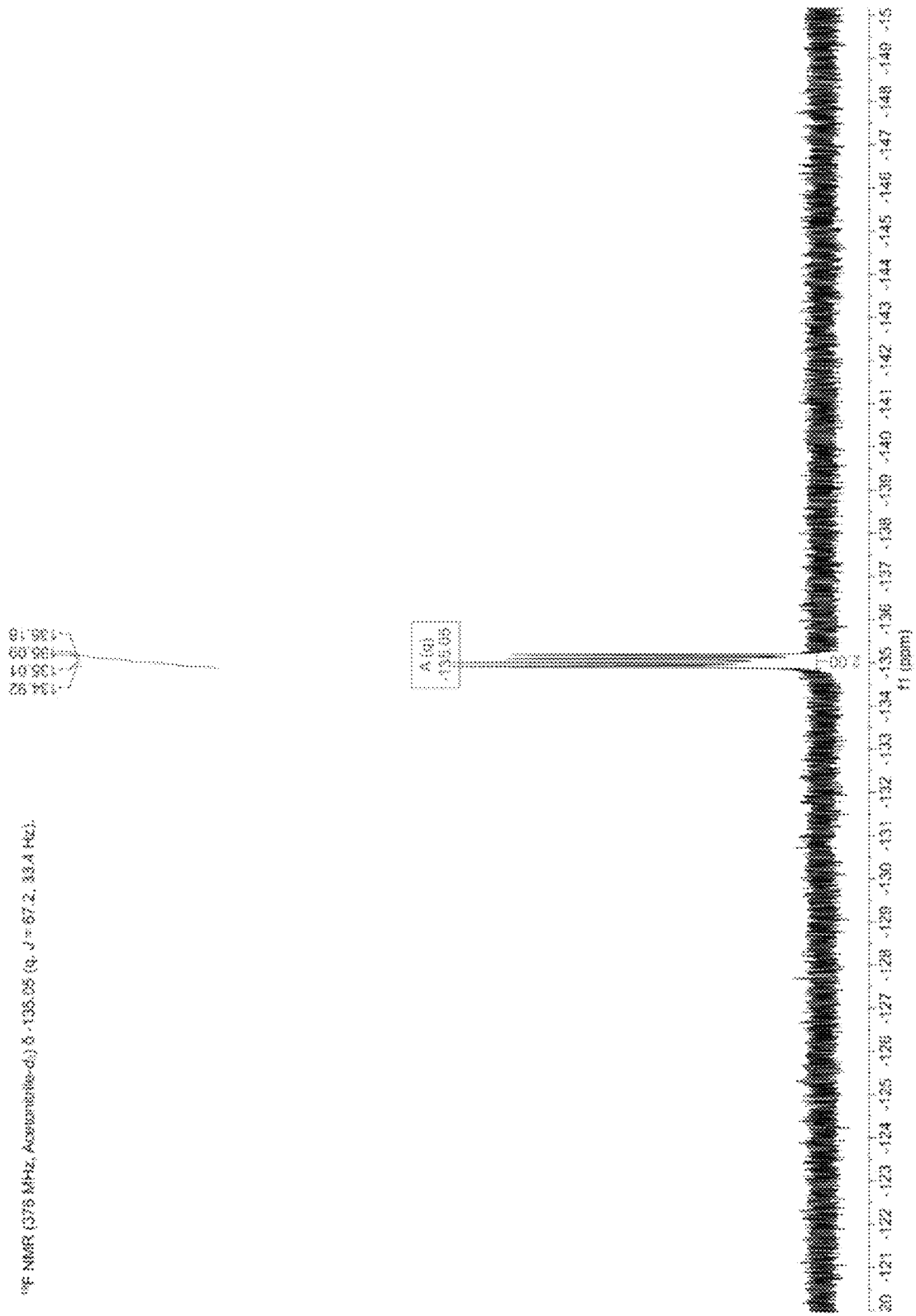
Figure 13A:
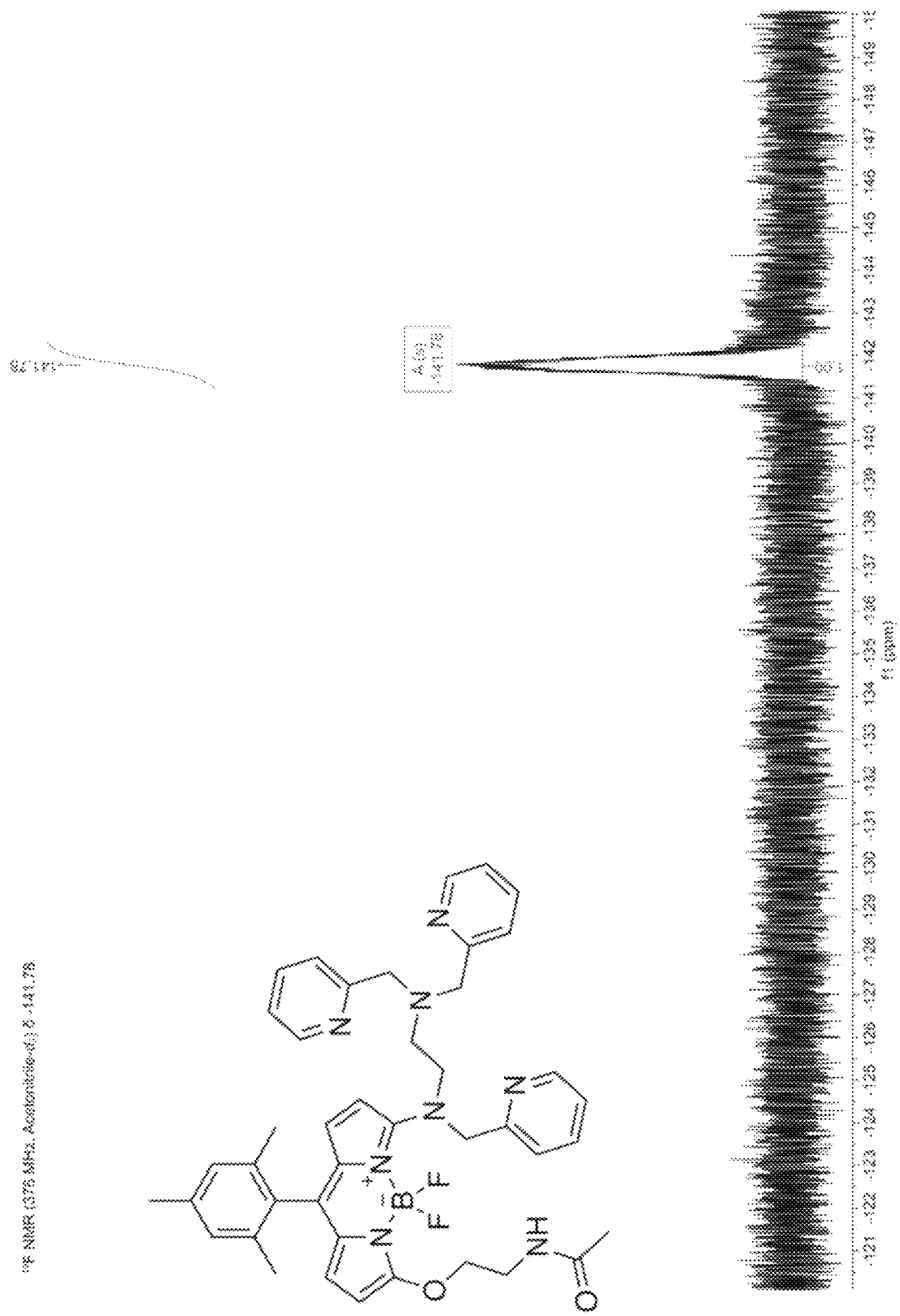
FIGS. 13A-B. The $^{19}$F NMR spectrum of ZincBY-4 without (A) and with the inclusion of TPEN (B). The presence of trace amounts of iron was found to broaden the $^{19}$F spectrum, the inclusion of TPEN removed the iron from ZincBY-4 and sharpened the spectrum.
Figure 13B:
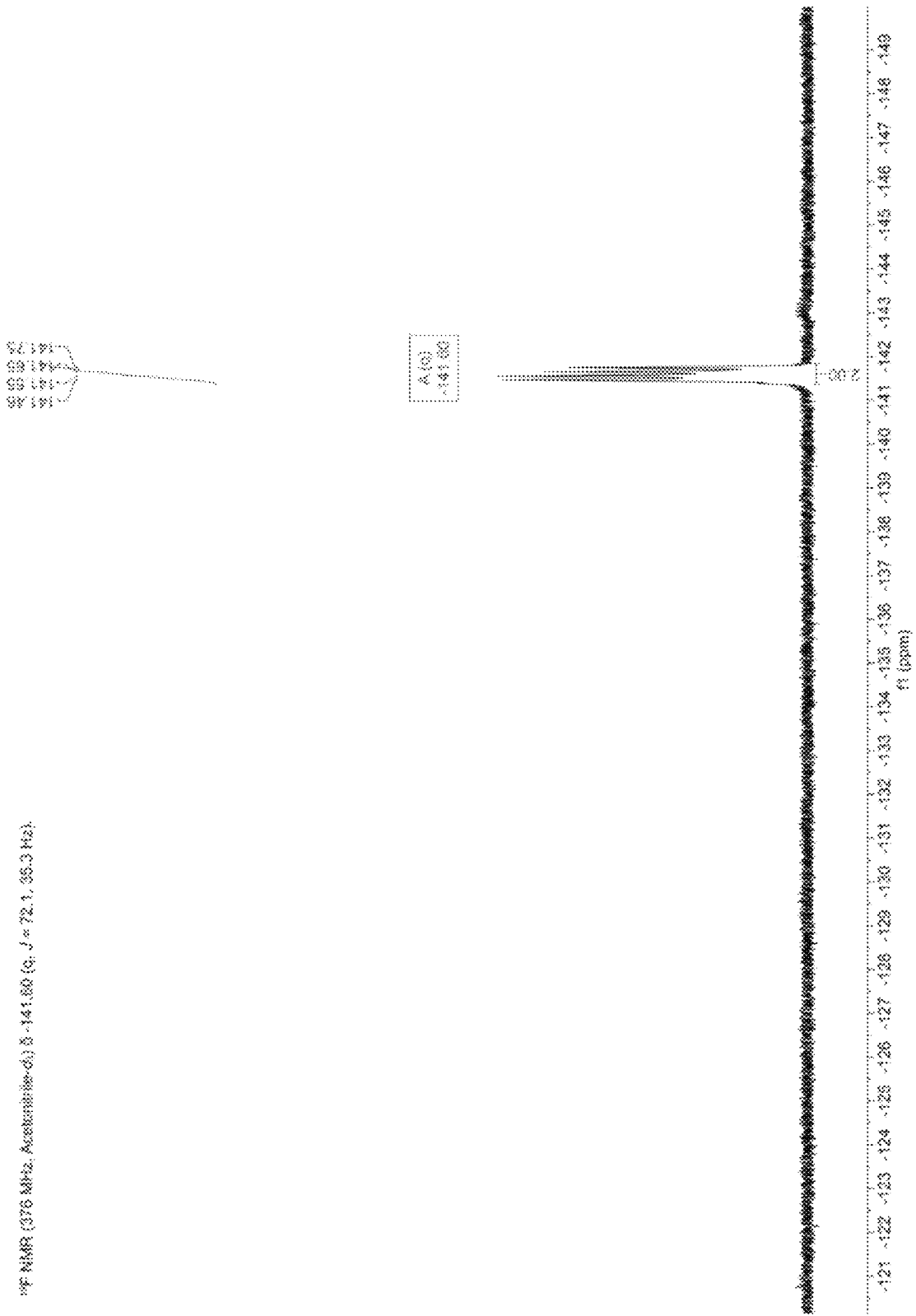
Figure 14:
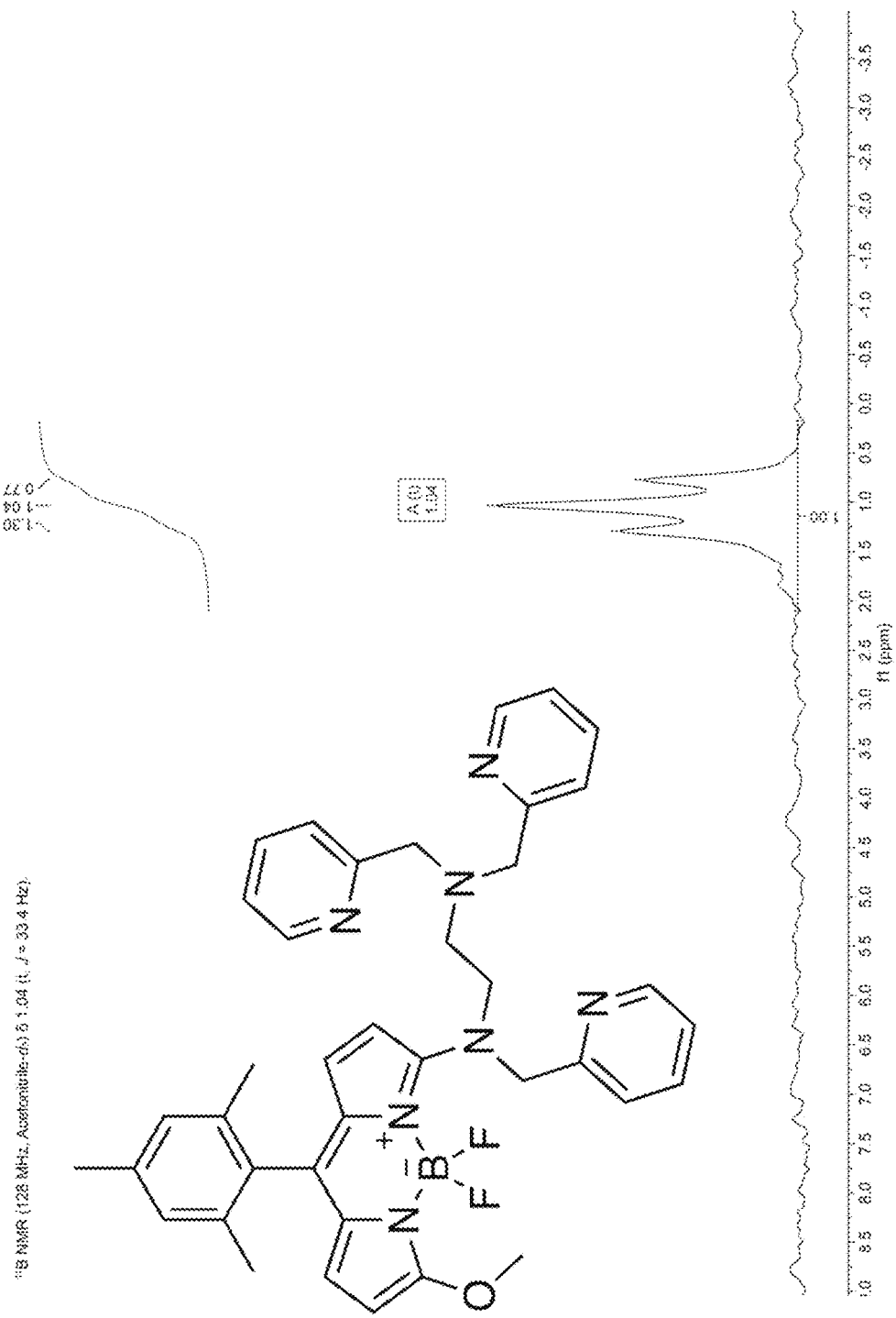
FIG. 14. The $^{11}$B NMR spectrum of ZincBY-1.
Figure 15:
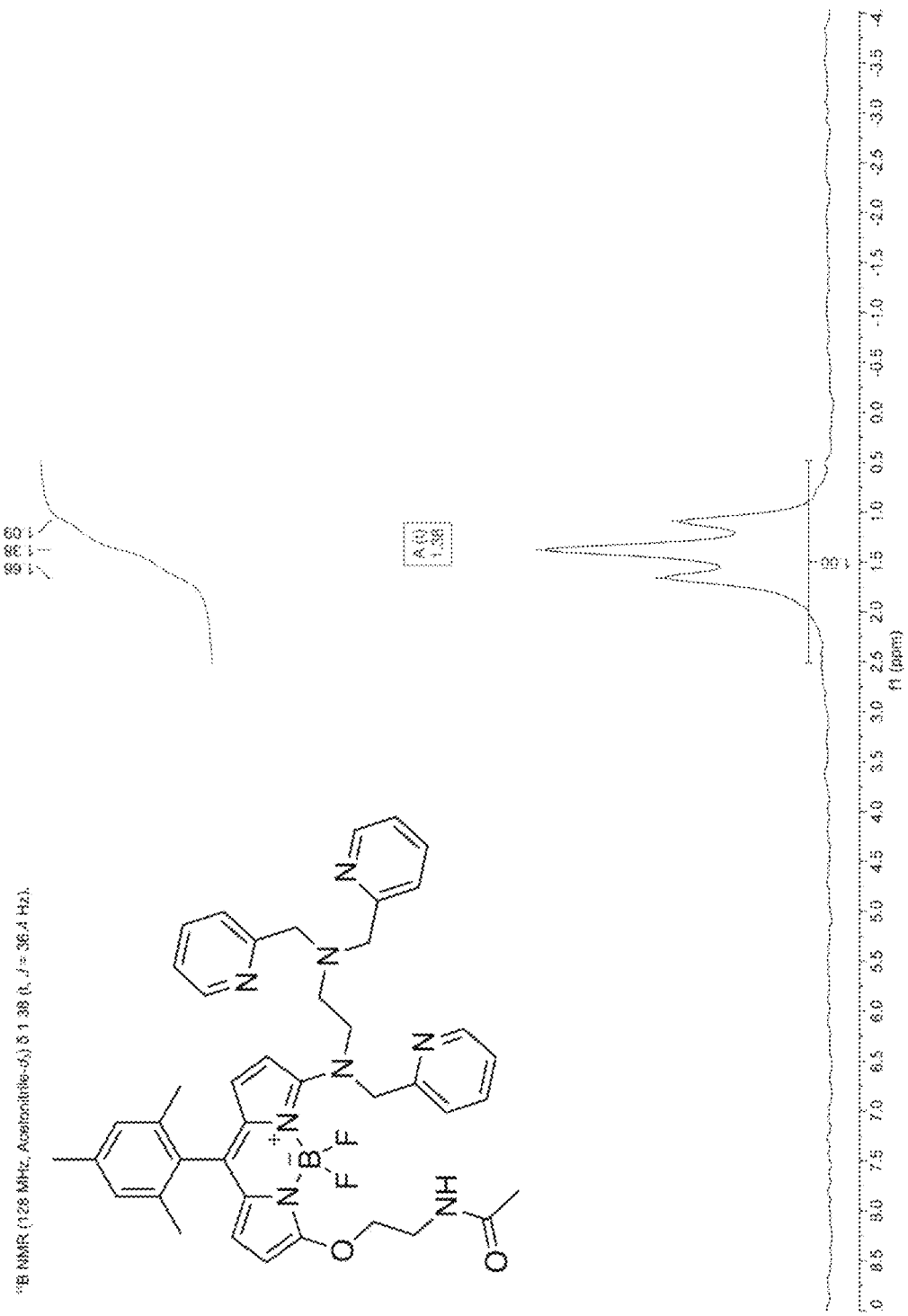
FIG. 15. The $^{11}$B NMR spectrum of ZincBY-4.
Figure 16:
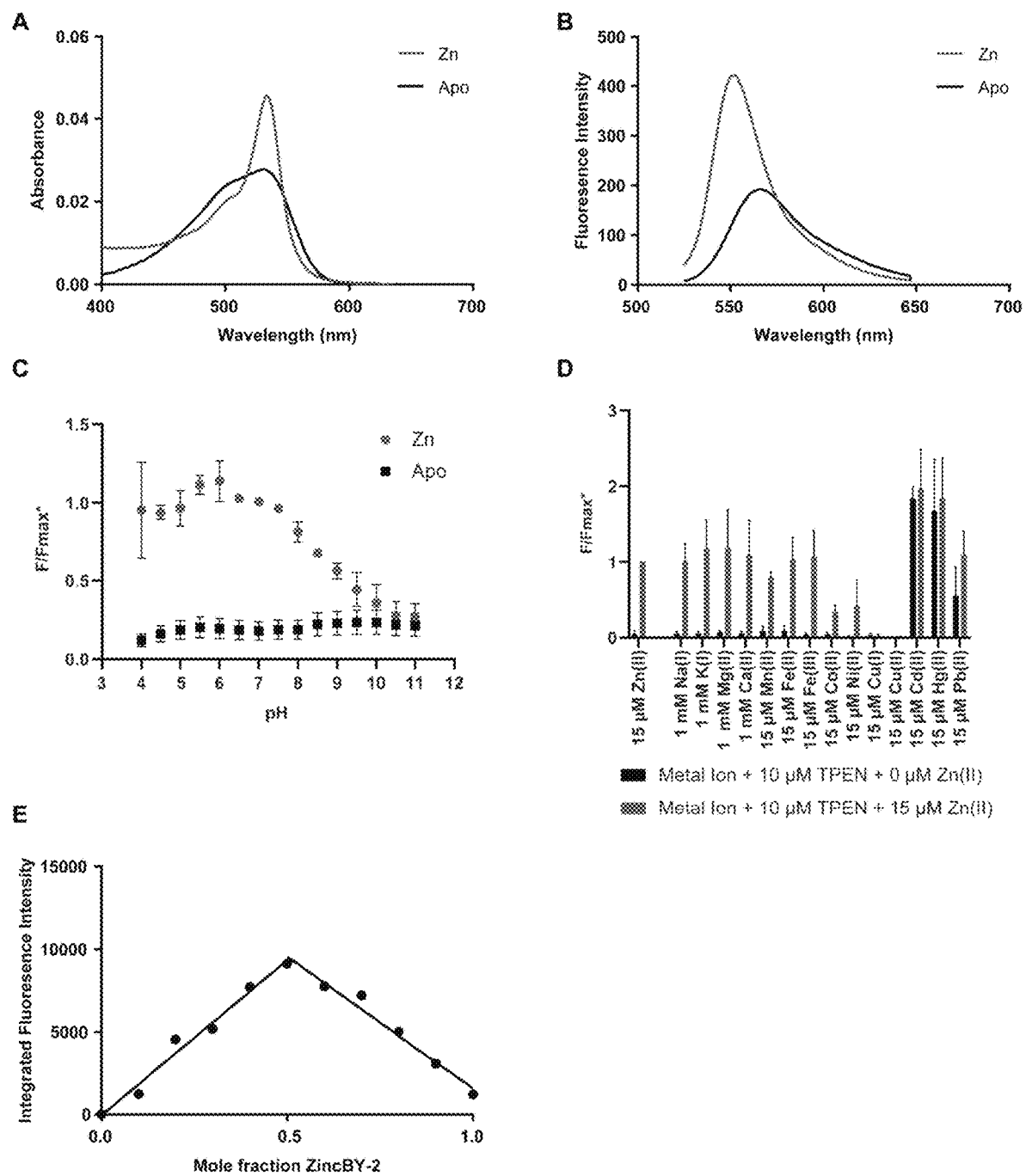
FIG. 16, panels A-E. (A) Absorption spectra of ZincBY-2 (200 nM) in the Zn-bound state (Zn) and in the presence of TPEN (Apo). (B) Fluorescence spectra of ZincBY-2 (200 nM) in the Zn-bound state (Zn) and in the presence of TPEN (Apo). (C) pH dependence of ZincBY-2. Relative fluorescence intensities of ZincBY-2 (5 μM) in the presence of TPEN (Apo) and in the presence of zinc (Zn) in buffers at various pHs. Fluorescence changes of the Apo probe are largely unaffected by changes in pH. Fluorescence of the Zn-bound probe is stable between pH 4.5-8.0. $F_{max}$=fluorescence of Zn-bound probe at pH 7.5. Each condition was measured in triplicate. (D) Metal ion selectivity of ZincBY-2. Relative fluorescence intensities of ZincBY-2 (5 μM) in the presence of other metal ions (grey bars) and other metal ions in the presence of excess zinc (black bars). ZincBY-2 does not respond to changes in K, Na, Ca, Mg, Mn, Fe, Co, or Ni concentration. ZincBY-2 does not fluoresce in the presence of Cu(I) and Cu(II), and these ions inhibit the zinc response. ZincBY-2 exhibits an increase in fluorescence in response to toxic metals Cd and Hg, but does not respond to Pb. $F_{max}$=fluorescence of Zn-bound probe at pH 7.2.

ZincBY-4 is effectively utilized in time lapse imaging to evaluate zinc transients in living cells. Extracellular free Zn(II) released upon fertilization of mouse eggs is readily observed using FluoZin-3 acid after parthenogenic activation of MII eggs by treatment with the calcium ionophore, ionomycin, which raises cytoplasmic calcium levels to trigger vesicle release and the resumption of meiosis through calmodulin dependent signaling pathways (Ref. A11; incorporated by reference in its entirety). The transient increase in extracellular free zinc was shown to directly correlate with a decrease in free zinc concentration in vesicles located at the cell surface: these events were followed by loading cells with ZincBY-1 and using another parthenogenic activator, strontium chloride, to stimulate zinc release (Ref. A18; incorporated by reference in its entirety). When ZincBY-4 is loaded into the cells, both loss of zinc from the zinc granule region and increase of zinc outside the cell without the need of a second probe was observed (FIG. 6, ***S20). The drop of fluorescence intensity in the intracellular zinc granule region occurs upon vesicular fusion with the plasma membrane, which allows release of the vesicle's zinc cargo. The fluorescence intensity outside the egg increases due to the release of the zinc-probe complex at the time of vesicle exocytosis. These results demonstrate that ZincBY-4 applications are not limited to imaging static pools of zinc, but also probe dynamic changes in zinc concentration and localization.

Materials and Methods

Compounds were purchased from MilliporeSigma unless otherwise stated. Compounds 1, 2, and 4 were prepared according to published methods (Ref. B1; incorporated by reference in its entirety). $^1$H NMR spectra were acquired on a Bruker Avance III 500 Mhz system. $^1$H NMR chemical shifts are reported in ppm relative to SiMe4 ($\delta$=0) and were referenced internally with respect to residual protons in solvent ($\delta$=7.26 for CHCl$_3$). $^{11}$B and $^{19}$F NMR spectra were acquired on a Bruker Avance III HD 400 MHz system equipped with a BBFO probe (128 MHz for $^{11}$B and 376 MHz for $^{19}$F). $^{11}$B chemical shifts are reported in ppm relative to BF$_3$—OEt$_2$ ($\delta$=0). $^{19}$F NMR chemical shifts are reported in ppm relative to CFCl$_3$ ($\delta$=0). The $^{19}$F-$^1$H HOESY spectrum was recorded on a Bruker Neo 600 MHz system equipped with a QCI (HFCN) cryoprobe with Z-gradient (564 Mhz for $^{19}$F). Coupling constants are reported in Hz. High-resolution mass spectrometry (HRMS) was acquired on a Bruker Impact-II by using electrospray ionization and was conducted by staff at the Integrated Molecular Structure Education and Research Center (IMSERC) at Northwestern University. Semiprepative HPLC separations were carried out on an Agilent 1100 series high pressure liquid chromatography system equipped with a multiwavelength detector and automated fraction collector using a C18 reverse stationary phase (Gemini 5 µm C18 LC Column 100×10 mm) and a mobile phase composed of two solvents (A: water; B: acetonitrile). The IUPAC names of compounds were determined using ChemDraw Professional 17.0.

Synthesis 5-(2-azidoethoxy)-3-chloro-8-mesityl-BODIPY (7)

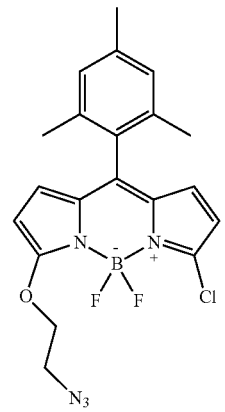

2-azidoethanol (6) (574 mg, 6.59 mmol) was dissolved into dry acetonitrile (ACN, 75 mL) with K$_2$CO$_3$ (912 mg, 6.60 mmol) and a small scoop of sodium sulfate (ca. 50 mg) in a dry round-bottom flask. The mixture was refluxed for 15 minutes under dry N$_2$. To the solution, 3,5-dichloro-BODIPY (5) (250 mg, 0.660 mmol) was added and the mixture was heated at reflux overnight in the dark under dry N$_2$. The resulting solution was filtered, then the filtrate was dried by evaporating acetonitrile under reduced pressure. The mixture was re-dissolved into dichloromethane (DCM), then the solution was washed twice with water, dried with sodium sulfate, and filtered. After concentrating the filtrate under reduced pressure, the resulting crude product was purified by silica gel chromatography (DCM) to yield the pure product as a dark red powder (210 mg, 74% yield). $^1$H NMR (500 MHz, Chloroform-d) $\delta$ 6.93 (s, 2H), 6.70 (d, J=4.8 Hz, 1H), 6.35 (d, J=4.2, 1.8 Hz, 1H), 6.22 (d, J=4.2 Hz, 1H), 6.06 (d, J=4.6 Hz, 1H), 4.43 (t, J=5.3 Hz, 2H), 3.77 (t, J=5.2 Hz, 2H), 2.34 (s, 3H), 2.09 (s, 6H). HRMS (ESI). Calcd for MH$^+$ [C$_{20}$H$_{20}$BClF$_2$N$_5$O]$^+$: 430.1416, found: 430.1424.

N1-(7-(2-azidoethoxy)-5,5-difluoro-10-mesityl-5H-4λ4,5λ4-dipyrrolo[1,2-c:2',1'-f][1,3,2]diazaborinin-3-yl)-N1,N2,N2-tris(pyridin-2-ylmethyl)ethane-1,2-diamine (2, ZincBY-2)

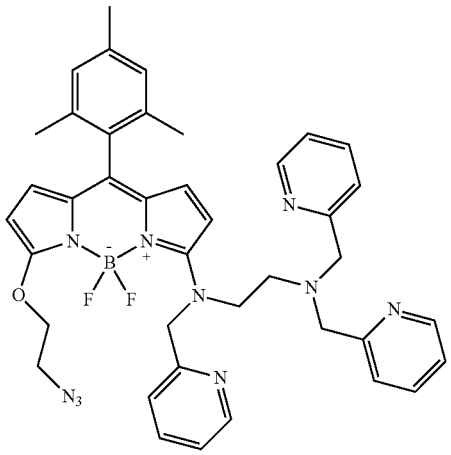

5-(2-azidoethoxy)-3-chloro-8-mesityl-BODIPY (7) (190 mg, 0.442 mmol) and trispicen (8) (293 mg, 0.878 mmol) were added to a dry round-bottom flask containing dry ACN (25 mL) and 4 Å sieves. The reaction was heated at reflux overnight under dry $N_2$. The solution was filtered, then the filtrate was dried by evaporating acetonitrile under reduced pressure. The mixture was re-dissolved into DCM, washed twice with water, dried with sodium sulfate, and filtered. After concentrating the filtrate under reduced pressure, the resulting crude product was purified by silica gel chromatography (0-10% $CH_3OH$ in DCM) to yield the product as a dark red powder (237 mg, 66% yield). $^1$H NMR (500 MHz, Chloroform-d) δ 8.48 (d, J=4.9 Hz, 3H), 7.65-7.56 (m, 2H), 7.49 (d, J=7.8 Hz, 2H), 7.34 (d, J=7.9 Hz, 1H), 7.18-7.12 (m, 1H), 7.10 (t, J=6.3 Hz, 2H), 6.89 (s, 2H), 6.35 (d, J=4.9 Hz, 1H), 6.06 (d, J=4.0 Hz, 1H), 5.89 (d, J=4.9 Hz, 1H), 5.58 (d, J=3.8 Hz, 1H), 4.24 (d, J=5.4 Hz, 2H), 3.86 (s, 6H), 3.63 (t, J=5.5 Hz, 2H), 2.91 (s, 2H), 2.33 (s, 3H), 2.08 (s, 5H). HRMS (ESI). Calcd for MH$^+$ $[C_{40}H_{41}BF_2N_{10}O]^+$: 727.3606, found: 727.3611.

N1-(7-(2-aminoethoxy)-5,5-difluoro-10-mesityl-5H-4λ4,5λ4-dipyrrolo[1,2-c:2',1'-f][1,3,2]diazaborinin-3-yl)-N1,N2,N2-tris(pyridin-2-ylmethyl)ethane-1,2-diamine (3, ZincBY-3)

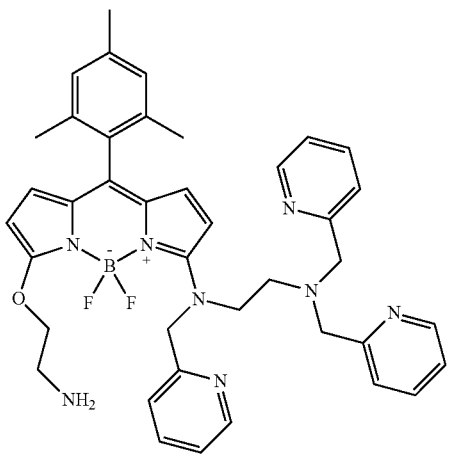

ZincBY-2 (2) (144 mg, 0.198 mmol) was dissolved into tetrahydrofuran (THF, 5.72 mL), water (0.572 mL), and 1M NaOH (57.2 µL). The mixture was cooled to 0° C. and $PMe_3$ (276 µL, 1 µM solution in THF) was added via syringe. The reaction was stirred for 1.5 h at 0° C. and then warmed to room temperature. After an additional 2 h stirring at room temperature, the mixture was diluted with DCM (50 mL) and washed with water. The DCM layer was dried with sodium sulfate, filtered, and dried under reduced pressure to yield a deep purple solid. Further purification was carried out by reverse phase HPLC according to the following protocol: constant flow rate 5 mL min$^{-1}$; isocratic flow 5% B, 0-10 min; gradient 5-45% B, 10-35 min; gradient 45-75% B, 35-35.1 min; 75-100% B; 35.1-45 min; isocratic flow 100% B. All product fractions from independent runs were combined and dried using a centrivap concentrator, then further dried under pressure to yield a purple solid (104 mg, 74% yield). $^1$H NMR (500 MHz, Chloroform-d) δ 8.51-8.45 (m, 2H), 7.66-7.53 (m, 4H), 7.36 (d, J=7.9 Hz, 1H), 7.18-7.09 (m, 3H), 6.86 (s, 2H), 6.33 (d, J=4.5 Hz, 1H), 6.07 (d, J=4.4 Hz, 1H), 5.78 (d, J=4.5 Hz, 1H), 5.59 (d, J=4.5 Hz, 1H), 4.64 (s, 2H), 4.01 (s, 4H), 3.94-3.87 (m, 4H), 3.44 (d, J=5.2 Hz, 1H), 3.02 (t, J=7.8 Hz, 2H), 2.31 (s, 3H), 2.07 (s, 5H). HRMS (ESI). Calcd for MH$^+$ $[C_{40}H_{44}BF_2N_8O]^+$: 701.3701, found: 701.3701.

N-(2-((7-((2-(bis(pyridin-2-ylmethyl)amino)ethyl)(pyridin-2-ylmethyl)amino)-5,5-difluoro-10-mesityl-5H-5λ4,6λ4-dipyrrolo[1,2-c:2',1'-f][1,3,2]diazaborinin-3-yl)oxy)ethyl)acetamide (4, ZincBY-4)

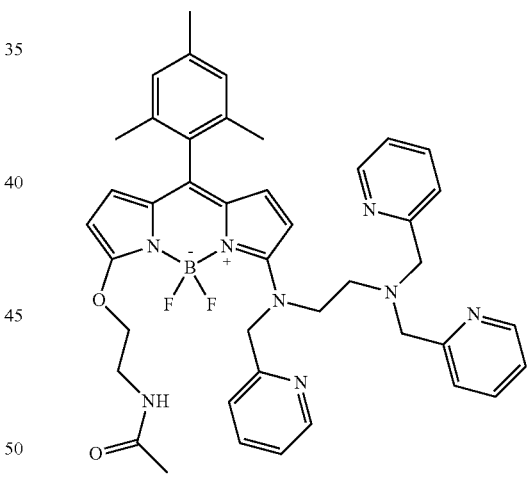

ZincBY-3 (3) (26 mg, 37 µmol) was dissolved into DCM (2.62 mL) with 4-dimethylaminopyridine (DMAP) (4.6 mg, 37 µmol). The mixture was cooled to 0° C., acetic anhydride (5.2 µL, 55 µmol) added via syringe, and the mixture was stirred for 75 min 0° C., then the mixture was diluted with DCM (50 mL) and washed with water. The DCM layer was dried with sodium sulfate, filtered, and dried under reduced pressure to yield a deep purple solid. Further purification was carried out by reverse phase HPLC according to the following protocol: constant flow rate 5 mL min$^{-1}$; isocratic flow 5% B, 0-10 min; gradient 5-50% B, 10-35 min; gradient 50-75% B, 35-35.1 min; 75-100% B; 35.1-45 min; isocratic flow 100% B. All fractions from independent runs were combined and dried using a centrivap concentrator, then further dried to yield a purple solid (21.2 mg, 77% yield). $^1$H NMR (500 MHz, Chloroform-d) δ 8.48 (dd, J=15.9, 4.9 Hz, 3H), 7.59 (tt, J=7.6, 2.0 Hz, 3H), 7.49 (d, J=7.9 Hz, 2H), 7.44 (d, J=7.9 Hz, 1H), 7.12 (dd, J=7.4, 4.9 Hz, 1H), 7.09 (dd, J=7.2, 5.3 Hz, 2H), 6.88 (s, 2H), 6.32 (d, J=4.4 Hz, 1H), 6.12 (d, J=4.4 Hz, 1H), 5.82 (s, 1H), 5.77 (d, J=4.4 Hz, 1H), 5.67 (d, J=4.4 Hz, 1H), 5.30 (s, 1H), 4.87 (s, 2H), 4.24 (t, J=5.7 Hz, 2H), 3.84 (s, 4H), 3.68 (t, J=7.0 Hz, 2H), 3.53 (q, J=5.9 Hz, 2H), 2.90 (t, J=6.9 Hz, 2H), 2.32 (s, 3H), 2.08 (s, 6H), 2.03 (s, 3H). $^{11}$B NMR (128 MHz, Acetonitrile-$d_3$) δ 1.38 (t, J=36.4 Hz). $^{19}$F NMR (376 MHz, Acetonitrile-$d_3$) δ-141.60 (q, J=72.1, 35.3 Hz). HRMS (ESI). Calcd for MH$^+$[$C_{42}H_{46}BF_2N_8O_2$]$^+$: 743.3807, found: 743.3815.

NMR Acquisition Parameters $^1$H NMR spectra were acquired with 3.3 seconds per scan with a 1 second delay between scans. 16 scans were acquired in total comprising 32768 points that was doubled to 65536 points in processing. Each scan utilized a 10 s pulse width and was acquired with a 20 ppm spectral width centered at 6 ppm. A line broadening of 0.3 Hz was applied to the spectra. $^{11}$B NMR spectra were acquired with 1.99 seconds per scan with a 0.8 second delay between scans. 32 scans were acquired in total comprising 5100 points that was expanded to 16384 points in processing. Each scan utilized a 9 s pulse width and was acquired with a 20 ppm spectral width centered at 0 ppm. A line broadening of 10 Hz was applied to the spectra.

$^{19}$F NMR spectra were acquired with 1.74 seconds per scan with a 1 second delay between scans. 32 scans were acquired in total comprising 65536 points that was doubled to 131072 points in processing. Each scan utilized an 18 s pulse width and was acquired with a 100 ppm spectral width centered at −130 ppm. A line broadening of 0.3 Hz was applied to the spectra. To measure $T_1$, an inversion recovery pulse sequence was used with the same acquisition parameters and 10 evolution times ranging from 1 ms to 1000 ms. To measure $T_2$, a spin-echo pulse sequence was used with the same acquisition parameters, with the mixing times varied from 0.5 ms to 32 ms over 8 experiments. $^{19}$F-$^1$H HOESY NMR spectrum for ZincBY-4 was acquired with 32 scans over 2048 time domain points, each scan taking 0.0184 s with a 12 s pulse width. 1024 points were acquired in the f1 domain while 128 points were acquired in f2 domain that increased to 256 points during processing. A sine square of 900 was applied during processing.

Spectroscopic Methods

Aqueous solutions were prepared by using de-ionized water with resistivity 18.2 mΩ cm$^{-1}$, obtained using a Milli-Q water purification system. In order to properly compare the photophysical properties of ZincBY-2, ZincBY-3, and ZincBY-4 to ZincBY-1, the photophysical properties of ZincBY-1 we remeasured. Tested values differed from the previously published values (Ref. B2; incorporated by reference in its entirety). It was determined that copper was present in the aqueous buffer used for in vitro analysis of the previous samples. The corrected values are used herein, utilizing buffers that are copper-free. Stock solutions of ZincBY-1, ZincBY-2, ZincBY-3, and ZincBY-4 were prepared at concentrations of 5 mM and stored at −20° C. in aliquots that were used immediately after thawing for each experiment. Unless otherwise stated, all spectroscopic methods were conducted in aqueous buffer containing 50 mM HEPES (pH 7.2) and 0.1 μM $KNO_3$. UV-visible spectra were acquired on a PerkinElmer Lambda 650 UV/Vis spectrophotometer using quartz cuvettes from Starna (1 cm path length, 10 cm path length used in extinction coefficient and quantum yield determination). Fluorescence spectra were acquired using a PerkinElmer LS 55 fluorescence spectrophotometer. For measurements containing zinc, 99.0% $ZnNO_3$ hexahydrate (final concentration 5 μM) was used. For experiments analyzing apo probes, N,N,N',N'-Tetrakis (2-pyridylmethyl)ethylenediamine (TPEN) (final concentration 5 μM) was added to solution.

Quantum Yield and Extinction Coefficient Determination. Quantum yields for apo and holo ZincBY-1, ZincBY-2, ZincBY-3, and ZincBY-4 were determined by plotting absorbance vs. fluorescence intensity of solutions containing ZincBY-1, ZincBY-2, ZincBY-3, or ZincBY-4 at probe concentrations ranging from 50-250 nM. Serial dilution was used to make solutions at different concentrations. Fluorescein dissolved in 0.1 N NaOH was used as the quantum yield standard, using a literature-determined quantum yield of 0.95.[3] For all fluorophore solutions, fluorescence excitation was set at 490 nm and fluorescence emission was integrated from 510 nm to 650 nm.

Zinc Dissociation Constant. Fluorescence spectra were recorded using zinc probes (ZincBY-1, ZincBY-2, ZincBY-3, or ZincBY-4; 200 nM) and $ZnSO_4$ (various concentrations). The solutions were equilibrated in the dark for 1 h prior to measurement. The concentration of $ZnSO_4$ was varied from 1 μM to 9 mM in buffer solution (50 mM HEPES and 0.1 μM $KNO_3$, and pH 7.2) containing 10 mM EGTA. Free $Zn^{2+}$ was calculated according to a previously reported method (Ref. B4; incorporated by reference in its entirety). Data was fit to the following one-site binding equation:

$$F=(F_{min}K_d+F_{max}[Zn^{2+}])/(K_d+[Zn^{2+}])$$

pH Response. The fluorescence spectra of zinc probes (ZincBY-2, ZincBY-3, or ZincBY-4; 200 nM) wasere measured at various pH values (4.5-11). The following buffers were used at 50 mM concentration with 0.1 μM $KNO_3$: NaOAc/AcOH (pH 4.0-4.5), MES (pH 5.0-6.5), HEPES (pH 7.0-8.0), CHES (pH 8.5-9.5), CAPS (pH 10.0-11.0).

Metal Ion Response. The fluorescence spectra of zinc probes (ZincBY-2, ZincBY-3, or ZincBY-4; 200 nM) were measured in the presence an excess of metal ion including 1 mM $KNO_3$, 1 mM $NaNO_3$, 1 mM $CaSO_4$, 1 mM $MgSO_4$, 15 μM $MnSO_4$, 15 μM $(NH_4)_2Fe(SO_4)_2$, 15 μM $NH_4Fe(SO_4)_2$, 15 μM $CoSO_4$, 15 μM $NiSO_4$, 15 μM $CuSO_4$, 15 μM $[Cu(CH_3CN)_4]PF_6$, 15 μM $CdSO_4$, 15 μM $Hg(NO_3)_2$, 15 μM $Pb(NO_3)_2$, or 15 μM $ZnSO_4$. The fluorescence spectra were compared to that of ZincBY-2 (200 nM), ZincBY-3 (200 nM), or ZincBY-4 (200 nM) in the presence of 10 μM TPEN.

Determination of octanol-water partition coefficients (log P). A log P value for each probe was determined by agitating nanomolar solutions of each probe in a 1:1 mixture of HEPES buffer and 1-octanol. Solutions were allowed to settle for 1 h and then the fluorescence intensity of each phase was measured. Standard curves of the fluorescence of known concentrations of probes in both solutions were used to determine concentrations. This experiment was performed in trireplicate.

Photophysical Properties of Probes in Solvents of Varied Dielectric Constants. ZincBY-4 (200 nM) was dissolved in either water, acetonitrile, or a mixture of water and acetonitrile with 5 μM $Zn(NO_3)_2$ (to measure the holo form of the probe) or 5 μM TPEN (to measure the apo form of the probe). The dielectric constant of the resulting solvent mixture was determined according to the reported method (Ref. B5; incorporated by reference in its entirety).[5]

Stability of ZincBY-4. ZincBY-4 (200 nM) was dissolved in aqueous buffer containing 5 μM $Zn(NO_3)_2$ or 5 μM TPEN and/or 10 mM glutathione (GSH). Fluorescence spectra were recorded every 2 h over the course of 12 h. The lamp was turned off between each measurement. The solution was held at 25° C. throughout the experiment via a water-jacketed cell.

Interaction of ZincBY-4 with Proteins. ZincBY-4 (final concentration of 200 nM) was dissolved in aqueous buffer containing either 5 µM Zn(NO$_3$)$_2$ or 5 µM TPEN with or without 10 mg/mL BSA. The emission spectrum of each solution was measured. In order to determine the polarization of the solution, the spectra were recorded with a vertical polarizer in excitation path and a vertical ($I_{vv}$) and horizontal polarizer ($I_{vh}$) in the emission path. From the resulting spectra the total integrated fluorescence intensity was determined, and polarization was calculated according to the following formulas:

$$r(t) = \frac{I_{vv}(t) - GI_{vh}(t)}{I_{vv}(t) + 2GI_{vh}(t)}$$

$$G = \frac{\int I_{hv}(t)dt}{\int I_{hh}(t)dt}$$

$$P(t) = \frac{3r(t)}{2 + r(t)}$$

where r(t) is the anisotropy, P(t) is the polarization, $I_{vv}$ and $I_{vh}$ are intensities with polarization in the vertical plane and the excitation in the vertical and horizontal planes respectively, $I_{hv}$ and $I_{hh}$ are intensities with polarization in the horizontal plane and the excitation in the vertical and horizontal planes respectively, and G is a g-factor that corrects for instrument sensitivity in the horizontal and vertical planes.

Metal content of NMR samples. Inductively coupled plasma mass spectrometry (ICP-MS) was performed on a Thermo iCAP Q ICP-MS. 1 mg/mL of ZincBY-1 or ZincBY-4 in acetonitrile-d$_3$ or acetonitrile-d$_3$ only was evaporated overnight at 70° C. 150 µL of HNO$_3$ was added and the samples were digested overnight at 70° C. Samples were diluted to a final nitric acid concentration of 3%. ICP-MS was operated in collision cell mode to reduce polyatomic interferences. An internal standard comprising $^7$Li, $^{89}$Y, and $^{115}$In was used. Each sample was acquired using one survey run (10 sweeps) and three main (peak jumping) runs (100 sweeps). Data was fit to a standard curve using a standard containing $^{45}$Sc, $^{58}$Ti, $^{51}$V, $^{52}$Cr, $^{55}$Mn, $^{56}$Fe, $^{59}$Co, $^{58}$Ni, $^{63}$Cu, and $^{64}$Zn from 5 ppb to 1000 ppb. Only $^{56}$Fe and $^{64}$Zn were detected in the samples above background levels.

Computational Analysis of ZincBY-1 and ZincBY-4. All density functional theory (DFT) calculations were performed using version 4.0.1 of the ORCA electronic structure package (Ref. B6; incorporated by reference in its entirety). Guided by the results of earlier studies on BODIPY derivatives (Ref. B7; incorporated by reference in its entirety), the PBE0 functional (Refs. B8-B10; incorporated by reference in their entireties) was used to optimize the geometries of all molecules studied, while time dependent DFT (TD-DFT) calculations and charge analysis through the CHarges from ELectrostatic Potentials using a Grid-based method (CHELPG) (Ref. B11; incorporated by reference in its entirety) were performed with the ωB97-XD3 functional (Ref. B12; incorporated by reference in its entirety). All calculations utilized the def2-TZVP basis set (Ref. B13; incorporated by reference in its entirety) with the resolution of the identity approximation coupled with the chain of spheres exchange method (RIJCOSX) (Refs. B14-B16; incorporated by reference in their entireties), using the def2/J auxiliary basis (Ref. B17; incorporated by reference in its entirety). Implicit solvation effects were included through the conductor like polarizable continuum model (CPCM) (Ref. B18; incorporated by reference in its entirety). Calculated spectra were broadened by Gaussians of width 0.2 eV, and red shifted by 0.64 eV to better match the experimental spectra per Momeni and Brown (Ref. B7; incorporated by reference in its entirety).

Animals and Egg Collection

Mouse. To collect MII-arrested eggs, female mice of at least 5 weeks in age were injected with 5 IU pregnant mare serum gonadotropin (PMSG) followed by 5 IU human chorionic gonadotropin (hCG) 48 hours later. Intact cumulus-oocyte complexes (COCs) were isolated from the oviducts 15 hours after the administration of hCG. Cumulus cells were denuded using 0.3% (w/v) hyaluronidase. Animals were treated in accordance with the US National Institutes of Health Guide for the Care and Use of Laboratory Animals. Food and water were given ad libitum. The Northwestern University Institutional Animal Care and Use Committee approved all the protocols.

C. elegans. Wildtype strain Bristol N2 was used as a control strain in fluorescence microscopy experiments. EU1067: unc-119(ed3) ruIs32[unc-119(+) pie-1$^{promoter}$::GFP::H$_2$B] III; ruIs57[unc-119(+) pie-1$^{promoter}$::GFP::tubulin] was used as a marker for cortical granules in fluorescence microscopy experiments. EU1067 was provided by the *Caenorhabditis* Genetics Center (CGC). All *C. elegans* strains were maintained in a 20° C. incubator on standard nematode growth media (NGM) plates using *E. coli* strain OP50 as a food source (Ref. B19; incorporated by reference in its entirety).

Confocal Microscopy

MII Egg Imaging. Confocal microscopy was performed on a Leica SP8 resonant scanner confocal microscope (Biological Imaging Facility, Northwestern University). MII eggs were stained in L-15 media with 3 mg/mL polyvinylpyrrolidone (PVP) containing an appropriate zinc probe (50 nM) for 10 min. Following washing three times, MII eggs were mounted on a glass bottom dish (MatTek) with hCZB for imaging. Following initial imaging, TPEN (final concentration of 5 µM) was added and given 5 min to interact with the samples before imaging again to determine how much fluorescence signal was lost. For tubulin detection, TubulinTracker green was utilized at a concentration of 240 nM according to the manufacturer instructions. ZincBY-4 (final concentration of 25 nM) was incubated with the TubulinTracker Green for a 30 min staining period. For visualization of zinc released from the MII egg during chemical activation, MII eggs were incubated with ZincBY-4 (50 nM) for 10 minutes in L-15 media containing 3 mg/mL PVP. MII eggs were washed three times with hCZB media with decreasing BSA content (0.1 mg/mL to 0.025 mg/mL) and washed once more with protein free hCZB. MII eggs were mounted on an imaging dish (MatTek) containing hCZB and covered in mineral oil. MII eggs were activated by adding ionomycin to a final concentration of 5 µM.

C. elegans. Using a procedure adapted from Kim 2013, Plos One, ten *C. elegans* adults were picked into a 100 µL solution of M9 and ZincBY-4. The probe solutions were prepared at a final concentration of 50 nM by diluting 5 mM ZincBY-4 into M9. The worms were soaked in the dark at 20° C. for 3.5 h. For experiments using TPEN, 1 µL of 1 mM TPEN (final concentration of 10 μM) or M9 was added to the probe solution 1 hour before removing the worms from the probe solution. The probe solution containing the worms was transferred onto NGM plates with OP50. Worms were picked into a 20 μL droplet of anesthetic solution on a 3% agarose gel pad on a glass slide. The anesthetic solution was a 1:1 mixture of 50 mM serotonin creatinine sulfate (Sigma, $H_{7752}$) in M9 and 100 nM polystyrene beads (Polysciences, 00876). The worms were imaged on a Leica SP8 confocal microscope.

REFERENCES

The following references (A1-A52; B1-B18), some of which are cited above by number, are incorporated herein by reference in their entireties.

(A1) Goldberg, J. M.; Loas, A.; Lippard, S. J., Metalloneurochemistry and the Pierian Spring: 'Shallow Draughts Intoxicate the Brain'. Isr. J. Chem. 2016, 56 (9-10), 791-802.
(A2) Haase, H.; Ober-Blobaum, J. L.; Engelhardt, G.; Hebel, S.; Heit, A.; Heine, H.; Rink, L., Zinc signals are essential for lipopolysaccharide-induced signal transduction in monocytes. J. Immunol. 2008, 181 (9), 6491-502.
(A3) O'Halloran, T. V.; Kebede, M.; Philips, S. J.; Attie, A. D., Zinc, insulin, and the liver: a menage a trois. J. Clin. Invest. 2013, 123 (10), 4136-9.
(A4) Vallee, B. L.; Falchuk, K. H., The biochemical basis of zinc physiology. Physiol. Rev. 1993, 73 (1), 79-118.
(A5) Ya, R.; Que, E. L.; O'Halloran, T. V.; Woodruff, T. K., Zinc as a Key Meiotic Cell-Cycle Regulator in the Mammalian Oocyte. Zinc Signals in Cellular Functions and Disorder 2014, 315-333.
(A6) Carter, K. P.; Young, A. M.; Palmer, A. E., Fluorescent sensors for measuring metal ions in living systems. Chem. Rev. 2014, 114 (8), 4564-601.
(A7) Pluth, M. D.; Tomat, E.; Lippard, S. J., Biochemistry of mobile zinc and nitric oxide revealed by fluorescent sensors. Annu. Rev. Biochem. 2011, 80, 333-55.
(A8) Que, E. L.; Domaille, D. W.; Chang, C. J., Metals in neurobiology: probing their chemistry and biology with molecular imaging. Chem. Rev. 2008, 108 (5), 1517-49.
(A9) Trusso Sfrazzetto, G.; Satriano, C.; Tomaselli, G. A.; Rizzarelli, E., Synthetic fluorescent probes to map metallostasis and intracellular fate of zinc and copper. Coord. Chem. Rev. 2016, 311, 125-167.
(A10) Bourassa, D.; Elitt, C. M.; McCallum, A. M.; Sumalekshmy, S.; McRae, R. L.; Morgan, M. T.; Siegel, N.; Perry, J. W.; Rosenberg, P. A.; Fahrni, C. J., Chromis-1, a Ratiometric Fluorescent Probe Optimized for Two-Photon Microscopy Reveals Dynamic Changes in Labile Zn(II) in Differentiating Oligodendrocytes. ACS Sens. 2018, 3 (2), 458-467.
(A11) Kim, A. M.; Bernhardt, M. L.; Kong, B. Y.; Ahn, R. W.; Vogt, S.; Woodruff, T. K.; O'Halloran, T. V., Zinc sparks are triggered by fertilization and facilitate cell cycle resumption in mammalian eggs. ACS Chem. Biol. 2011, 6 (7), 716-23.
(A12) Bernhardt, M. L.; Kong, B. Y.; Kim, A. M.; O'Halloran, T. V.; Woodruff, T. K., A zinc-dependent mechanism regulates meiotic progression in mammalian oocytes. Biol. Reprod. 2012, 86 (4), 114.
(A13) Kong, B. Y.; Bernhardt, M. L.; Kim, A. M.; O'Halloran, T. V.; Woodruff, T. K., Zinc maintains prophase I arrest in mouse oocytes through regulation of the MOS-MAPK pathway. Biol. Reprod. 2012, 87 (1), 11, 1-12.
(A14) Bernhardt, M. L.; Kim, A. M.; O'Halloran, T. V.; Woodruff, T. K., Zinc requirement during meiosis I-meiosis II transition in mouse oocytes is independent of the MOS-MAPK pathway. Biol. Reprod. 2011, 84 (3), 526-36.
(A15) Kim, A. M.; Vogt, S.; O'Halloran, T. V.; Woodruff, T. K., Zinc availability regulates exit from meiosis in maturing mammalian oocytes. Nat. Chem. Biol. 2010, 6 (9), 674-81.
(A16) Duncan, F. E.; Que, E. L.; Zhang, N.; Feinberg, E. C.; O'Halloran, T. V.; Woodruff, T. K., The zinc spark is an inorganic signature of human egg activation. Sci. Rep. 2016, 6, 24737.
(A17) Zhang, N.; Duncan, F. E.; Que, E. L.; O'Halloran, T. V.; Woodruff, T. K., The fertilization-induced zinc spark is a novel biomarker of mouse embryo quality and early development. Sci. Rep. 2016, 6, 22772.
(A18) Que, E. L.; Bleher, R.; Duncan, F. E.; Kong, B. Y.; Gleber, S. C.; Vogt, S.; Chen, S.; Garwin, S. A.; Bayer, A. R.; Dravid, V. P.; Woodruff, T. K.; O'Halloran, T. V., Quantitative mapping of zinc fluxes in the mammalian egg reveals the origin of fertilization-induced zinc sparks. Nat. Chem. 2015, 7 (2), 130-9.
(A19) Que, E. L.; Duncan, F. E.; Bayer, A. R.; Philips, S. J.; Roth, E. W.; Bleher, R.; Gleber, S. C.; Vogt, S.; Woodruff, T. K.; O'Halloran, T. V., Zinc sparks induce physiochemical changes in the egg zona pellucida that prevent polyspermy. Integr. Biol. (Camb.) 2017, 9 (2), 135-144.
(A20) Tokuhiro, K.; Dean, J., Glycan-Independent Gamete Recognition Triggers Egg Zinc Sparks and ZP2 Cleavage to Prevent Polyspermy. Dev. Cell. 2018, 46 (5), 627-640 e5.
(A21) Maret, W., Analyzing free zinc(II) ion concentrations in cell biology with fluorescent chelating molecules. Metallomics 2015, 7 (2), 202-11.
(A22) New, E. J.; Wimmer, V. C.; Hare, D. J., Promises and Pitfalls of Metal Imaging in Biology. Cell Chem. Biol. 2018, 25 (1), 7-18.
(A23) Boens, N.; Leen, V.; Dehaen, W.; Wang, L.; Robeyns, K.; Qin, W.; Tang, X.; Beljonne, D.; Tonnele, C.; Paredes, J. M.; Ruedas-Rama, M. J.; Orte, A.; Crovetto, L.; Talavera, E. M.; Alvarez-Pez, J. M., Visible absorption and fluorescence spectroscopy of conformationally constrained, annulated BODIPY dyes. J. Phys. Chem. A 2012, 116 (39), 9621-31.
(A24) Boens, N.; Qin, W.; Baruah, M.; De Borggraeve, W. M.; Filarowski, A.; Smisdom, N.; Ameloot, M.; Crovetto, L.; Talavera, E. M.; Alvarez-Pez, J. M., Rational design, synthesis, and spectroscopic and photophysical properties of a visible-light-excitable, ratiometric, fluorescent near-neutral pH indicator based on BODIPY. Chemistry 2011, 17 (39), 10924-34.
(A25) Lu, H.; Mack, J.; Yang, Y.; Shen, Z., Structural modification strategies for the rational design of red/NIR region BODIPYs. Chem. Soc. Rev. 2014, 43 (13), 4778-823.
(A26) Schellhammer, K. S.; Li, T.-Y.; Zeika, O.; Körner, C.; Leo, K.; Ortmann, F.; Cuniberti, G., Tuning Near-Infrared Absorbing Donor Materials: A Study of Electronic, Optical, and Charge-Transport Properties of aza-BODIPYs. Chem. Mater. 2017, 29 (13), 5525-5536.
(A27) Filarowski, A.; Lopatkova, M.; Lipkowski, P.; Van der Auweraer, M.; Leen, V.; Dehaen, W., Solvatochromism of BODIPY-Schiff dye. J. Phys. Chem. B 2015, 119 (6), 2576-84.
(A28) Thakare, S. S.; Chakraborty, G.; Kothavale, S.; Mula, S.; Ray, A. K.; Sekar, N., Proton Induced Modulation of ICT and PET Processes in an Imidazo-phenanthroline Based BODIPY Fluorophores. J. Fluoresc. 2017, 27 (6), 2313-2322.

(A29) Adamo, C.; Barone, V., Toward reliable density functional methods without adjustable parameters: The PBE0 model. J. Chem. Phys. 1999, 110 (13), 6158-6170.

(A30) Perdew, J. P.; Burke, K.; Ernzerhof, M., Generalized Gradient Approximation Made Simple. Phys. Rev. Lett. 1996, 77 (18), 3865-3868.

(A31) Perdew, J. P.; Burke, K.; Ernzerhof, M., Generalized Gradient Approximation Made Simple [Phys. Rev. Lett. 77, 3865 (1996)]. Phys. Rev. Lett. 1997, 78 (7), 1396-1396.

(A32) Weigend, F.; Ahlrichs, R., Balanced basis sets of split valence, triple zeta valence and quadruple zeta valence quality for H to Rn: Design and assessment of accuracy. Phys. Chem. Chem. Phys. 2005, 7 (18), 3297-305.

(A33) Lin, Y. S.; Li, G. D.; Mao, S. P.; Chai, J. D., Long-Range Corrected Hybrid Density Functionals with Improved Dispersion Corrections. J. Chem. Theory Comput. 2013, 9 (1), 263-72.

(A34) Khan, T. K.; Rao, M. R.; Ravikanth, M., Synthesis and Photophysical Properties of 3,5-Bis(oxopyridinyl)- and 3,5-Bis(pyridinyloxy)-Substituted Boron-Dipyrromethenes. Eur. J. Org. Chem. 2010, 2010 (12), 2314-2323.

(A35) Dalvit, C.; Invernizzi, C.; Vulpetti, A., Fluorine as a hydrogen-bond acceptor: experimental evidence and computational calculations. Chemistry 2014, 20 (35), 11058-68.

(A36) Jacobsen, J. A.; Stork, J. R.; Magde, D.; Cohen, S. M., Hydrogen-bond rigidified BODIPY dyes. Dalton Trans. 2010, 39 (3), 957-62.

(A37) Menges, N., Computational study on aromaticity and resonance structures of substituted BODIPY derivatives. Comput. Theor. Chem. 2015, 1068, 117-122.

(A38) Breneman, C. M.; Wiberg, K. B., Determining atom-centered monopoles from molecular electrostatic potentials. The need for high sampling density in formamide conformational analysis. J. Comput. Chem. 1990, 11 (3), 361-373.

(A39) Boldyrev, I. A.; Zhai, X.; Momsen, M. M.; Brockman, H. L.; Brown, R. E.; Molotkovsky, J. G., New BODIPY lipid probes for fluorescence studies of membranes. J. Lipid. Res. 2007, 48 (7), 1518-1532.

(A40) Price, K. A.; Hickey, J. L.; Xiao, Z.; Wedd, A. G.; James, S. A.; Liddell, J. R.; Crouch, P. J.; White, A. R.; Donnelly, P. S., The challenges of using a copper fluorescent sensor (CS1) to track intracellular distributions of copper in neuronal and glial cells. Chem. Sci. 2012, 3 (9).

(A41) Ackerman, C. M.; Lee, S.; Chang, C. J., Analytical Methods for Imaging Metals in Biology: From Transition Metal Metabolism to Transition Metal Signaling. Anal. Chem. 2017, 89 (1), 22-41.

(A42) Morgan, M. T.; McCallum, A.; Fahrni, C. J., Rational Design of a Water-Soluble, Lipid-Compatible Fluorescent Probe for Cu(I) with Sub-Part-Per-Trillion Sensitivity. Chem. Sci. 2016, 7 (2), 1468-1473.

(A43) Meeusen, J. W.; Nowakowski, A.; Petering, D. H., Reaction of metal-binding ligands with the zinc proteome: zinc sensors and N,N,N',N'-tetrakis(2-pyridylmethyl)ethylenediamine. Inorg. Chem. 2012, 51 (6), 3625-32.

(A44) Nowakowski, A. B.; Meeusen, J. W.; Menden, H.; Tomasiewicz, H.; Petering, D. H., Chemical-Biological Properties of Zinc Sensors TSQ and Zinquin: Formation of Sensor-Zn-Protein Adducts versus Zn(Sensor)2 Complexes. Inorg. Chem. 2015, 54 (24), 11637-47.

(A45) Milo, R., What is the total number of protein molecules per cell volume? A call to rethink some published values. Bioessays 2013, 35 (12), 1050-5.

(A46) Baruah, M.; Qin, W.; Vallee, R. A.; Beljonne, D.; Rohand, T.; Dehaen, W.; Boens, N., A highly potassium-selective ratiometric fluorescent indicator based on BODIPY azacrown ether excitable with visible light. Org. Lett. 2005, 7 (20), 4377-80.

(A47) Kollmannsberger, M.; Rurack, K.; Resch-Genger, U.; Rettig, W.; Daub, J., Design of an efficient charge-transfer processing molecular system containing a weak electron donor: spectroscopic and redox properties and cation-induced fluorescence enhancement. Chem. Phys. Lett. 2000, 329 (5-6), 363-369.

(A48) Boens, N.; Leen, V.; Dehaen, W., Fluorescent indicators based on BODIPY. Chem. Soc. Rev. 2012, 41 (3), 1130-72.

(A49) Grabowski, Z. R.; Rotkiewicz, K.; Rettig, W., Structural changes accompanying intramolecular electron transfer: focus on twisted intramolecular charge-transfer states and structures. Chem. Rev. 2003, 103 (10), 3899-4032.

(A50) Lukinavicius, G.; Reymond, L.; D'Este, E.; Masharina, A.; Gottfert, F.; Ta, H.; Guther, A.; Fournier, M.; Rizzo, S.; Waldmann, H.; Blaukopf, C.; Sommer, C.; Gerlich, D. W.; Arndt, H. D.; Hell, S. W.; Johnsson, K., Fluorogenic probes for live-cell imaging of the cytoskeleton. Nat. Methods 2014, 11 (7), 731-3.

(A51) Roh, H. C.; Collier, S.; Guthrie, J.; Robertson, J. D.; Kornfeld, K., Lysosome-related organelles in intestinal cells are a zinc storage site in C. elegans. Cell. Metab. 2012, 15 (1), 88-99.

(A52) Chen, Y.; Zhao, J.; Guo, H.; Xie, L., Geometry relaxation-induced large Stokes shift in red-emitting borondipyrromethenes (BODIPY) and applications in fluorescent thiol probes. J. Org. Chem. 2012, 77 (5), 2192-206.

(B1) Domaille, D. W.; Zeng, L.; Chang, C. J., Visualizing ascorbate-triggered release of labile copper within living cells using a ratiometric fluorescent sensor. J. Am. Chem. Soc. 2010, 132 (4), 1194-5.

(B2) Que, E. L.; Bleher, R.; Duncan, F. E.; Kong, B. Y.; Gleber, S. C.; Vogt, S.; Chen, S.; Garwin, S. A.; Bayer, A. R.; Dravid, V. P.; Woodruff, T. K.; O'Halloran, T. V., Quantitative mapping of zinc fluxes in the mammalian egg reveals the origin of fertilization-induced zinc sparks. Nat. Chem. 2015, 7 (2), 130-9.

(B3) Brannon, J. H.; Magde, D., Absolute quantum yield determination by thermal blooming. Fluorescein. J. Phys. Chem. 1978, 82 (6), 705-709.

(B4) Taki, M.; Wolford, J. L.; O'Halloran, T. V., Emission ratiometric imaging of intracellular zinc: design of a benzoxazole fluorescent sensor and its application in two-photon microscopy. J. Am. Chem. Soc. 2004, 126 (3), 712-3.

(B5) Gagliardi, L. G.; Castells, C. B.; Rhfols, C.; Rosés, M.; Bosch, E., Static Dielectric Constants of Acetonitrile/Water Mixtures at Different Temperatures and Debye-HückelAandaOBParameters for Activity Coefficients. J. Chem. Eng. Data 2007, 52 (3), 1103-1107.

(B6) Neese, F., The ORCA program system. Wiley Interdisciplinary Rev.: Comput. Mol. Sci. 2012, 2 (1), 73-78.

B(7) Momeni, M. R.; Brown, A., Why do TD-DFT excitation energies of BODIPY/Aza-BODIPY families largely deviate from experiment? Answers from electron correlated and multireference methods. J. Chem. Theory Comput. 2015, 11 (6), 2619-32.

(B8) Adamo, C.; Barone, V., Toward reliable density functional methods without adjustable parameters: The PBE0 model. J. Chem. Phys. 1999, 110 (13), 6158-6170.

(B9) Perdew, J. P.; Burke, K.; Ernzerhof, M., Generalized Gradient Approximation Made Simple. Phys. Rev. Lett. 1996, 77 (18), 3865-3868.

(B10) Perdew, J. P.; Burke, K.; Ernzerhof, M., Generalized Gradient Approximation Made Simple [Phys. Rev. Lett. 77, 3865 (1996)]. Phys. Rev. Lett. 1997, 78 (7), 1396-1396.

(B11) Breneman, C. M.; Wiberg, K. B., Determining atom-centered monopoles from molecular electrostatic potentials. The need for high sampling density in formamide conformational analysis. J. Comput. Chem. 1990, 11 (3), 361-373.

(B12) Lin, Y. S.; Li, G. D.; Mao, S. P.; Chai, J. D., Long-Range Corrected Hybrid Density Functionals with Improved Dispersion Corrections. J. Chem. Theory Comput. 2013, 9 (1), 263-72.

(B13) Weigend, F.; Ahlrichs, R., Balanced basis sets of split valence, triple zeta valence and quadruple zeta valence quality for H to Rn: Design and assessment of accuracy. Phys. Chem. Chem. Phys. 2005, 7 (18), 3297-305.

(B14) Izsak, R.; Neese, F., An overlap fitted chain of spheres exchange method. J. Chem. Phys. 2011, 135 (14), 144105.

(B15) Kossmann, S.; Neese, F., Comparison of two efficient approximate Hartee-Fock approaches. Chem. Phys. Lett. 2009, 481 (4-6), 240-243.

(B16) Neese, F.; Wennmohs, F.; Hansen, A.; Becker, U., Efficient, approximate and parallel Hartree-Fock and hybrid DFT calculations. A 'chain-of-spheres' algorithm for the Hartree-Fock exchange. Chem. Phys. 2009, 356 (1-3), 98-109.

(B17) Weigend, F., Accurate Coulomb-fitting basis sets for H to Rn. Phys. Chem. Chem. Phys. 2006, 8 (9), 1057-65.

(B18) Cossi, M.; Rega, N.; Scalmani, G.; Barone, V., Energies, structures, and electronic properties of molecules in solution with the C-PCM solvation model. J. Comput. Chem. 2003, 24 (6), 669-81.

(B19) Stiernagle, T., Maintenance of *C. elegans*. WormBook 2006, 1-11.

The invention claimed is:

1. A method comprising:
   (a) contacting a sample with zinc-responsive probe comprising:

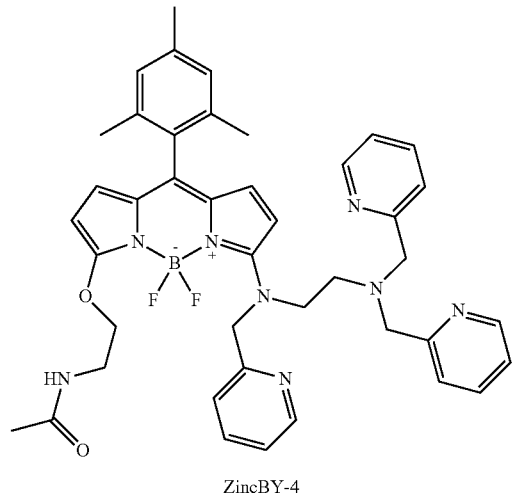

ZincBY-4 and
   (b) detecting light emitted from the zinc-responsive probe.

2. The method of claim 1, wherein detecting light emitted from the zinc-responsive probe comprises (i) exposing the sample to a wavelength of light within an excitation spectrum of the zinc-responsive probe, and (ii) detecting light within an emission spectrum of the zinc-responsive probe.

3. The method of claim 1, wherein detecting light from the zinc-responsive probe comprises monitoring light emitted the zinc-responsive probe over time.

4. The method of claim 1, wherein detecting an emission spectrum of the zinc-responsive probe comprises imaging the sample.

5. The method of claim 1, wherein the sample comprises a cell, tissue, organ, or whole animal.

* * * * *